US008725510B2

(12) United States Patent
Yoshiike et al.

(10) Patent No.: US 8,725,510 B2
(45) Date of Patent: May 13, 2014

(54) HMM LEARNING DEVICE AND METHOD, PROGRAM, AND RECORDING MEDIUM

(75) Inventors: Yukiko Yoshiike, Tokyo (JP); Kenta Kawamoto, Tokyo (JP); Kuniaki Noda, Tokyo (JP); Kohtaro Sabe, Tokyo (JP)

(73) Assignee: Sony Corporation, Tokyo (JP)

( * ) Notice: Subject to any disclaimer, the term of this patent is extended or adjusted under 35 U.S.C. 154(b) by 447 days.

(21) Appl. No.: 12/829,984

(22) Filed: Jul. 2, 2010

(65) Prior Publication Data

US 2011/0010176 A1 Jan. 13, 2011

(30) Foreign Application Priority Data

Jul. 9, 2009 (JP) ................................ P2009-163192
Jul. 9, 2009 (JP) ................................ P2009-163193

(51) Int. Cl.
*G10L 15/14* (2006.01)

(52) U.S. Cl.
USPC ........................................................... 704/256

(58) Field of Classification Search
CPC ............................. G10L 15/142; G10L 15/144
USPC ............................................. 704/256; 706/12
See application file for complete search history.

(56) References Cited

U.S. PATENT DOCUMENTS

| 6,434,522 | B1 * | 8/2002 | Tsuboka | 704/256 |
| 6,993,452 | B2 * | 1/2006 | Huang et al. | 702/179 |
| 8,010,341 | B2 * | 8/2011 | Achan et al. | 704/9 |
| 2002/0184011 | A1 * | 12/2002 | Kondo et al. | 704/222 |
| 2002/0184020 | A1 * | 12/2002 | Shinoda | 704/240 |
| 2005/0047646 | A1 * | 3/2005 | Jojic et al. | 382/159 |
| 2005/0159949 | A1 * | 7/2005 | Yu et al. | 704/235 |
| 2006/0262115 | A1 * | 11/2006 | Shapiro | 345/419 |
| 2006/0268733 | A1 * | 11/2006 | Rhee et al. | 370/252 |

OTHER PUBLICATIONS

Rabiner, L. R., "A Tutorial on Hidden Markov Models and Selected Applications in Speech Recognition", Proceedings of the IEEE, vol. 77, No. 2, Feb. 1989, pp. 257-286.

* cited by examiner

*Primary Examiner* — Jakieda Jackson
(74) *Attorney, Agent, or Firm* — Finnegan, Henderson, Farabow, Garrett & Dunner, L.L.P.

(57) ABSTRACT

An HMM (Hidden Markov Model) learning device includes: a learning unit for learning a state transition probability as the function of actions that an agent can execute, with learning with HMM performed based on actions that the agent has executed, and time series information made up of an observation signal; and a storage unit for storing learning results by the learning unit as internal model data including a state-transition probability table and an observation probability table; with the learning unit calculating frequency variables used for estimation calculation of HMM state-transition and HMM observation probabilities; with the storage unit holding the frequency variables corresponding to each of state-transition probabilities and each of observation probabilities respectively, of the state-transition probability table; and with the learning unit using the frequency variables held by the storage unit to perform learning, and estimating the state-transition probability and the observation probability based on the frequency variables.

19 Claims, 45 Drawing Sheets

FIG. 19

| NUMBER OF TRIALS | FIRST LEARNING | AFTER SPLITTING/ MERGING | INCREMENT |
|---|---|---|---|
| 1 | −230.168 | −60.313 | 169.855 |
| 2 | −316.866 | −60.313 | 256.553 |
| 3 | −424.160 | −60.316 | 363.844 |
| 4 | −509.148 | −104.670 | 494.478 |
| 5 | −165.399 | −60.313 | 105.086 |
| 6 | −79.449 | −60.313 | 19.136 |
| 7 | −269.072 | −53.120 | 216.600 |
| 8 | −658.095 | −60.348 | 597.747 |

HMM LEARNING DEVICE AND METHOD, PROGRAM, AND RECORDING MEDIUM

BACKGROUND OF THE INVENTION

1. Field of the Invention

The present invention relates to an HMM (Hidden Markov Model) learning device and method, a program, and a recording medium, and specifically relates to an HMM learning device and method, a program, and a recording medium whereby effective and stable learning can be performed at the time of performing autonomous learning under a changing environment.

2. Description of the Related Art

Employment of HMM (Hidden Markov Model) has been proposed as a method for handling a sensor signal observed from a system serving as an object as time series data, and learning this as a probability model having both of a state and a state transition. HMM is one technique widely used for audio recognition. HMM is a state transition model defined by a state transition probability, and an output probability density function in each state, and parameters thereof are estimated so as to maximize likelihood. The Baum-Welch algorithm has been widely employed as a parameter estimating method.

HMM is a model whereby transition can be made from each state to another state via a state transition probability, wherein modeling is performed as a process of which the state is changed. However, with HMM, usually, which state an observed sensor signal corresponds to is determined only in a probabilistic manner.

Therefore, the Viterbi algorithm has widely been employed as a method for determining a state transition process so as to obtain the highest likelihood based on an observed sensor signal. Thus, the state corresponding to the sensor signal at each point in time can uniquely be determined. Also, even though the same sensor signals are observed from a system in a different situation, the state transition processes thereof can be handled as different state transition processes according to difference of the temporal change processes of the sensor signals before and after each point in time. Though a perceptual aliasing problem is not completely solved, a different state may be assigned to the same sensor signals, and accordingly, the state of the system may be modeled in detail as compared to SOM or the like (e.g., see Lawrence R. Rabiner (February 1989), "A tutorial on Hidden Markov Models and selected application in speech recognition", Proceedings of the IEEE 77(2): 257-286).

SUMMARY OF THE INVENTION

Incidentally, with learning with HMM, in the event that the number of states and the number of state transitions increase, it is difficult to correctly estimate parameters. Specifically, the Baum-Welch algorithm is not a method for ensuring that the optimal parameters can be determined, and accordingly, it is extremely difficult to estimate suitable parameters in the case of the number of parameters increasing. Also, in the case that a system serving as an object to be learned is unknown, it is difficult to suitably set the configuration of a state transition model, and the initial value of a parameter, which also becomes a cause for preventing estimation of parameters.

The reason why HMM is effectively employed with audio recognition is due to a factor that the object to be handled is restricted to audio signals, and a great number of observations relating to audio are available. Further, with audio recognition, a great factor is that the configuration of a left-to-right type has been found to be effective regarding the configuration of HMM, and so forth, as the results of massive studies over many years. Accordingly, in the case that information for determining the configuration of HMM and the initial value is not provided with an unknown system as an object, it can be said that it is a very difficult problem to cause large-scale HMM to function as a substantial model.

Incidentally, such as described above, a problem that is to be handled by HMM is structuralizing of sensor signals, and action signals are not taken into consideration. A framework wherein HMM is expanded, and an agent promotes an environment using an action signal, whereby a sensor signal can be influenced in the future substituted therefrom, is referred to as a partially observable Markov decision process (hereafter, referred to as POMDP).

The model learning of this problem is very difficult, and the model learning principally studied so far is only for estimation of relatively few parameters within a model to which a skeleton is provided by preliminary knowledge, or for driving learning using a reinforcement learning framework. Further, many kinds of model learning have had a problem regarding learning speed, convergence, or stability, and accordingly, it can be said that practicality is not very high.

Also, the learning methods of HMM include the batch learning method, and the additional learning method. Here, with the batch learning method, for example, in the case that transition and observation data of 10000 steps is obtained, a state transition probability table and an observation probability table are generated and saved based on the transition and observation of 10000 steps. On the other hand, with the additional learning method, for example, first, a state transition probability table and an observation probability table are generated and saved based on the transition and observation of 1000 steps. Subsequently, learning is repeatedly performed, such that each value of the state transition probability table and the observation probability table is changed and saved based on the subsequent transition and observation of 1000 steps, thereby updating the internal mode data.

With the learning with HMM according to the related art, a problem occurs at the time of learning by the additional learning method. With the learning with HMM, a method has often been employed wherein all of the data is prepared beforehand, learning by the batch learning method is performed, but with such learning, it is implausibly difficult to learn from experience adapted to an environment. In other words, in order to exhibit more suitable performance under various real worlds, a function is necessary wherein operation results under an actual environment are fed back to perform additional learning. However, a problem is not solved wherein how "learned storage configuration" and "new experience" are adjusted at the time of performing additional learning. On one hand, quick adaptation is by rapidly reflecting "new experience" is desired, but on the other hand, there is a risk in that the storage configuration established so far may be destroyed.

Also, heretofore, in order to perform additional learning, learning has been performed with a combination of newly obtained data by separately holding the past learned data, or by rehearsing the past learned data from the current storage, or the like. However, even in this way, there has been a problem wherein "new experience" is not reflected on the past learned data held separately, the past learned data which is rehearsed is generated under influence of a "new experience", or the like. Thus, with learning with large-scale HMM, it has been difficult to enable functioning as a practical model by performing additional learning.

It has been found desirable to enable effective and stable learning at the time of performing autonomous learning under a changing environment.

An embodiment of the present invention is an HMM (Hidden Markov Model) learning device including: a learning unit configured to learn a state transition probability as the function of actions that an agent can execute, with learning with HMM performed based on actions that the agent has executed, and time series information made up of an observation signal observed as a result of the actions; and a storage unit configured to store learning results by the learning unit as internal model data including a state transition probability table and an observation probability table; with the learning unit calculating a frequency variable equivalent to frequency to be used for estimation calculation of an HMM state transition probability, and a frequency variable equivalent to frequency to be used for estimation calculation of an HMM observation probability; with the storage unit holding the frequency variable corresponding to each of state transition probabilities, and the frequency variable corresponding to each of observation probabilities, of the state transition probability table; and with the learning unit using the frequency variables held by the storage unit to perform learning by an additional learning method, and estimating the state transition probability and the observation probability based on the frequency variables.

The actions may be discrete actions; with a state transition probability table corresponding to each of the actions being generated as the internal model data.

With the learning, constraint may be made so that the number of observation symbols corresponding to the observation signal observed at one node of the HMM becomes one.

The learning unit may execute processing for finding a node that may include two or more observation symbols to realize the constraint, and dividing the found node.

With the learning, constraint may be made so that an observation symbol observed at each of transition destination nodes to which transition can be made in the case of a predetermined action being executed at one node, mutually differs.

With the learning, constraint may be made so that an observation symbol observed at each of transition destination nodes to which transition is made due to a common action as to one node, mutually differs.

The actions may be consecutive actions, and may be subjected to weighting so as to correspond to a limited number of discrete actions; with a state transition probability table corresponding to each of the limited number of discrete actions being generated.

The learning unit may find nodes having a similar observation probability distribution at each of transition destination nodes to which transition can be made in the case of a predetermined action being executed at one node, and may merge the found nodes.

The learning unit may find nodes having a similar observation distribution at each of transition source nodes from which transition is made due to a common action as to one node, and may merge the found nodes.

The learning unit may perform learning by the additional learning method, and also may update the value of the frequency variable, and in the case of updating the frequency variable, may update the frequency variable based on a predetermined learning rate.

The learning unit may further calculate a penalty coefficient according to the smallness of the value of the frequency variable to constrain the disturbance of the estimated value of the state transition probability due to the smallness of the value of the frequency variable.

Before performing learning by the additional learning method, the region of the observation probability table stored as the internal mode data may be extended, and an observation probability may be set to the extended region, in the case that the types of observation symbol corresponding to the observation signal increases.

Before performing learning by the additional learning method, the regions of the state transition probability table and the observation probability table stored as the internal mode data may be extended, and a state transition probability and an observation probability may be set to the extended regions respectively, in the case that the number of the nodes increases.

Based on a state transition probability obtained from the state transition probability table stored as the internal model data obtained based on the past learning, the state transition probability may be set to the extended region of the state transition probability table.

The HMM learning device may further includes: a recognizing unit configured to recognize, based on the time series information, whether or not transition has been made to an unknown node not included in the internal model data obtained based on the past learning; with, in order to add the unknown node to the internal model data, time series information being accumulated for only a given time since the unknown node being recognized, an unknown node added to the internal model data being determined based on the accumulated time series information, and the determined unknown node being added to the internal model data.

In the case that after recognizing that transition has been made to the unknown node, the recognizing unit recognizes that transition has been made to a known node included in the internal model data obtained based on the past learning, the determined unknown node may be added to the internal model data, and also a state transition probability and an observation probability may be set to the regions of the state transition probability table and the observation probability table extended in response to addition of the unknown node to update the internal model data, and the updated internal model data may be used to perform learning by the additional learning method.

Before performing learning by the additional learning method, the region of the state transition probability table stored as the internal mode data may be extended, and a state transition probability may be set to the extended region, in the case that the number of actions increases.

An embodiment of the present invention is an HMM learning method including the steps of: learning, with a learning unit, a state transition probability as the function of actions that an agent can execute, with learning with HMM performed based on actions that the agent has executed, and time series information made up of an observation signal observed as a result of the actions; and storing, with a storage unit, of learning results by the learning unit as internal model data including a state transition probability table and an observation probability table; the learning unit calculating a frequency variable equivalent to frequency to be used for estimation calculation of an HMM state transition probability, and a frequency variable equivalent to frequency to be used for estimation calculation of an HMM observation probability; the storage unit holding the frequency variable corresponding to each of state transition probabilities, and the frequency variable corresponding to each of observation probabilities, of the state transition probability table; and the learning unit using the frequency variables held by the storage unit to perform learning by an additional learning method, and estimating the state transition probability and the observation probability based on the frequency variables.

An embodiment of the present invention is a program causing a computer to serve as an HMM learning device including: a learning unit configured to learn a state transition probability as the function of actions that an agent can execute, with learning with HMM performed based on actions that the agent has executed, and time series information made up of an observation signal observed as a result of the actions; and a storage unit configured to store learning results by the learning unit as internal model data including a state transition probability table and an observation probability table; with the learning unit calculating a frequency variable equivalent to frequency to be used for estimation calculation of an HMM state transition probability, and a frequency variable equivalent to frequency to be used for estimation calculation of an HMM observation probability; with the storage unit holding the frequency variable corresponding to each of state transition probabilities, and the frequency variable corresponding to each of observation probabilities, of the state transition probability table; and with the learning unit using the frequency variables held by the storage unit to perform learning by an additional learning method, and estimating the state transition probability and the observation probability based on the frequency variables.

With the above configuration, with learning with HMM performed based on actions that an agent executed, and time series information made up of an observation symbol observed as a result of the actions, a state transition probability is learned as the function of actions that an agent can execute, and the learning results are stored as internal model data including a state transition probability table and an observation probability table. Also, a frequency variable equivalent to frequency to be used for estimation calculation of an HMM state transition probability, and a frequency variable equivalent to frequency to be used for estimation calculation of an HMM observation probability are calculated, the frequency variable of the state transition probability table corresponding to each of state transition probabilities, and the frequency variable corresponding to each of observation probabilities of the observation probability table, are held, the frequency variables are used to perform learning by an additional learning method, and the state transition probability and the observation probability are estimated based on the frequency variables.

According to the above configuration, effective and stable learning can be performed at the time of performing autonomous learning under a changing environment.

BRIEF DESCRIPTION OF THE DRAWINGS

FIG. 19 is a table for comparing the likelihoods of a state transition probability table and an observation probability table of the action expanded HMM.

DESCRIPTION OF THE PREFERRED EMBODIMENTS

An embodiment of the present invention will be described below with reference to the drawings. First, an action expanded HMM (Hidden Markov Model) will be described. A later-described autonomous action learning device is applied to, for example, a robot which travels through a maze by itself to recognize its own position, and learns a route to its destination, or the like.

Figure 1:
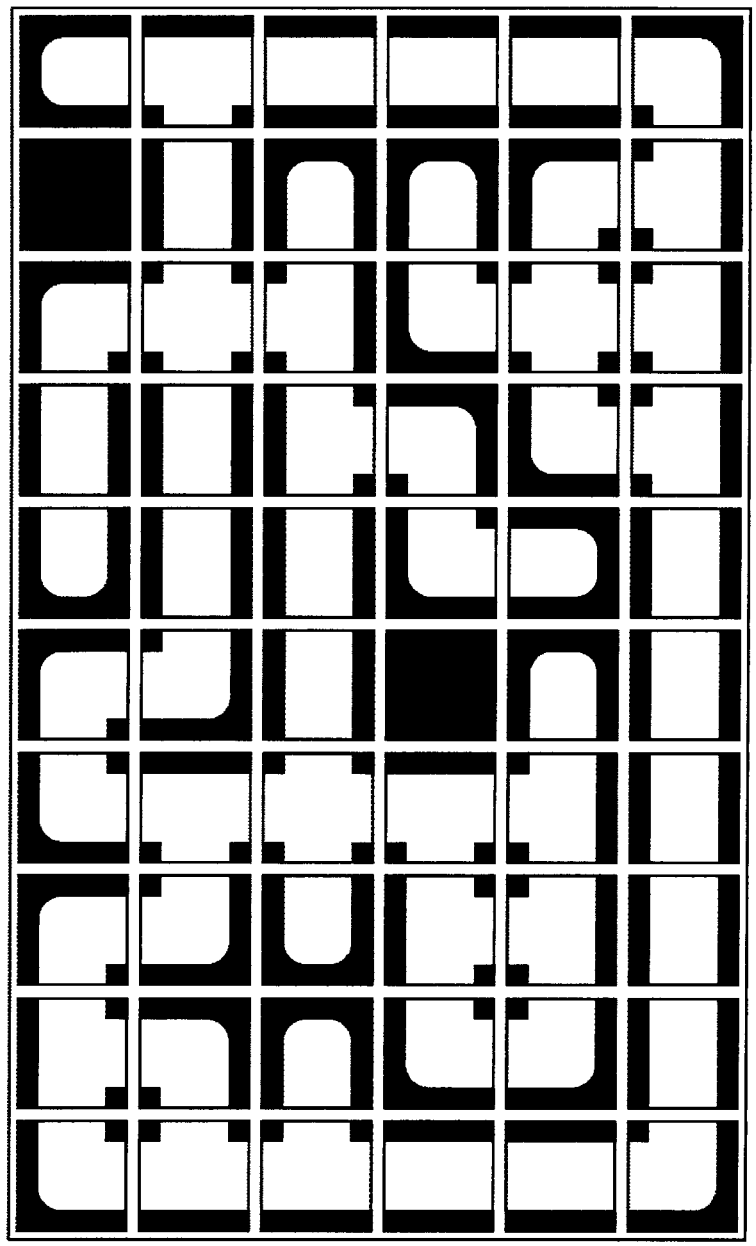
FIG. 1 is a diagram illustrating an example of a maze.
Figure 2:
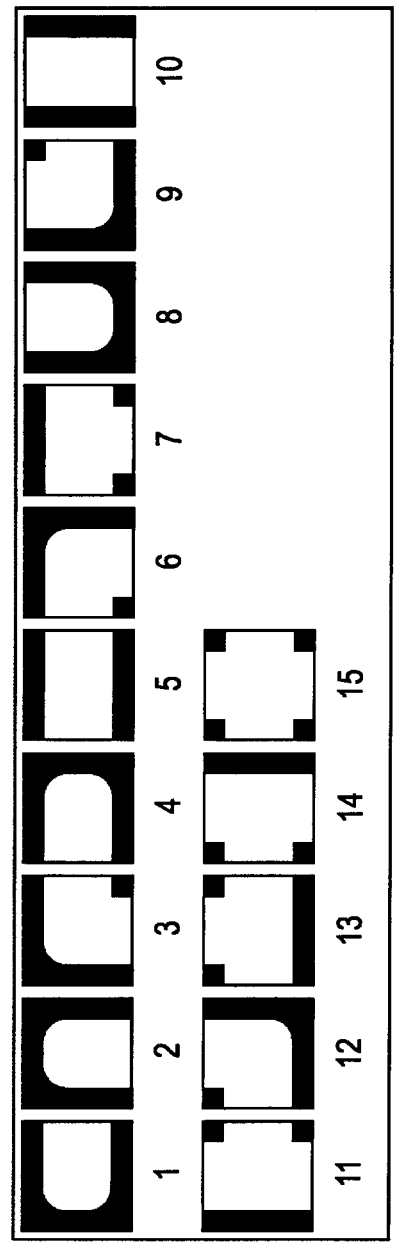
FIG. 2 is a diagram illustrating an example of parts making up the maze in FIG. 1.

FIG. 1 is a diagram illustrating an example of a maze. As illustrated in this drawing, this maze is configured by combining multiple types of parts such as illustrated in FIG. 2. As illustrated in FIG. 2, each of the parts is configured as a rectangle having the same size, and 15 different types are prepared. For example, a part 5 is for configuring a path in the horizontal direction, and a part 10 is for configuring a path in the vertical direction. Also, parts 7, 11, and 13 are each for configuring a T-shaped intersection, and a part 15 is for configuring a crossroad.

Figure 3:
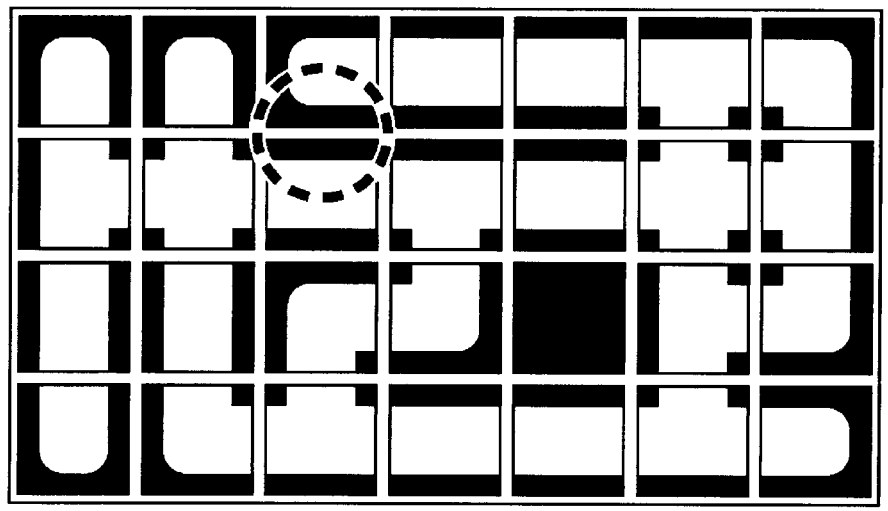
FIG. 3 is a diagram for describing change in the configuration of the maze.

Also, this maze is configured so as to change the configuration thereof. For example, in FIG. 3, the configuration of the maze is changed such illustrated in FIG. 4 by changing two parts indicated by a dotted-line circle in the drawing. Specifically, the configuration of the maze can be changed so that passing through is disabled in FIG. 3, but passing through is enabled in FIG. 4.

Figure 4:
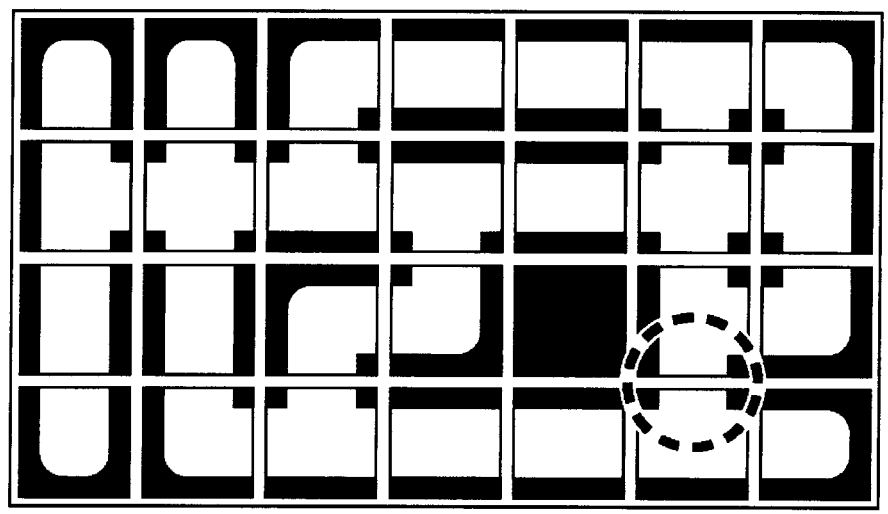
FIG. 4 is a diagram for describing change in the configuration of the maze.
Figure 5:
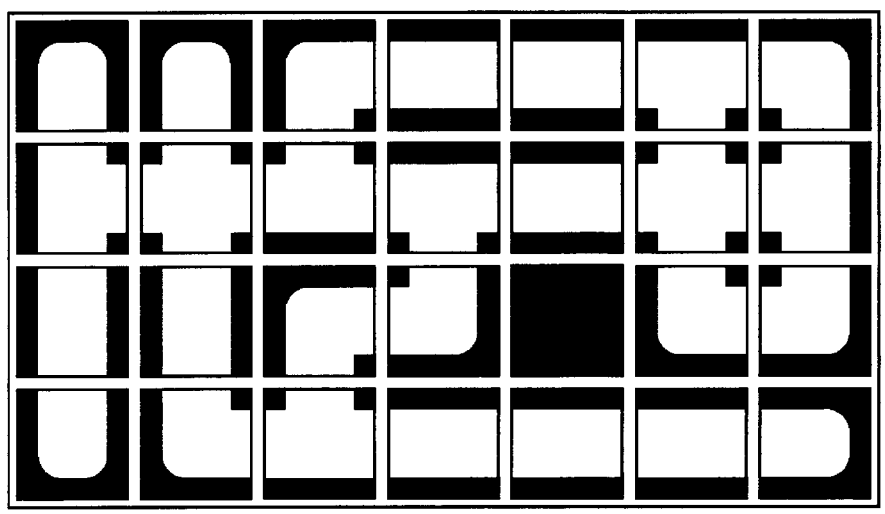
FIG. 5 is a diagram for describing change in the configuration of the maze.

Further, in FIG. 4, the configuration of the maze is changed such illustrated in FIG. 5 by changing two parts of a portion indicated by a dotted-line circle in the drawing. Specifically, the configuration of the maze can be changed so that passing through is enabled in FIG. 4, but passing through is disabled in FIG. 5.

A robot travels through such a maze by itself. With this example, the maze is two-dimensionally configured, the direction of a path is restricted to the horizontal or vertical direction alone, and accordingly, the robot can be set so as to move in the four directions of the upper, lower, left, and right directions.

Figure 6:
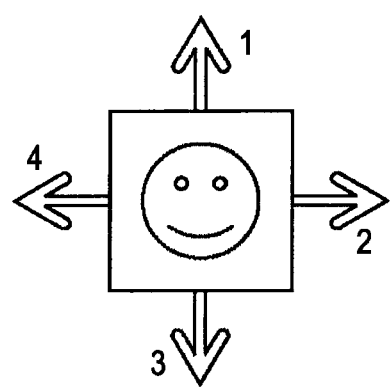
FIG. 6 is a diagram for describing the movement directions of a robot.

FIG. 6 is a diagram for describing the movement directions of the robot. The vertical direction and the horizontal direction in the drawing correspond to FIG. 1, and it can be found that the robot illustrated in the center of the drawing moves in one direction of the upper, lower, left, and right directions.

Now, let us say that the movement of the robot in a predetermined direction will be referred to as an action. For example, with the example in FIG. 6, there are four actions corresponding to four arrows in the drawing. Also, for example, a sensor for searching an object is provided to the robot, the type of a part where the robot is located on the maze may be determined by analyzing the signal output from the sensor. Specifically, the robot obtains the sensor signal corresponding to one of 15 types of parts described above with reference to FIG. 2 at each position on the maze.

With an embodiment of the present invention, for example, internal model data corresponding to the configuration of the maze is generated based on the sensor signal at each position on the maze where the robot travels by itself. Now, let us say that the maze will be referred to as "environment", and the sensor signal corresponding to one of the 15 types of parts will be referred to as "observation symbol". With an embodiment of the present invention, HMM is used to learn the configuration of the maze, and the above internal model data is generated.

With the learning with HMM, states are recognized based on observation obtained from an environment. As described above, for example, an environment is a maze, and observation corresponds to an observation symbol determined from a sensor signal corresponding to one of the 15 types of parts. Note that the robot will be referred to as an agent as appropriate.

With the learning with HMM, the agent recognizes the state of itself based on observation obtained from an environment. The state mentioned here is a so-called state that the agent subjectively recognizes, and in reality, in the case of objectively observing a state in which the agent is disposed from the outside, both may differ. For example, in the event of objectively observing the position of the robot on the two-dimensional maze, the position thereof is coordinates (x1, y1), but on the other hand, the robot itself may recognize that itself is in coordinates (x2, y2). Thus, so to speak, with HMM, a state subjectively recognized by the agent is represented with a hidden state, internal state, state, node, or the like.

With the present embodiment, description will be made principally regarding an example wherein each position on the maze, i.e., the position of each part disposed on the maze is correlated with a node (state, hidden state, internal state) of the HMM, and an observation symbol is correlated with these nodes.

Incidentally, the usual HMM is for structuralizing sensor signals, and has no consideration regarding action signals. Learning in a situation in which the agent uses an action signal to execute an action as to an environment, thereby influencing an observation symbol to be observed from now, is not assumed with HMM. A solution of such a problem is referred to as partially observable Markov decision process (hereafter, POMDP).

Therefore, with an embodiment of the present invention, the above problem will be solved by expanding the HMM. That is to say, with an embodiment of the present invention, the HMM is expanded so as to take action signals into consideration. Such an expanded HMM will be referred to as "action expanded HMM".

Figure 7:
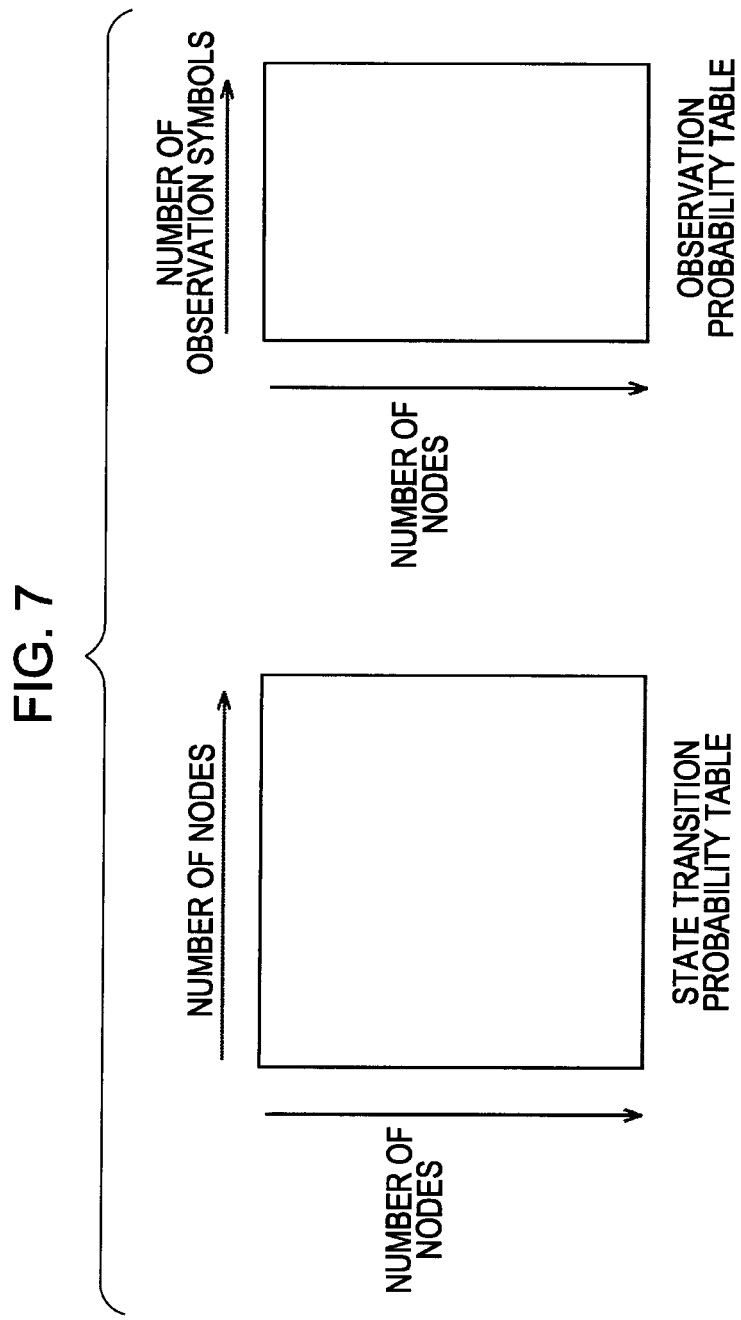
FIG. 7 is a diagram for describing a common HMM (Hidden Markov Model)

FIG. 7 is a diagram for describing the usual HMM. As illustrated in the drawing, the HMM learns a probability that transition (state transition) may be made from a certain node to another node by the number of possible transitions. Specifically, the value of a state transition probability is set to each matrix position of a table of the number of nodes×the number of nodes to generate a two-dimensional table referred to as state transition probability table. Also, the HMM learns a probability that each observation symbol may be observed at a certain node. Specifically, the value of an observation probability is set to each matrix position of a table of the number of nodes×the number of observation symbols to generate a two-dimensional table referred to as an observation probability table.

For example, with the state transition probability table in FIG. 7, each of the nodes described in the vertical direction in the drawing represents a transition source node, and each of the nodes described in the horizontal direction in the drawing represents a transition destination node. Accordingly, for example, a numeric value described in n row m column of the state transition probability table represents a probability that transition may be made from the node of index n (the n'th node) to the node of index m (the m'th node). Totaling of all of the numeric values described in each row (e.g., n'th row) of the state transition probability table is arranged to become 1.

Also, for example, a numeric value described in n row p column of the observation probability table in FIG. 7 represents a probability that the observation symbol of index p (the p'th observation symbol) may be observed at the node of index n (the n'th node). Totaling of all of the numeric values described in each row (e.g., n'th row) of the observation probability table is arranged to become 1.

Figure 8:
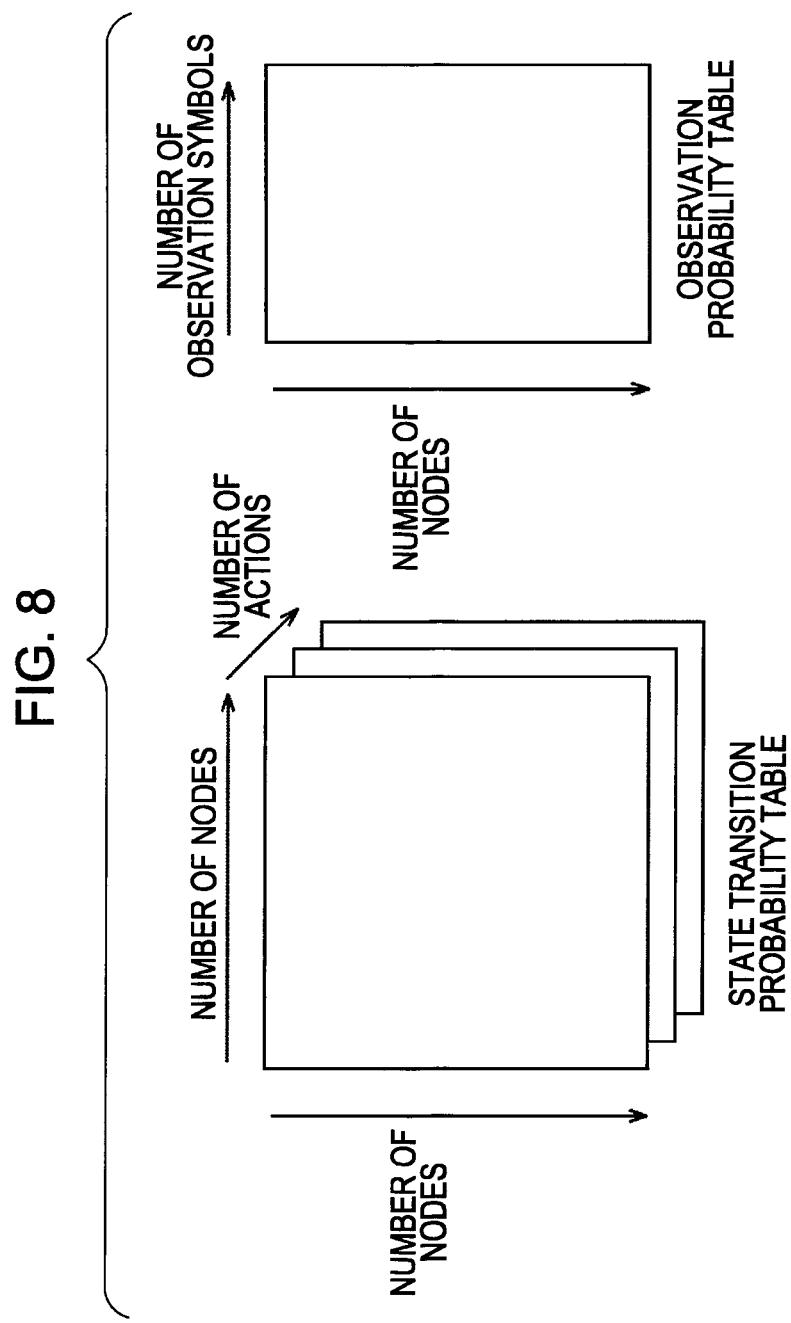
FIG. 8 is a diagram for describing an action expanded HMM.

FIG. 8 is a diagram for describing the action expanded HMM. As illustrated in the drawing, with the action expanded HMM, a state transition probability table is generated for each action. For example, as a result of an action such as upward movement, a probability that transition may be made from a certain node to another node is generated as a state transition probability table of the upward movement action. Also, as a result of an action such as downward movement, a probability that transition may be made from a certain node to another node is generated as a state transition probability table of the downward movement action. Similarly, the state transition probability table of a leftward movement action, and the state transition probability table of a rightward movement action are generated.

For example, in the event of viewing the state transition probability table in FIG. 8 as multiple sheets of two-dimensional tables, each of the nodes described in the vertical direction in the drawing represents a transition source node at each action, and each of the nodes described in the horizontal direction in the drawing represents a transition destination node. Accordingly, for example, a numeric value described in n row m column of the k'th sheet of the state transition probability table represents a probability that transition may be made from the node of index n to the node of index m by executing the action of index k (the k'th action). Totaling of all of the numeric values described in each row (e.g., the n'th row of the k'th sheet of the table) of the state transition probability table is arranged to become 1.

Thus, with the action expanded HMM, a two-dimensional state transition probability table is generated for each action, and accordingly, a so-called three-dimensional state transition probability table is generated.

Note that, with the action expanded HMM as well, in the same way as with the usual HMM, the value of an observation probability is set to each matrix position of a table of the number of nodes×the number of observation symbols to generate a two-dimensional observation probability table.

For example, a numeric value described in n row p column of the observation probability table in FIG. 8 represents a probability that the observation symbol of index p may be observed at the node of index n. Totaling of all of the numeric values described in each row (e.g., n'th row) of the observation probability table is arranged to become 1.

Here, description has been made regarding a case where a discrete observation signal is obtained in the event that 15 types of observation symbols are obtained based on sensor signals. However, for example, even in the event of obtaining a consecutive observation signal so as to obtain an almost infinite observation symbol based on a sensor signal that gradually changes, the action expanded HMM may be employed.

Also, description has been made here regarding a case where a discrete action group is executed in the event that the agent executes one of four types of actions. However, for example, even in the event of executing a consecutive action group so that the agent gradually changes the movement direction to execute one action out of almost infinite actions, the action expanded HMM may be employed. This ends the description of the action expanded HMM.

Figure 9:
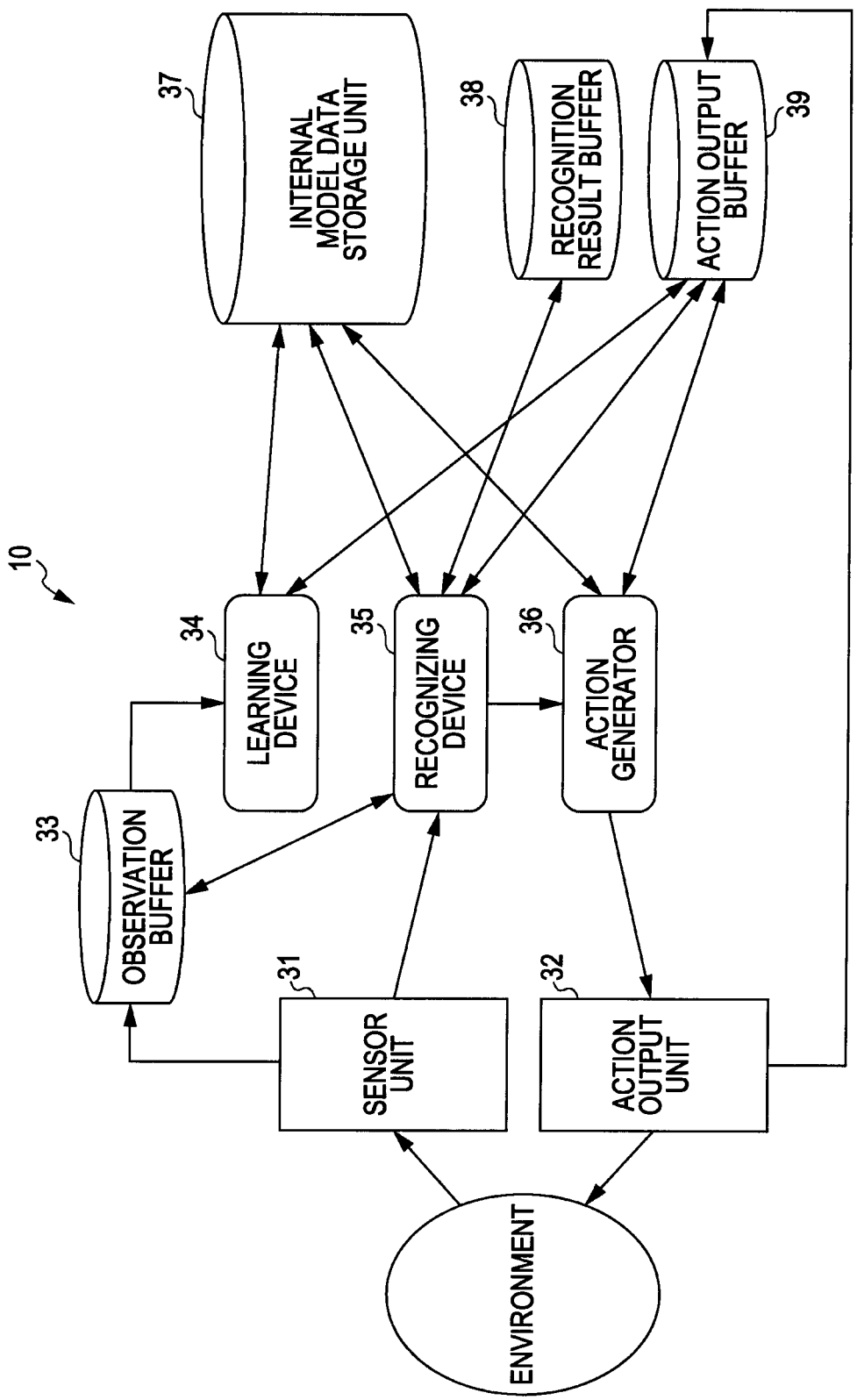
FIG. 9 is a block diagram illustrating a configuration example of an autonomous action learning device according to an embodiment of the present invention.

FIG. 9 is a block diagram illustrating a configuration example of an autonomous action learning device 10 to which an embodiment of the present invention has been applied. The autonomous action learning device 10 in the drawing is configured, for example, as the control device of a robot which moves on a maze such as illustrated in FIG. 1, or the like. With this example, a sensor unit 31, an action output unit 32, an observation buffer 33, a learning device 34, a recognizing device 35, an action generator 36, an internal model data storage unit 37, a recognition result buffer 38, and an action output buffer 39 are provided to the autonomous action learning device 10.

The sensor unit 31 outputs a sensor signal (or observation signal) for observing the above observation symbols under an environment such as a maze. The observation signal output from the sensor 31 is stored in the observation buffer 33 in a manner correlated with a point in time when the observation signal thereof was output. For example, observation symbols $o_t, o_{t+1}, o_{t+2}, \ldots, o_T$ corresponding to observation signals obtained at points in time t, t+1, t+2, ..., T are stored in the observation buffer 33 as an observation symbol at each point in time, respectively.

The action output unit 32 is, for example, a function block for outputting a control signal for having the robot execute an action to be executed the robot (action in Japanese). The control signal output from the action output unit 32 is converted into information determining the action corresponding to the control signal thereof, and is stored in the action output buffer 39 in a manner correlated with the point in time when the control signal thereof was output. For example, actions $c_t, c_{t+1}, c_{t+2}, \ldots, c_T$ executed at points in time t, t+1, t+2, ..., T are stored in the action output buffer 39 as an action at each point in time, respectively.

The learning unit 34 generates or updates internal model data based on the information stored in the observation buffer 33 and the action output buffer 39, and stores this in the internal model data storage unit 37.

The internal model data stored in the internal model data storage unit 37 includes the above three-dimensional state transition probability table, and the above two-dimensional observation probability table. Further, the internal model data stored in the internal model data storage unit 37 includes a later-described frequency variable for calculating a state transition probability, and a frequency variable for calculating an observation probability.

The recognizing device 35 recognizes a node where the robot is now located based on the information stored in the observation buffer 33 and the action output buffer 39, and the state transition probability table and the observation probability table stored in the internal model data storage unit 37. The recognition result output from the recognizing device 35 is stored in the recognition result buffer 38 in a manner correlated with the point in time when the recognition result was output.

The action generator 36 determines an action to be executed by the robot based on the internal model data stored in the internal model data storage unit 37, the information stored in the action output buffer 39, and the recognition result output from the recognizing device 35. Subsequently, the action generator 36 controls the action output unit 32 to output a control signal corresponding to the determined action. Thus, the autonomous action learning device 10, for example, allows the robot to move on a maze whereby the robot can automatically learn the configuration and the like of the maze.

Next, description will be made regarding the learning algorithm of the action expanded HMM at the learning device 34 in FIG. 9. With the usual HMM, modeling of a state transition probability from a node $s_i$ to a node $s_j$ is performed using a state transition probability table $a_{ij}$, but with the action expanded HMM, modeling is performed using action parameters c as $a_{ij}(c)$.

The Baum-Welch algorithm is employed as a learning algorithm. In the event that the calculations of a forward probability and a backward probability can be performed, parameter estimation based on the Baum-Welch algorithm (expected-value-maximization method) can be performed, and accordingly, the calculations of these probabilities will be described below.

Now, let us say that a probability that transition may be made from the node $s_i$ to the node $s_j$ by an action ck belonging to an action group $C=\{c_1, c_2, \ldots, c_n\}$ is represented with a three-dimensional probability expression table $a_{ij}(k) \equiv a_{ij}k$. Note that, in this case, a discrete action group will be executed.

First, the calculation of a forward probability will be described. Let us say that the observation symbols corresponding to sensor signals that the agent obtained at points in time $1, 2, \ldots, t-1$ are represented with $o_1, o_2, \ldots, o_{t-1}$, respectively. Also, let us say that actions that the agent has executed at points in time $1, 2, \ldots, t-1$ are represented with $c_1, c_2, \ldots, c_{t-1}$, respectively. In this case, a forward probability $\alpha_t(j)$ that the agent may be in the node $s_j$ when the observation symbol corresponding to a sensor signal that the agent obtained at point in time t is $o_t$, can be represented with the recurrence equation of Expression (1).

$$\alpha_t(j) = \sum_i \alpha_{t-1}(i) a_{ij}(c_{t-1}) b_j(o_t) \quad (1)$$

where $b_j(o)$ is an observation probability that observation symbols o may be obtained under the node $s_j$.

Next, the calculation of a backward probability will be described. In the case that the agent was in a state i at a point in time t, a backward probability $\beta_t(i)$ that the actions $c_t, c_{t+1}, \ldots, c_{T-1}$ may be executed at points in time t, t+1, t+2, ..., T−1 respectively, the observation symbols corresponding to sensor signals obtained at points in time may be $o_{t+1}, o_{t+2}, \ldots, o_T$, respectively, can be represented with the recurrence equation of Expression (2).

$$\beta_t(i) = \sum_j a_{ij}(c_t) b_j(o_{t+1}) \beta_{t+1}(j) \quad (2)$$

Estimation of a state transition probability, and estimation of an observation probability can be performed using the forward probability and backward probability thus calculated.

Estimation of a state transition probability, and estimation of an observation probability in the case of executing a discrete action group will be performed as follows.

Estimation of the state transition probability $a_{ij}(k)$ is performed by M-step of the Baum-Welch algorithm. Now, the state transition probability $a_{ij}(k)$ means a probability that when the agent is in the state i, transition may be made to a state j by executing an action k. Specifically, Expression (3) is calculated, whereby the estimated value $a'_{ij}(k)$ of the state transition probability can be obtained.

$$a'_{ij}(k) = \frac{\sum_{t:c_t=c_k} \alpha_t(i) a_{ij}(k) b_j(o_{t+1}) \beta_{t+1}(j)}{\sum_{t:c_t=c_k} \alpha_t(i) \beta_t(i)} \quad (3)$$

Estimation of an observation probability $b_j(o)$ is also performed by M-step of the Baum-Welch algorithm. Now, the observation probability $b_j(o)$ means a probability that when the agent is in the state j, sensor signals corresponding to the observation symbols o may be obtained. Specifically, Expression (4) is calculated, whereby the estimated value $b'_j(o)$ of the observation probability can be obtained.

$$b'_j(o) = \frac{\sum_{t:o_t=o} \alpha_t(j) \beta_t(j)}{\sum_{t=1}^{T} \alpha_t(j) \beta_t(j)} \quad (4)$$

Expression (4) is an example of a case where a discrete observation signal is obtained, but in the case of obtaining a consecutive observation signal, the parameters of the observation probability density function $b_j(o)$ should be estimated again using a signal distribution where the observation signal $o_t$ obtained at the point in time t is subjected to weighting by $\gamma_t(j)$ shown in Expression (5). Note that $\gamma_t(j)$ represents a weighting factor in the case that the agent is in the state j at the point in time t.

$$\gamma_t(j) \equiv \frac{\alpha_t(j)\beta_t(j)}{\sum_j \alpha_t(j)\beta_t(j)} \quad (5)$$

Usually, reestimation of the parameters of the observation probability density function $b_j(o)$ may be performed using a logarithm concave such as a Gaussian distribution, or elliptic symmetry probability density as a model.

As for the parameters of the model of a logarithm concave such as a Gaussian distribution, or elliptic symmetry probability density, a mean vector $\mu'_j$ and a covariance matrix $U'_j$ of the observation signals in the state j may be employed. The mean vector $\mu'_j$ and the covariance matrix $U'_j$ may be obtained by Expressions (6) and (7), respectively.

$$\mu'_j = \frac{\sum_{t=1}^T \gamma_t(j)o_t}{\sum_{t=1}^T \gamma_t(j)} \quad (6)$$

$$U'_j = \frac{\sum_{t=1}^T \gamma_t(j)(o_t - \mu_j)(o_t - \mu_j)^T}{\sum_{t=1}^T \gamma_t(j)} \quad (7)$$

Next, description will be made regarding a case where a consecutive action group is executed. In the case of consecutive actions, unlike the case of discrete actions, learning of a probability $\rho_k(c)$ that consecutive actions c may be output by discrete actions $c_k$ has to be performed. According to learning of the probability $\rho_k(c)$, as if the consecutive actions c may be labeled as the discrete actions $c_k$ (correlated with the discrete actions).

In the case of consecutive actions, the calculation of the forward probability will be performed as follows. Let us say that the observation symbols corresponding to sensor signals that the agent obtained at points in time 1, 2, ..., t−1 are represented with $o_1, o_2, \ldots, o_{t-1}$, respectively. Also, let us say that discrete actions estimated from continuous actions that the agent has executed at points in time 1, 2, ..., t−1 are represented with $c_1, c_2, \ldots, c_{t-1}$, respectively. In this case, a forward probability $\alpha_t(j)$ that the agent may be in the node $s_j$ when the observation symbol corresponding to a sensor signal that the agent obtained at point in time t is $o_t$, can be represented with the recurrence equation of Expression (8).

$$\alpha_t(j) = \sum_i \sum_k \alpha_{t-1}(i)\rho_k(c_{t-1})a_{ij}(k)b_j(o_t) \quad (8)$$

where $\rho_k(c)$ represents a probability that the consecutive actions c may be output by the discrete actions $c_k$. Note that how to obtain $\rho_k(c)$ will be described later.

In the case that the agent was in a state i at a point in time t, a backward probability $\beta_t(i)$ that discrete actions estimated from consecutive actions that the agent has executed may be actions $c_t, c_{t+1}, \ldots, c_{T-1}$ at points in time t, t+1, t+2, ..., T−1 respectively, the observation symbols corresponding to sensor signals obtained at points in time may be $o_{t+1}, O_{t+2}, \ldots, O_T$ respectively, can be represented with the recurrence equation of Expression (9).

$$\beta_t(i) = \sum_j \sum_k \rho_k(c_t)a_{ij}(k)b_j(o_{t+1})\beta_{t+1}(j) \quad (9)$$

Estimation of a state transition probability, and estimation of an observation probability in the cased of executing a consecutive action group will be performed as follows.

Estimation of the state transition probability $a_{ij}(k)$ is performed by M-step of the Baum-Welch algorithm in the same way as with the case of discrete actions. Now, the state transition probability $a_{ij}(k)$ means a probability that when the agent is in the state i, transition may be made to the state j by executing an action k. Specifically, Expression (10) is calculated, whereby the estimated value $a'_{ij}(k)$ of the state transition probability can be obtained.

$$a'_{ij}(k) = \frac{\sum_{t=1}^{T-1} \alpha_t(i)\rho_k(c_t)a_{ij}(k)b_j(o_{t+1})\beta_{t+1}(j)}{\sum_{t=1}^{T-1} \alpha_t(i)\rho_k(c_t)\beta_t(i)} \quad (10)$$

Estimation of the observation probability $b_j(o)$ is completely the same as with the case of discrete actions, and accordingly, description will be omitted here.

Next, description will be made regarding how to obtain the probability $\rho_k(c)$ that the consecutive actions c may be output by the discrete actions ck. The probability $\rho_k(c)$ may be performed by the M-step of the Baum-Welch algorithm. Specifically, estimation may be made in the same method as with estimation of an observation probability in the case of consecutive observation signals.

The probability $\rho_k(c)$ should be estimated using a signal distribution obtained by weighing an action ct to be executed at a point in time t using $\xi_t(i, j, k)$ shown in Expression (11).

$$\xi_t(i, j, k) \equiv \frac{\alpha_t(i)\rho_k(c_t)a_{ij}(k)b_j(o_{t+1})\beta_{t+1}(j)}{\sum_i \sum_j \sum_k \alpha_t(i)\rho_k(c_t)a_{ij}(k)b_j(o_{t+1})\beta_{t+1}(j)} \quad (11)$$

The probability $\rho_k(c)$ may be estimated using a Gaussian distribution or the like as a model in the same way as with the case of the observation probability.

In this case, a mean vector $v_k$ and a covariance matrix $V'_k$ of the action signals generated by discrete actions $c_k$ obtained by labeling the consecutive actions c are calculated by Expressions (12) and (13), respectively. The thus calculated mean vector $v_k$ and covariance matrix $V'_k$ of the action signals should be employed as the parameters of a model such as a Gaussian distribution.

$$v'_k = \frac{\sum_{t=1}^{T-1} \xi_t(i, j, k)c_t}{\sum_{t=1}^{T-1} \xi_t(i, j, k)} \quad (12)$$

$$V'_k = \frac{\sum_{t=1}^{T-1} \xi_t(i, j, k)(c_t - v_k)(c_t - v_k)^T}{\sum_{t=1}^{T-1} \xi_t(i, j, k)} \quad (13)$$

In this way, the three-dimensional state transition probability table, and the two-dimensional observation probability table of the action extended HMM can be generated by learning. According to the learning algorithm of the action expanded HMM described so far, a state transition probability and an observation probability can be obtained in the same way as with the usual HMM.

However, if we say that the number of states (number of nodes) is N, the number of observation symbols is M, and the number of actions is K, the number of parameters to be calculated of the three-dimensional state transition probability table, and the two-dimensional observation probability table is $N^2K+NM$. Thus, with the action expanded HMM, it is apparent that as the number of N, M, and K increase, the load of learning processing increases at an accelerating pace. For example, with an environment where N is 250 or so, M is 15 or so, and K is 5 or so, parameters on the scale of 300000 has to be calculated. It is very difficult to suitably determine so many parameters out of a few samples.

However, for example, the flexibility of the parameters is decreased by applying constraint to a model, whereby learning can be stabilized. Next, description will be made regarding a technique used for effectively and suitably performing learning of the action expanded HMM inevitably having a large scale.

With an embodiment of the present invention, one-state one-observation constraint and action transition constraint will be imposed on learning of the action expanded HMM.

First, the one-state one-observation constraint will be described. The one-state one-observation constraint is, for example, constraint wherein the number of observation symbols to be observed at a certain node is restricted to one as a rule. Note that even under the one-state one-observation constraint, the same observation symbol is permitted to be observed at different nodes.

An event expression method is restricted by imposing the one-state one-observation constraint on learning of the action expanded HMM, and as a result, the flexibility of parameters to be used for generating a state transition probability table and an observation probability table is reduced.

Examples of a method for realizing one-state one-observation constraint include a method wherein a constraint term that makes an observation probability sparse is added to an objective function, in the way performed in learning of the discrete observed HMM.

For example, a method can be conceived wherein a constraint term $\Sigma_j H(b_j)$ that makes an observation probability sparse, multiplied by weight $\lambda$, is added to an objective function. Here, $H(b_j)$ is entropy to be defined as to an observation probability vector $b_j$ as to all the observation symbols that can be observed at the node $s_j$. In addition to this, a method can be conceived wherein difference $\Sigma_j(\|b_j\|_1 - \|b_j\|_2)$ between normed L1 and normed L2 of the observation probability vector bj, or the like is taken as a constraint term.

Alternatively, a method other than the above method wherein the constraint term $\Sigma_j H(b_j)$ that makes an observation probability sparse, multiplied by weight $\lambda$ is added to an objective function, may also realize the one-state one-observation constraint. An example for applying a split algorithm can be conceived as an example of such a method.

Figure 10:
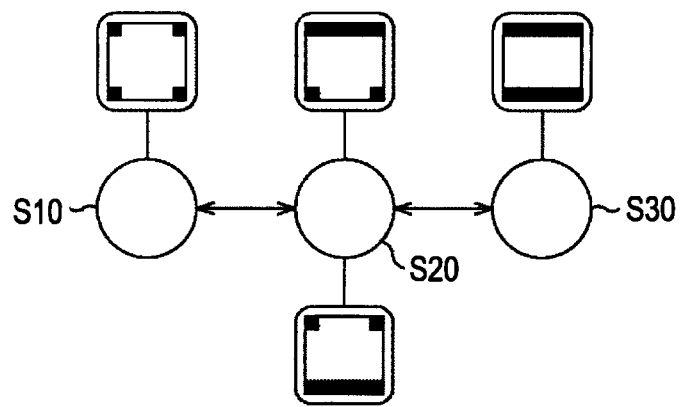
FIG. 10 is a diagram for describing an application of a split algorithm.
Figure 11:
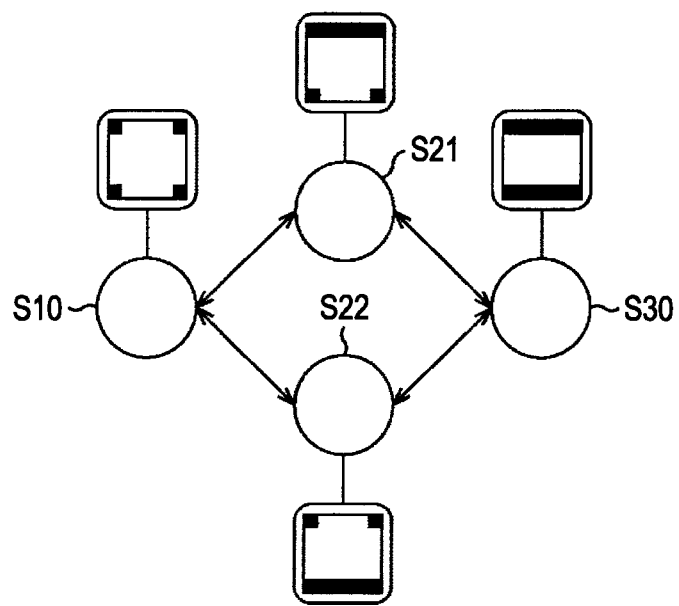
FIG. 11 is a diagram for describing an application of the split algorithm.

FIGS. 10 and 11 are diagrams for describing the split algorithm. In FIGS. 10 and 11, nodes are indicated by a circle in the drawing, and the figures of the parts described with reference to FIG. 2 are displayed as symbols to be observed at each node.

FIG. 10 is a diagram visualizing the contents of the state transition probability table and the observation probability table obtained as a result of learning of the agent. The example in FIG. 10 illustrates an example in the case that there are a node S10, a node S20, and a node S30. In the case of this example, the part of a crossroad (part 15 in FIG. 2) is observed at the node S10 with a probability of 100%, and upon executing an action for moving in the right direction at the node S10, the agent moves (transitions) to the node S20 with a probability of 100%.

Also, the part 7 and part 14 in FIG. 2 are observed at the node S20 with a probability of 50%, respectively. Upon executing an action for moving in the right direction at the node S20, transition is made to the node S30 with a probability of 100%, and upon executing an action for moving in the left direction at the node S20, transition is made to the node S10 with a probability of 100%.

Further, the part 5 in FIG. 2 is observed at the node S30 with a probability of 100%, and upon executing an action for moving in the left direction at the node S30, transition is made to the node S20 with a probability of 100%.

Note that FIG. 10 (FIG. 11 also the same) is a diagram visualizing the contents of the state transition probability table and the observation probability table, and actually, the state transition probability table and the observation probability table corresponding to FIG. 10 are learned as internal model data. In the event of applying the split algorithm to such internal model data, the contents of the state transition probability table and the observation probability table are changed such as illustrated in FIG. 11.

FIG. 11 is a diagram visualizing the contents of the state transition probability table and the observation probability table obtained in the case of applying the split algorithm to the contents of the state transition probability table and the observation probability table corresponding to FIG. 10.

With the example in FIG. 11, there are a node S10, a node S21, a node S22, and a node S30. Specifically, the node S20 in FIG. 10 is split into the node S21 and the node S22 in FIG. 11. In the case of this example, the part 15 in FIG. 2 is observed at the node S10 with a probability of 100%, and upon executing an action for moving in the right direction at the node S10, transition is made to the node S21 with a probability of 50%, and transition is made to the node S22 with a probability of 50%.

Also, the part 7 in FIG. 2 is observed at the node S21 with a probability of 100%, and upon executing an action for moving in the right direction at the node S21, transition is made to the node S30 with a probability of 100%, and upon executing an action for moving in the left direction, transition is made to the node S10 with a probability of 100%.

The part 13 in FIG. 2 is observed at the node S22 with a probability of 100%, and upon executing an action for moving in the right direction at the node S22, transition is made to the node S30 with a probability of 100%, and upon executing an action for moving in the left direction, transition is made to the node S10 with a probability of 100%.

Further, the part 5 in FIG. 2 is observed at the node S30 with a probability of 100%, and upon executing an action for moving in the left direction at the node S30, transition is made to the node S21 with a probability of 50%, and transition is made to the node S22 with a probability of 50%. Thus, the one-state one-observation constraint can be realized by applying the split algorithm.

Specifically, application of the split algorithm is equivalent to processing for obtaining a local optimum solution eventually satisfying the one-state one-observation constraint by repeating processing for applying the one-state one-observation constraint to the local optimum solution obtained by the expected-value-maximization method to subject a corrected solution to local optimization based on the expected-value-maximization method again.

Note that, with the example described above with reference to FIGS. 10 and 11, description has been made wherein division is performed so that the observation probability of observation symbols to be observed at each node is set to 100%, but actually, it is rare that the observation probability of observation symbols is set to 100%. This is because, with the one-state one-observation constraint, the number of observation symbols to be observed at one node is constantly not restricted to one in a strict sense. That is to say, the one-state one-observation constraint is for enabling, even in the case that the number of observation symbols to be observed at one node is more than one, the observation probability of one observation symbol thereof to be equal to or greater than a threshold.

Description will be made regarding processing in the case that the split algorithm is applied to the internal model data by the learning device 34 in FIG. 9, with reference to the flowchart in FIG. 12.

In step S101, the learning device 34 refers to the observation probability table stored in the internal model data storage unit 37 to find one node $s_j$ of which the maximum value of the observation probability $b_j$ is equal to or smaller than a threshold th1.

In step S102, the learning device 34 determines as a result of the processing in step S101 whether or not the node $s_j$ of which the maximum value is equal to or smaller than the threshold th1 has been found, and in the case that finding has been determined, the processing proceeds to step S103.

In step S103, the learning device 34 refers to the observation probability table to check the observation probability of each observation symbol at the node $s_j$ determined to have been found in step S102. Subsequently, the learning device 34 counts the number of observation symbols of which the observation probability is equal to or greater than a threshold th2, and lists these observation symbols. For example, in the case that there are K observation symbols of which the observation probability is equal to or greater than the threshold th2, the observation symbols $o_k$ (k=1, . . . , K) are listed.

In step S104, the learning device 34 divides the node $s_j$ into K nodes.

At this time, the observation probability of the observation probability table after the node $s_j$ was divided, and the state transition probability of the state transition probability table will be set as follows.

Of the K nodes obtained as a result of the node $s_j$ being divided, let us say that the k'th node is represented as $s_j^k$, and a vector with the observation probability of each observation symbol to be observed at the node $s_j^k$ as an element is represented as $b_j^k$.

In step S104, the learning device 34 sets the vector $b_j^k$ so as to become a uniform random number in a range wherein only the observation probability as to the observation symbol $o_k$ is prominently great (extremely approximate to 1), and the observation probability as to other observation symbols is extremely minute.

Also, let us say that a state transition probability from the node $s_i$ before the node $s_j$ is divided to the node $s_j$ is represented with $a_{ij}$, and let us say that a state transition probability from the node $s_i$ after the node $s_j$ is divided to the node $s_j^k$ is represented with $a_{ij}^k$.

In step S104, the learning device 34 sets the state transition probability so that $a_{ij}^k$ becomes a value obtained by dividing proportionally the state transition probability $a_{ij}$ before division by the ratio of the observation probability of each observation symbol before division.

Further, let us say that a state transition probability from the node $s_j$ before the node $s_j$ is divided to the node $s_i$ is represented with $a_{ji}$, and let us say that a state transition probability from the node $s_j^k$ after the node $s_j$ is divided to the node $s_i$ is represented with $a_{ji}^k$.

In step S104, the state transition probability $a_{ji}$ is set to each of the K state transition probabilities $a_{ji}^k$. Thus, the split algorithm application processing is executed.

Next, action transition constraints will be described. The action transition constraints are constraints presupposing that the one-state one-observation constraint has been imposed. The action transition constraints are constraints that different observation symbols $o_j$ (j=1, . . . , J) have to be observed at transition destination nodes $s_j$ (j=1, . . . , J) to which state transition can be made from a certain node $s_i$ by the same action $c_k$, or transition source nodes $s_j$ ((j=1, . . . , J) from which state transition can be made to the node $s_i$ by the same action $c_k$. The former will be referred to as a forward constraint, and the latter will be referred to as a backward constraint. That is to say, under the action transition constraints, the same observation symbol is not permitted to be observed at multiple transition destination (or transition source) nodes to (or from) which transition can be made by the same action $c_k$. Note that that even under the action transition constraints, multiple transition destination nodes to which transition can be made by the same action ck are permitted to be present if the nodes are nodes for observing a different observation symbol.

An example for applying the forward merging algorithm or backward merging algorithm can be conceived as an example of a method for realizing the action transition constraints.

Figure 13:
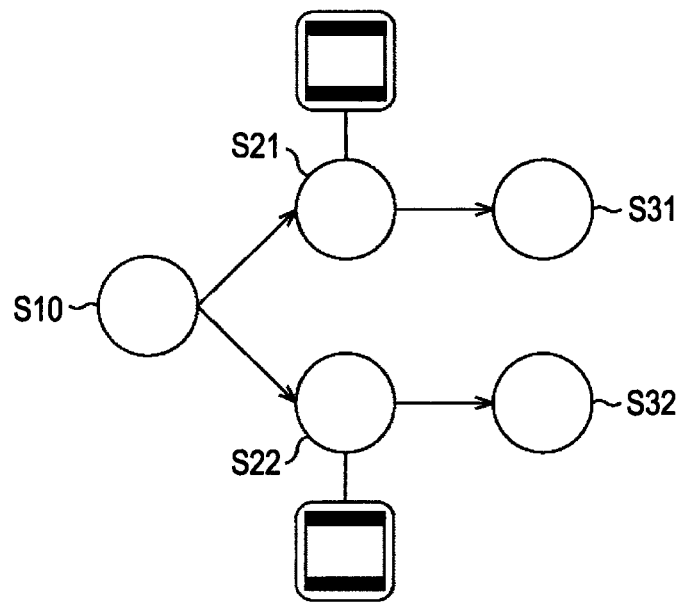
FIG. 13 is a diagram for describing an application of a forward merging algorithm.
Figure 14:
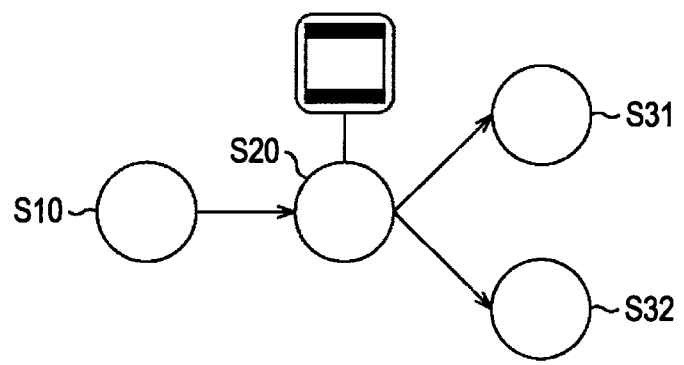
FIG. 14 is a diagram for describing an application of the forward merging algorithm.

FIGS. 13 and 14 are diagrams for describing the forward merging algorithm. In FIGS. 13 and 14, nodes are illustrated with a circle in the drawing, the figures of the parts described above with reference to FIG. 2 are displayed as symbols to be observed at each node.

FIG. 13 is a diagram visualizing the contents of the state transition probability table and the observation probability table obtained as the learning results of the agent. The example in FIG. 13 illustrates an example in the case that there are a node S10, node S21, node S22, node S31, and node S32. In the case of this example, upon executing an action for moving in the right direction at the node S10, transition is made to the node S21 with a probability of 50%, and transition is made to the node S22 with a probability of 50%.

The part 5 in FIG. 2 is observed at the node S21 with a probability of 100%, and is also observed at the node S22 with a probability of 100%.

Further, upon executing an action for moving in the right direction at the node S21, transition is made to the node S31 with a probability of 100%, and upon executing an action for moving in the right direction at the node S22, transition is made to the node S32 with a probability of 100%.

Note that FIG. 13 (FIG. 14 is also the same) is a diagram visualizing the contents of the state transition probability table and the observation probability table, and actually, the state transition probability table and the observation probability table corresponding to FIG. 13 are learned as internal model data. In the event of applying the forward merging algorithm to such internal mode data, the contents of the state transition probability table and the observation probability table are changed such as illustrated in FIG. 14.

FIG. 14 is a diagram visualizing the contents of the state transition probability table and the observation probability table obtained by applying the forward merging algorithm to the contents of the state transition probability table and the observation probability table corresponding to FIG. 13.

With the example in FIG. 14, there are a node S10, node S20, node S31, and node S32. Specifically, the nodes S21 and S22 in FIG. 13 are merged into the node S20 in FIG. 14. In the case of this example, the part 5 in FIG. 2 is observed at the node S20 with a probability of 100%, and upon executing an action for moving in the right direction at the node S10, transition is made to the node S20 with a probability of 100%.

Also, upon executing an action for moving in the right direction at the node S20, transition is made to the node S31 with a probability of 50%, and transition is made to the node S32 with a probability of 50%. Thus, a forward constraint of the action transition constraints can be realized by applying the forward merging algorithm.

Specifically, under the action transition constraints, the same observation symbol is not permitted to be observed at multiple transition destination nodes to which transition can be made by the same action $c_k$, and accordingly, the nodes S21 and S22 in FIG. 13 are merged into the node S20 in FIG. 14. Note that, even if we say that there is a node S23 to which transition is made by an action for moving in the right direction being executed at the node S10, when observing a part other than the part 5 at the node S23, the node S23 does not become an object to be merged. Even under the action transition constraints, as long as nodes for observing a different observation symbol, multiple transition destination nodes to which transition can be made by the same action $c_k$ are permitted.

That is to say, nodes having a similar observation probability distribution at each of transition destination nodes to which transition can be made in the case of a certain action being executed at one node are found, and the found nodes are merged.

Note that, with the examples described above with reference to FIGS. 13 and 14, description has been made wherein merging is performed so that a state transition probability to a node where a predetermined observation symbol is observed is set to 100%, but actually, it is rare that a state transition probability is set to 100%. This is because, with a forward constraint, the same observation symbol is not permitted to be observed at multiple transition destination nodes to which transition can be made by the same action $c_k$ in a strict sense.

Description will be made regarding processing in the case that the forward merging algorithm to the internal model data by the learning device 34 in FIG. 9, with reference to the flowchart in FIG. 15.

In step S121, the learning device 34 refers to the state transition probability table stored in the internal model data storage unit 37 to check the state transition probability table of a certain action $c_k$.

In step S122, the learning device 34 determines a certain transition source node $s_i$ out of the state transition probability table checked in the processing in step S121, and checks a vector $a_{ij}(k)$ with a state transition probability from the node $s_i$ to each transition destination node as an element. Subsequently, the learning device 34 lists transition destination nodes $s_j$ of which the state transition probability has a value equal to or greater than a threshold.

In step S123, the learning device 34 classifies the transition destination nodes listed in the processing in step S122 for each observation symbol.

Note that, such as described above, the action transition constraints are constraints presupposing that the one-state one-observation constraint has been imposed, and accordingly, an observation symbol to be observed at a transition destination node may be determined to be almost one.

In step S124, the learning device 34 merges nodes having the same observation symbol classified in the processing in step S123.

Specifically, let us say that a node group corresponding to an observation symbol m, merged into the processing in step S123, is represented with $s_j^{m,l}$ (l=1, ..., L), and thus, L nodes $s_j^{m,l}$ are merged into one node $s_j^m$.

At this time, the state transition probability of the state transition probability table, and the observation probability of the observation probability table after the L nodes $s_j^{m,l}$ are merged into one node $s_j^m$ will be set as follows.

The state transition probability $a_{ij}^m$ from the node $s_i$ to the node $s_j^m$ is obtained and set by Expression (14).

$$a_{ij}^m = \sum_l a_{ij}^{m,l} \qquad (14)$$

Now, let us say that $a_{ij}^{m,l}$ represents the state transition probability from the node $s_i$ before merging to one node $s_j^{m,l}$.

The state transition probability $a_{ji}^m$ from the node $s_j^m$ to the node $s_i$ is obtained as a simple mean of $a_{ji}^{m,l}$, or a weighted mean by $\Sigma_k a_{kj}^{m,l}$, and is set.

The observation probability $b_j^m$ of an observation symbol m at the node $s_j^m$ after the L nodes $s_j^{m,l}$ are merged into one node $s_j^m$ is obtained as a simple mean of $b_j^{m,l}$, or a weighted mean by $\Sigma_k a_{kj}^{m,l}$, and is set.

In step S124, the state transition probability $a_{ij}^m$, state transition probability $a_{ji}^m$, and observation probability $b_j^m$ are thus set. Thus, the forward merging algorithm application processing is executed.

Figure 16:
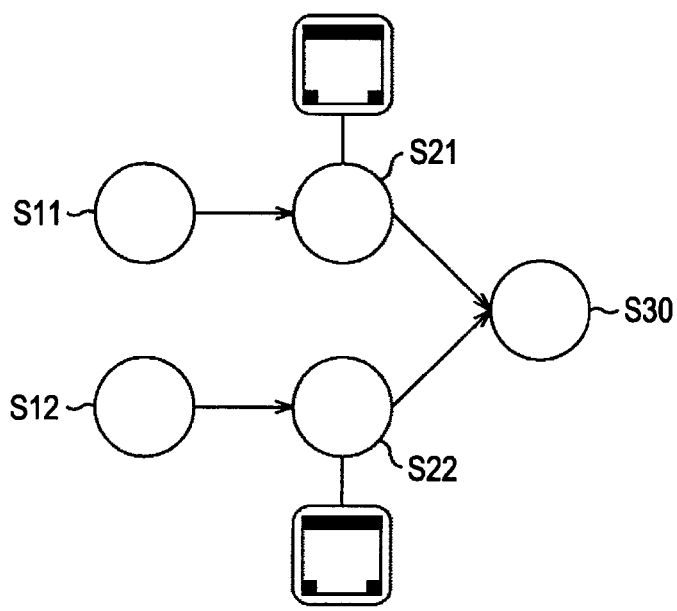
FIG. 16 is a diagram for describing an application of a backward merging algorithm.
Figure 17:
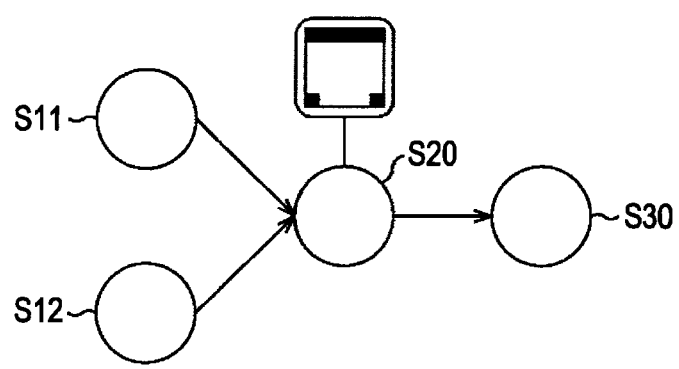
FIG. 17 is a diagram for describing an application of the backward merging algorithm.

FIGS. 16 and 17 are diagrams for describing the backward merging algorithm. In FIGS. 16 and 17, nodes are illustrated with a circle in the drawing, the figures of the parts described above with reference to FIG. 2 are displayed as symbols to be observed at each node.

FIG. 16 is a diagram visualizing the contents of the state transition probability table and the observation probability table obtained as the learning results of the agent. The example in FIG. 16 illustrates an example in the case that there are a node S11, node S12, node S21, node S22, and node S30. In the case of this example, upon executing an action for moving in the right direction at the node S11, transition is made to the node S21 with a probability of 100%. Upon executing an action for moving in the right direction at the node S12, transition is made to the node S22 with a probability of 100%.

The part 7 in FIG. 2 is observed at the node S21 with a probability of 100%, and is also observed at the node S22 with a probability of 100%.

Further, upon executing an action for moving in the right direction at the node S21, transition is made to the node S30 with a probability of 100%, and upon executing an action for moving in the right direction at the node S22, transition is made to the node S30 with a probability of 100%.

Note that FIG. 16 (FIG. 17 is also the same) is a diagram visualizing the contents of the state transition probability table and the observation probability table, and actually, the state transition probability table and the observation probability table corresponding to FIG. 16 are learned as internal model data. In the event of applying the backward merging algorithm to such internal mode data, the contents of the state transition probability table and the observation probability table are changed such as illustrated in FIG. 17.

FIG. 17 is a diagram visualizing the contents of the state transition probability table and the observation probability table obtained by applying the backward merging algorithm to the contents of the state transition probability table and the observation probability table corresponding to FIG. 16.

With the example in FIG. 17, there are a node S11, node S12, node S20, and node S30. Specifically, the nodes S21 and S22 in FIG. 16 are merged into the node S20 in FIG. 17. In the case of this example, the part 7 in FIG. 2 is observed at the node S20 with a probability of 100%.

Also, upon executing an action for moving in the right direction at the node S11, transition is made to the node S20 with a probability of 100%, and upon executing an action for moving in the right direction at the node S12, transition is made to the node S20 with a probability of 100%.

Further, upon executing an action for moving in the right direction at the node S20, transition is made to the node S30 with a probability of 100%. Thus, a backward constraint of the action transition constraints can be realized by applying the backward merging algorithm.

Specifically, under the action transition constraints, the same observation symbol is not permitted to be observed at multiple transition source nodes to which transition can be made by the same action $c_k$, and accordingly, the nodes S21 and S22 in FIG. 16 are merged into the node S20 in FIG. 17. Note that even if we say that there is a node S23 of which the transition is made to the node S30 by an action for moving in the right direction being executed, when observing a part other than the part 7 at the node S23, the node 23 does not become an object to be merged. Even under the action transition constraints, as long as nodes for observing a different observation symbol, multiple transition source nodes from which transition can be made by the same action $c_k$ are permitted.

That is to say, nodes having a similar observation probability distribution at each of transition source nodes from which transition can be made by a common action as to one node are found, and the found nodes are merged.

Description will be made regarding processing in the case that the backward merging algorithm to the internal model data by the learning device 34 in FIG. 9, with reference to the flowchart in FIG. 18.

In step S141, the learning device 34 refers to the state transition probability table stored in the internal model data storage unit 37 to check the state transition probability table of a certain action $c_k$.

In step S142, the learning device 34 determines a certain transition destination node $s_j$ out of the state transition probability table checked in the processing in step S141, and checks a vector $a_{ij}(k)$ with a state transition probability from each transition source node to the node $s_j$ as an element. Subsequently, the learning device 34 lists transition source nodes $s_i$ of which the state transition probability has a value equal to or greater than a threshold.

In step S143, the learning device 34 classifies the transition source nodes listed in the processing in step S142 for each observation symbol.

Note that, such as described above, the action transition constraints are constraints presupposing that the one-state one-observation constraint has been imposed, and accordingly, an observation symbol to be observed at a transition source node may be determined to be almost one.

In step S144, the learning device 34 merges nodes having the same observation symbol classified in the processing in step S143.

Specifically, let us say that a node group corresponding to an observation symbol m, merged into the processing in step S143, is represented with $s_i^{m,l}$ (l=1, ..., L), and thus, L nodes $s_i^{m,l}$ are merged into one node $s_i^m$.

At this time, the state transition probability of the state transition probability table, and the observation probability of the observation probability table after the L nodes $s_i^{m,l}$ are merged into one node $s_i^m$ will be set as follows.

The state transition probability $a_{ij}^m$ from the node $s_i^m$ to the node $s_j$ is obtained as a simple mean of $a_{ji}^{m,l}$, or a weighted mean by $\Sigma_k a_{ki}^{m,l}$, and is set. The state transition probability $a_{ji}^m$ from the node $S_j$ to the node $s_i^m$ is obtained by $\Sigma_l a_{ji}^{m,l}$ and is set. The observation probability $b_i^m$ of an observation symbol m at the node $s_i^m$ after the L nodes $s_i^{m,l}$ are merged into one node $s_i^m$ is obtained as a simple mean of $b_i^{m,l}$ or a weighted mean by $\Sigma_k a_{ki}^{m,l}$, and is set.

In step S144, the state transition probability $a_{ij}^m$, state transition probability $a_{ji}^m$, and observation probability $b_j^m$ are thus set. Thus, the backward merging algorithm application processing is executed. The load of learning processing can be reduced by thus imposing the one-state one-observation constraint and the action transition constraints.

FIG. 19 is a table for comparing the likelihoods of the state transition probability table and the observation probability table of the action expanded HMM. The leftmost column in the drawing represents the number of learning (number of trials). The column on the right side of the number of trials is a column of "first learning" where the values of the likelihoods of the state transition probability table and the observation probability table learned at the time of each of the number of trials are described. The column on the right side of the "first learning" is a column of "after splitting/merging". The values of the likelihoods of the state transition probability table and the observation probability table obtained by subjecting the state transition probability table and the observation probability table obtained by the "first learning" to the processing in FIGS. 12, 15, and 18 are described in this column. Further, the column on the right side of the "after splitting/merging" is a column of "increment". The difference between the likelihood value described in the column "after splitting/merging", and the likelihood value described in the column "first learning" are described in this column.

Figure 12:
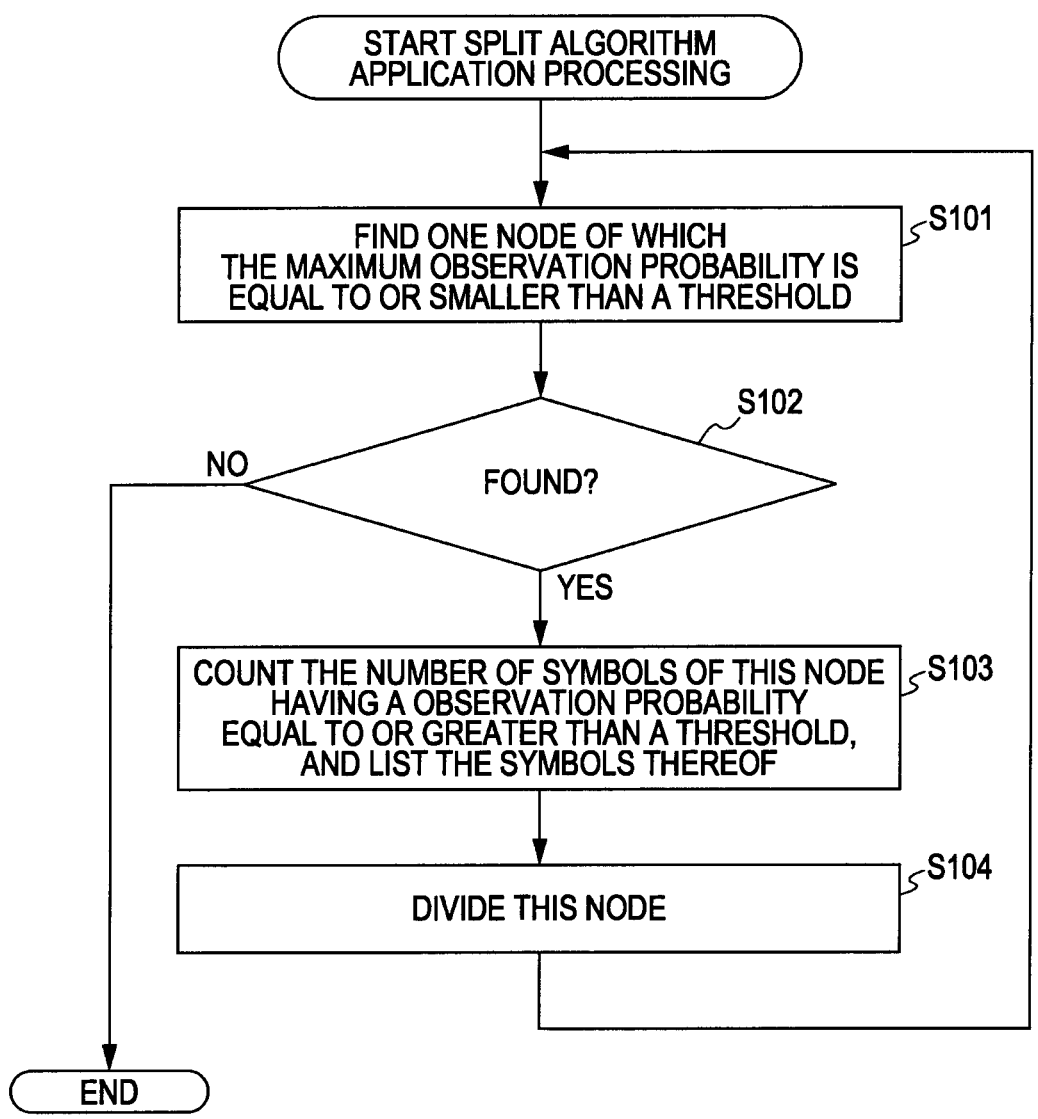
FIG. 12 is a flowchart for describing an example of split algorithm application processing.
Figure 15:
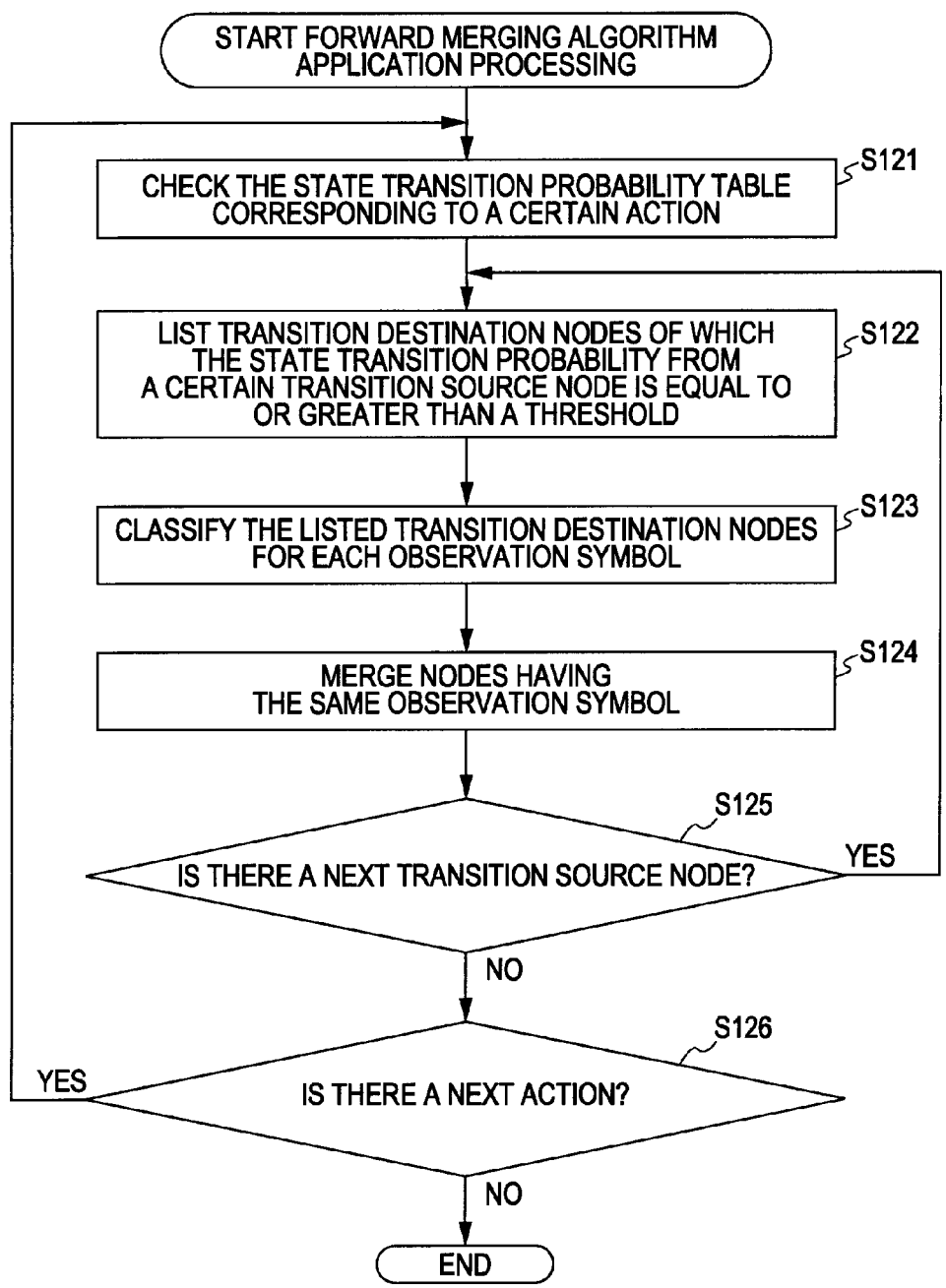
FIG. 15 is a flowchart for describing an example of forward merging algorithm application processing.
Figure 18:
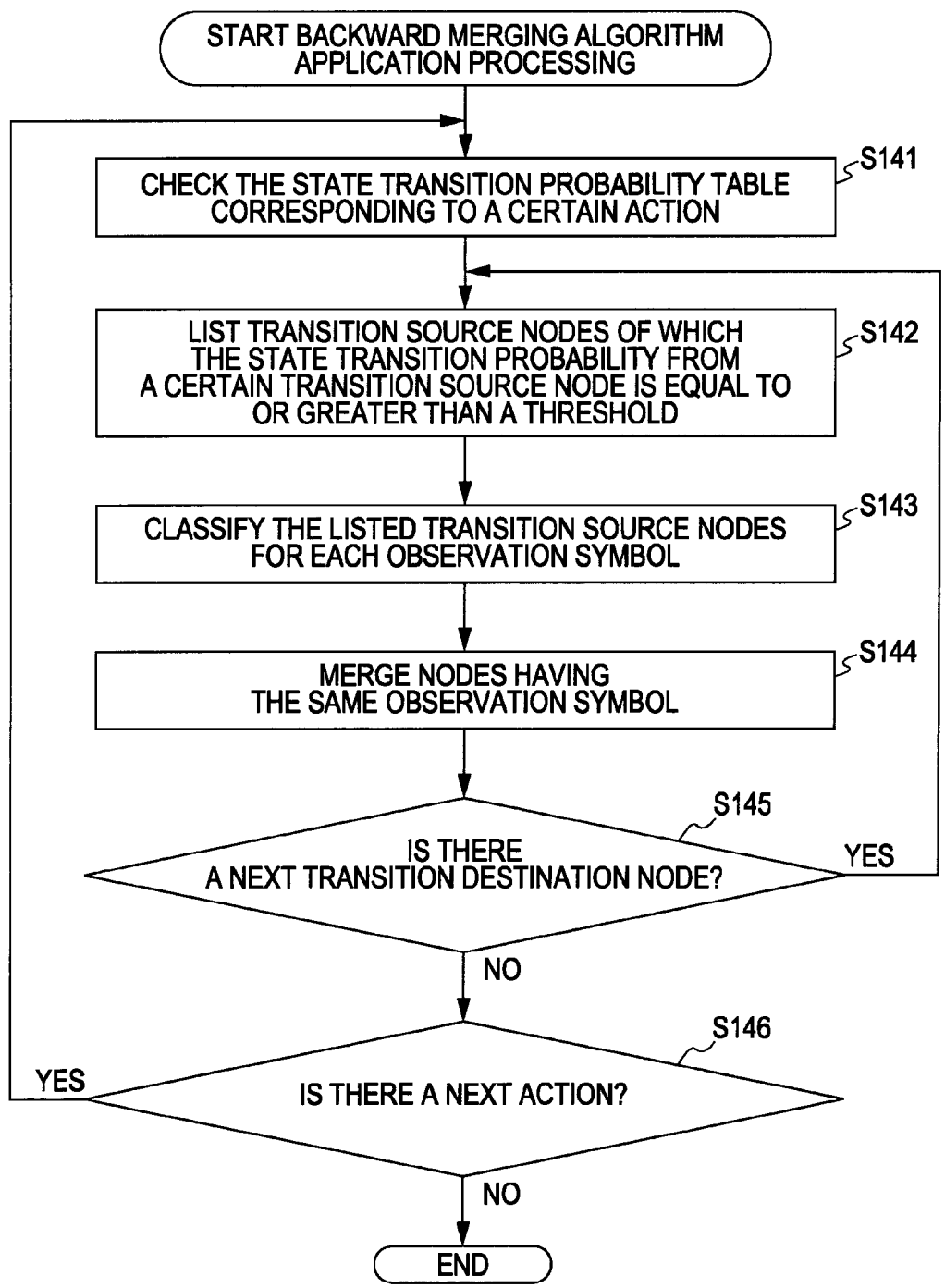
FIG. 18 is a flowchart for describing an example of backward merging algorithm application processing.

As illustrated in FIG. 19, it can be found that the likelihood is improved by subjecting to the processing in FIGS. 12, 15, and 18. Also, it can be found that the number of times where the likelihood value takes a value around "−60" by subjecting to the processing in FIGS. 12, 15, and 18. That is to say, in the event that learning has been performed so that the likelihood value takes a value around "−60", it can be said that the provided environment has been learned in the most suitable manner. On the other hand, the likelihood described in the column of the "first learning" is greatly changed in the value thereof each time learning is performed, and it can be found that even though learning is repeated, learning the given environment in the most suitable manner is difficult.

That is to say, the precision of the learning of the action expanded HMM can be improved by imposing the one-state one-observation constraint and the action transition constraints.

Figure 20:
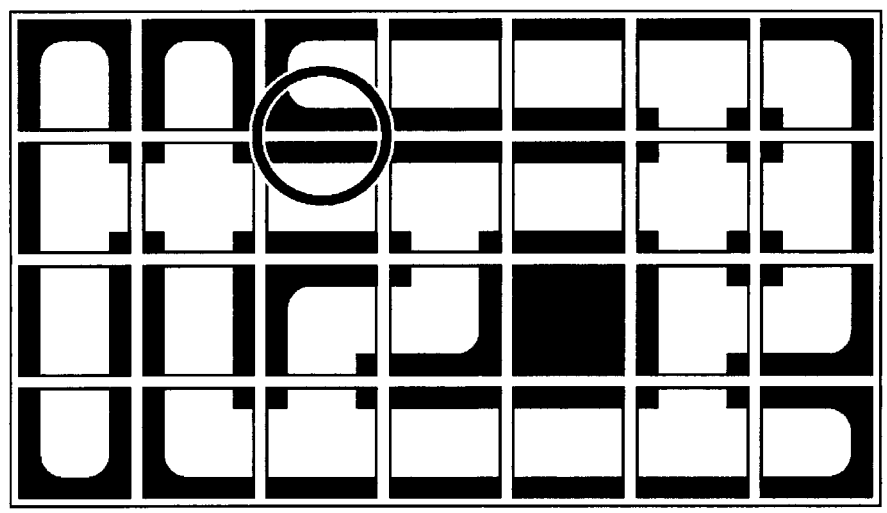
FIG. 20 is a diagram for describing change in learning results by imposing one-state one-observation constraint and action transition constraints.
Figure 21:
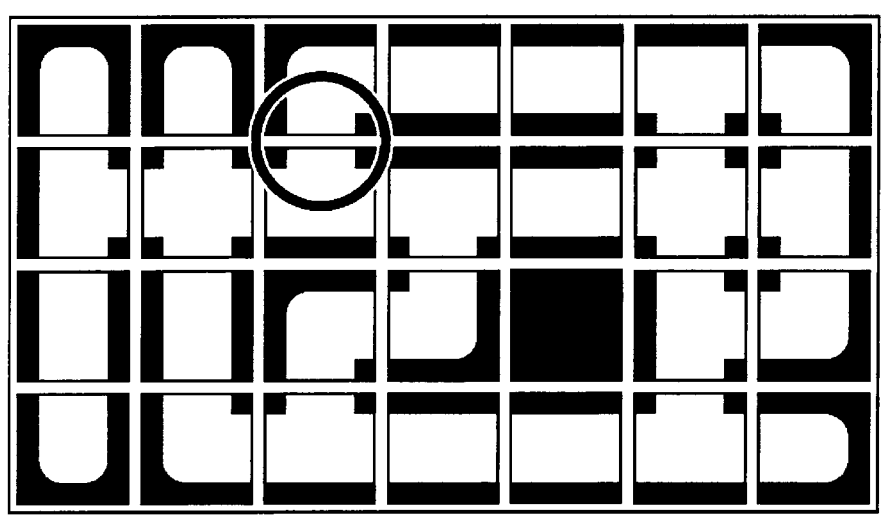
FIG. 21 is a diagram for describing change in learning results by imposing the one-state one-observation constraint and the action transition constraints.

FIGS. 20 through 26 are diagrams for describing change in the learning results by imposing the one-state one-observation constraint and the action transition constraints. Now, description will be made regarding a case where the part of a position illustrated by a circle in the drawing is changed of the maze illustrated in FIG. 20, and the agent is made to learn the maze changed in a configuration such as illustrated in FIG. 21 as an environment, as an example.

Figure 22:
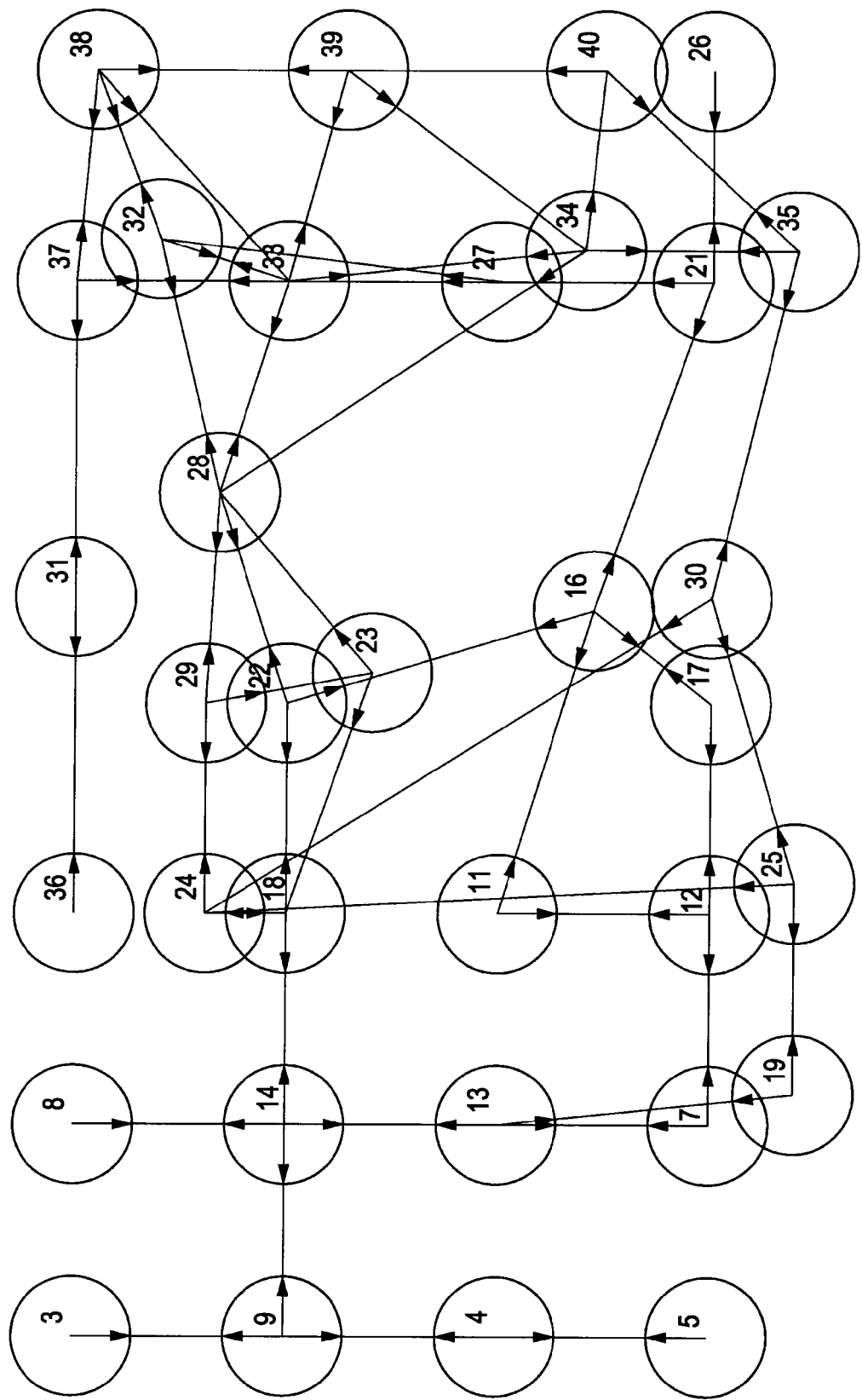
FIG. 22 is a diagram for describing change in learning results by imposing the one-state one-observation constraint and the action transition constraints.

FIG. 22 is a diagram visualizing the contents of the state transition probability table and the observation probability table of the agent which learned the environment illustrated in FIGS. 20 and 21. With the example in FIG. 22, nodes illustrated by a circle in the drawing, of which transition is made by an action in the direction expressed by a triangle in the drawing, are connected by a line. Also, a number illustrated in the inside of a circle in the drawing represents an index of the node illustrated by the circle thereof. The example in FIG. 22 is a diagram visualizing the contents of the state transition probability table and the observation probability table obtained without imposing the one-state one-observation constraint and the action transition constraints.

Figure 23:
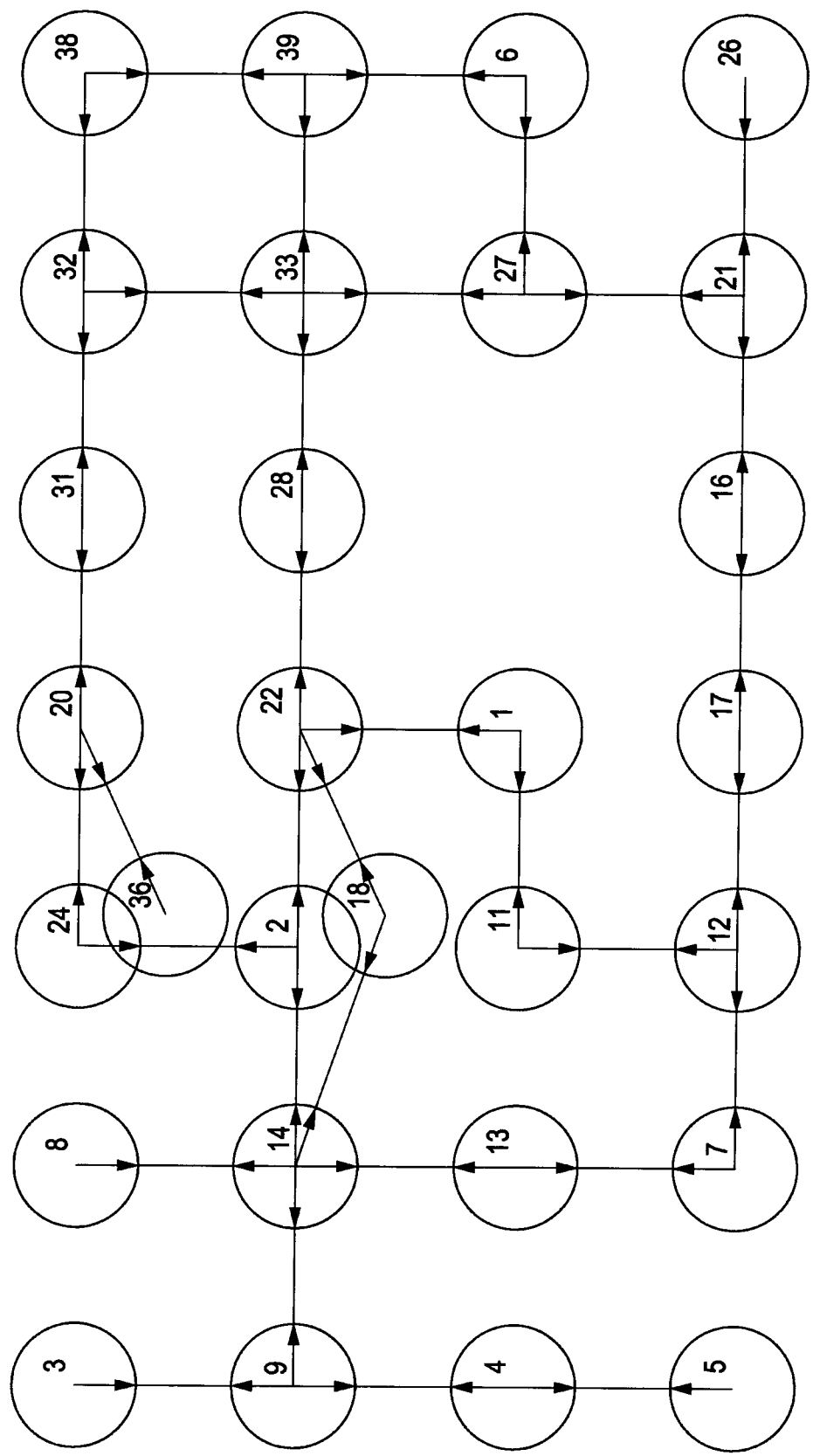
FIG. 23 is a diagram for describing change in learning results by imposing the one-state one-observation constraint and the action transition constraints.

On the other hand, FIG. 23 is a diagram visualizing the contents of the state transition probability table and the observation probability table obtained by subjecting the state transition probability table and the observation probability table corresponding to FIG. 22 to processing for imposing the one-state one-observation constraint and the action transition constraints.

In FIG. 23, the node 18 in FIG. 22 is divided into nodes 2 and 18. Also, in FIG. 23, the nodes 7 and 19 in FIG. 22 are merged into a node 7. Further, in FIG. 23, the nodes 12 and 25 in FIG. 22 are merged into a node 12.

Note that a time zone wherein the agent is moving through the maze for learning includes a time zone wherein the maze is configured such as illustrated in FIG. 20, and a time zone wherein the maze is configured such as illustrated in FIG. 21. Accordingly, the position of each node illustrated in FIG. 23 is not completely matched with the position of a part in FIG. 20 or 21. For example, it can be found to have suitably learned that the configuration of the maze can be changed by the nodes 24, 36, 2, and 18 in FIG. 23 depending on time zones.

Figure 24:
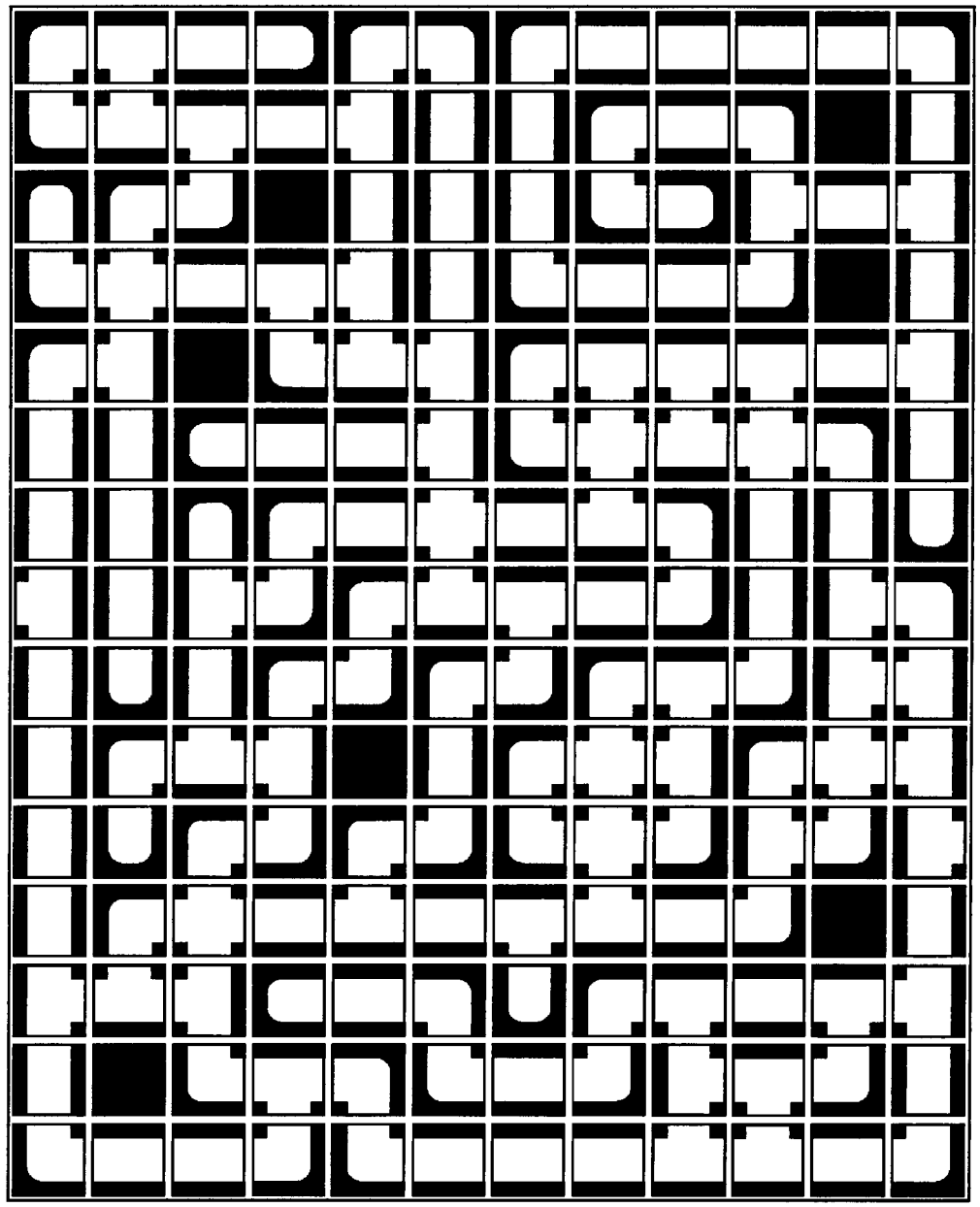
FIG. 24 is a diagram for describing change in learning results by the imposing one-state one-observation constraint and the action transition constraints.
Figure 25:
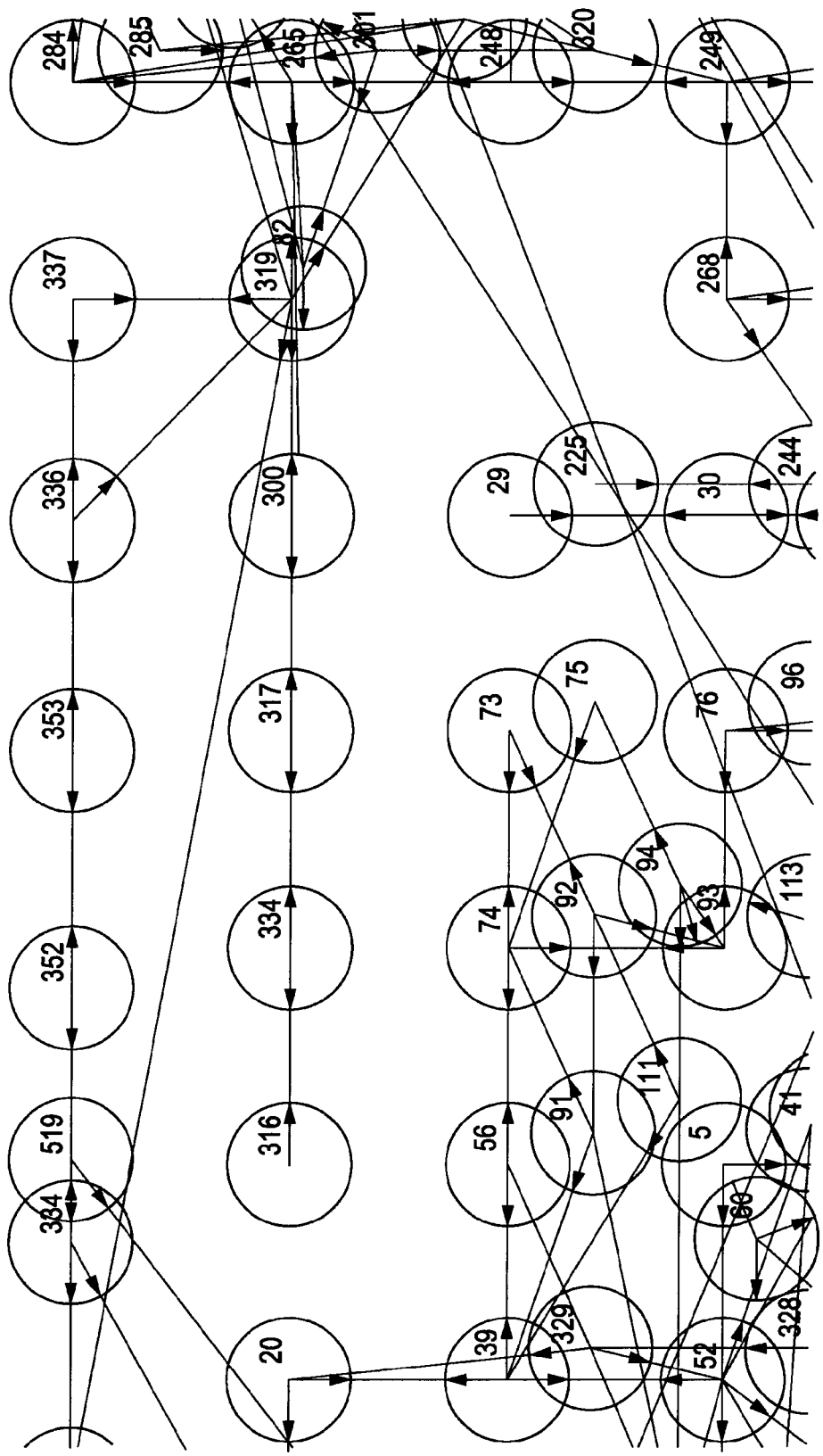
FIG. 25 is a diagram for describing change in learning results by imposing the one-state one-observation constraint and the action transition constraints.
Figure 26:
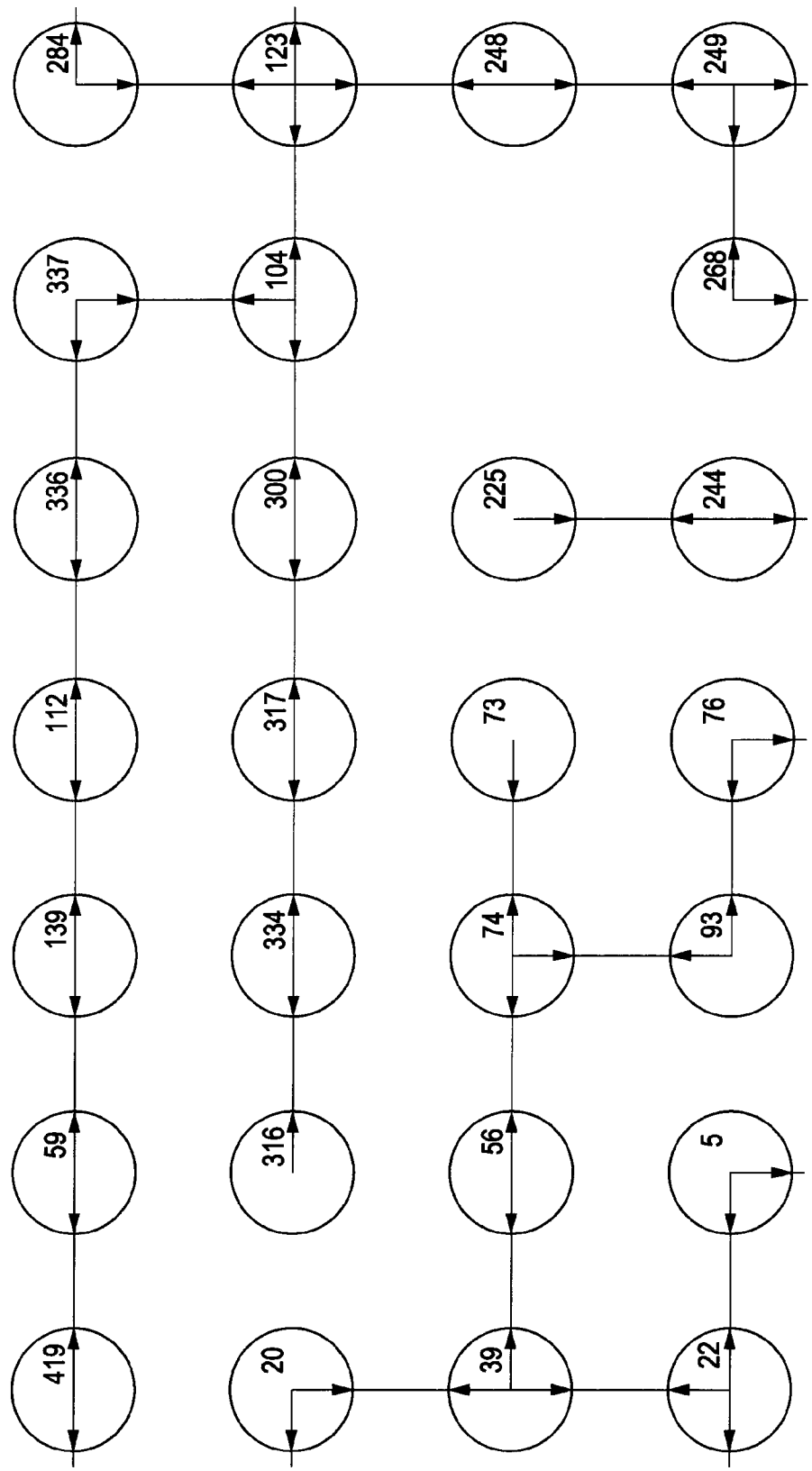
FIG. 26 is a diagram for describing change in learning results by imposing the one-state one-observation constraint and the action transition constraints.

In reality, mazes are further great in scale. For example, with a maze such as illustrated in FIG. 24 as an environment, the agent is made to learn the maze. In this case, the contents of the state transition probability table and the observation probability table obtained without imposing the one-state one-observation constraint and the action transition constraints are visualized such as illustrated in FIG. 25. On the other hand, the contents of the state transition probability table and the observation probability table obtained by imposing the one-state one-observation constraint and the action transition constraints are visualized such as illustrated in FIG. 26. It can be found that FIG. 26 has a configuration approximate to the configuration of an actual maze (FIG. 24) as compared to FIG. 25.

Figure 27:
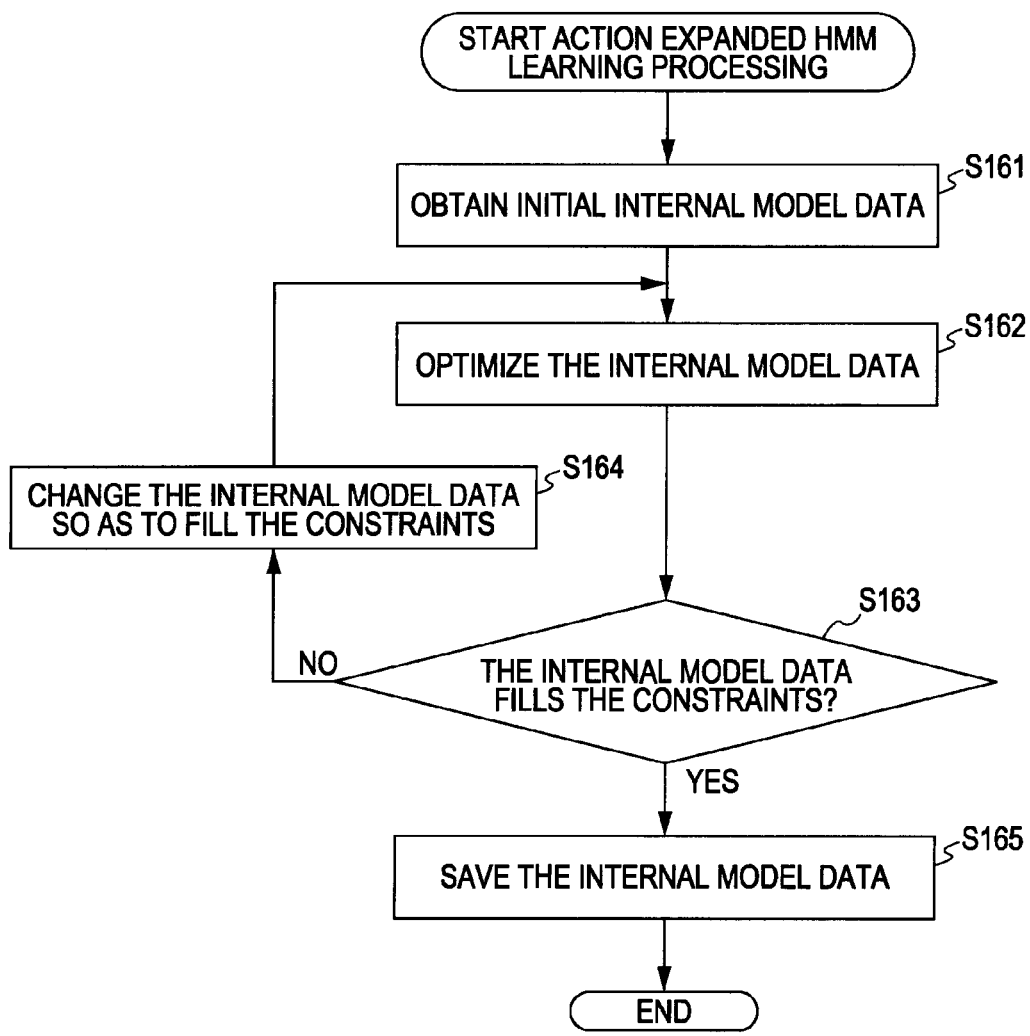
FIG. 27 is a flowchart for describing an example of action expanded HMM learning processing.

Description has been made so far regarding the technique used for effectively and suitably performing learning with action expanded HMM which inevitably has a great scale. Next, the learning processing of the action expanded HMM by the learning device 34 in FIG. 9 described so far will be described with reference to the flowchart in FIG. 27.

In step S161, the learning device 34 obtains initial internal model data. Here, the initial internal model data is, for example, a state transition probability table and an observation probability table immediately after being generated by the robot moving on a maze. A state transition probability and an observation probability to be set to the state transition probability table and observation probability table are generated, for example, based on information made up of a combination of an action that the robot executed at each point in time, and an observation symbol observed as a result of execution of the action thereof.

In step S162, the learning device 34 optimizes the internal model data obtained in the processing in step S161. At this time, each value of the state transition probability table and each value of the observation probability table are changed so as to be optimized, for example, by the maximum likelihood estimation method or the like.

In step S163, the learning device 34 determines whether or not the internal model data optimized in the processing in step S162 satisfies the above one-state one-observation constraint and action transition constraints.

For example, even in the event that there are multiple observation symbols observed at one node, when the observation probability of one of the observation symbols thereof is equal to or greater than a threshold, the one-state one-observation constraint is satisfied. Also, for example, with multiple transition destination nodes to which transition can be made by the same action, in the event that a probability that the same observation symbol may be observed is equal to or smaller than a threshold, the action transition constraints are satisfied.

In the event that determination is made in step S163 that the internal model data does not satisfy the above one-state one-observation constraint and action transition constraints, the processing proceeds to step S164.

In step S164, the learning device 34 changes the internal model data so as to satisfy the one-state one-observation constraint and action transition constraints. At this time, each value of the state transition probability table and each value of the observation probability table are changed, for example, by the processing described above with reference to FIGS. 12, 15, and 18.

After the processing in step S164, the processing returns to step S162. Subsequently, the processing in steps S162 through S164 is repeatedly executed until determination is made in step S163 that the one-state one-observation constraint and action transition constraints are satisfied.

In the event that determination is made in step S163 that the one-state one-observation constraint and action transition constraints are satisfied, the processing proceeds to step S165.

In step S165, the learning device 34 saves the internal model data in the internal model data storage unit 37. Thus, the learning processing of the action expanded HMM is executed.

Incidentally, there are a batch learning method and an additional learning method as a method for learning with HMM. Here, the batch learning method is a method for generating and saving a state transition probability table and an observation probability table based on the transition and observation of 10000 steps, in the event that data for transition and observation of 10000 steps has been obtained, for example. On the other hand, with the additional learning method, for example, a state transition probability table and an observation probability table are generated and saved based on the transition and observation of 1000 steps. Subsequently, based on the transition and observation of the subsequent 1000 steps, each value of the state transition probability table and observation probability table is changed and saved, and in this way, the internal model data is updated by repeatedly performing learning.

For example, in the case of learning of the action expanded HMM by a robot traveling through a maze by itself, or the like, learning by the additional learning method is requested. With learning by the batch learning method, it is implausibly difficult to learn change in the configuration of the maze, or the like in an adapted manner in principle, and in order to exhibit better performance under a changing environment, learning by the additional learning method for feeding back operation results is necessary.

Incidentally, a problem is not solved yet regarding how to integrate "learned storage configuration" and "new experience" at the time of performing additional learning. On the one hand, there is a request for realizing rapid response by reflecting "new experience", but on the other hand, there is risk that the storage configuration established so far may be destroyed.

Figure 28:
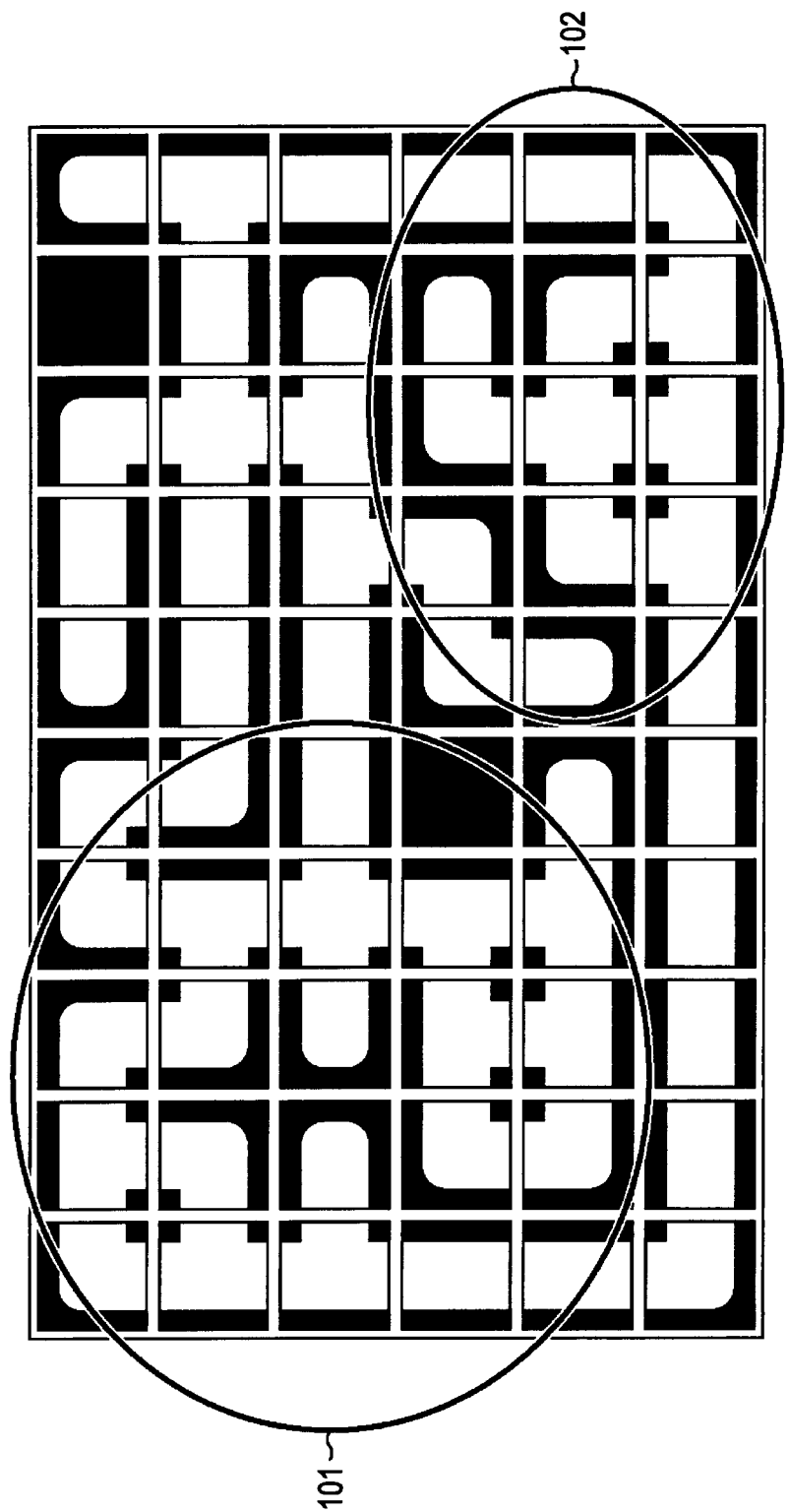
FIG. 28 is a diagram for describing a problem at the time of performing additional learning by a method according to the related art.

For example, in the event that a robot for learning the configuration of a maze such as illustrated in FIG. 28 continuously moves within a range illustrated by a circle 101 in the drawing after learning once to save the internal model data, the internal model data corresponding to the position in a range illustrated by a circle 102 may be destroyed. That is to say, the internal model data corresponding to the position in the range indicated by the circle 102 suitably learned and stored may erroneously be updated. With learning of the additional learning method, the internal model data is updated only based on the newly obtained transition and observation, and accordingly, a position within the range indicated by the circle 101 is erroneously recognized as a node corresponding to the position of the range indicated by the circle 102.

In order to handle such a problem, for example, heretofore, in order to perform learning by the additional learning method, the internal model data has been separately held corresponding to each range of the maze. Alternatively, learning has been performed, such as the internal model data obtained by learning in the past being rehearsed from the current memory, or the like.

However, employing the method according to the related art has caused a problem such that the "new experience" is not reflected on the separated past internal model data, or has been generated by the rehearsed past internal model data being influenced by the "new experience", or the like. Thus, with the method according to the related art, with regard to learning with large-scale HMM, it has been difficult for the internal model data to function as a practical model by performing additional learning. For example, in the event of carrying out batch learning of data used for the past learning and data to be used for new learning collectively, suitable learning results can be obtained, but in order to realize this, huge storage capacity and calculation amount are requested.

Next, description will be made regarding a technique for enabling learning by the additional learning method according to the action expanded HMM inevitably having a large scale to be performed in a stable manner.

With an embodiment of the present invention, the learning device 34 performs learning by the following additional learning method, whereby better performance can be exhibited under a changing environment, and also stable learning can be performed. Specifically, a later-described frequency variable for estimating a state transition probability, and a later-described frequency variable for estimating an observation probability are calculated and saved, whereby learning by the additional learning method according to the action expanded HMM can be performed in a stable manner.

Figure 29:
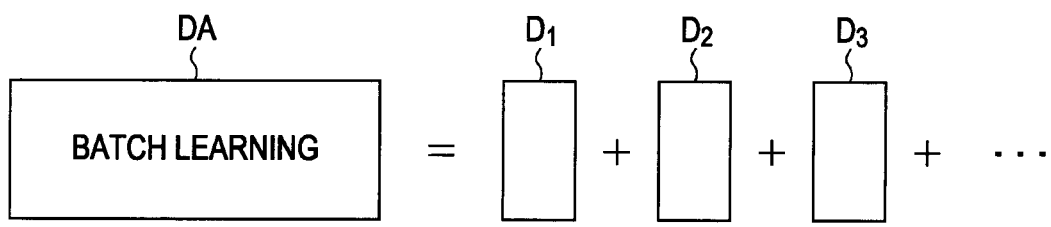
FIG. 29 is a diagram for describing an additional learning method according to an embodiment of the present invention.

Learning by the batch learning method is, in other words, obtained by adding the transitions obtained in multiple time zones, and learning based on observation. For example, it can be conceived that the whole data DA of the transition and observation to be used for learning by the batch learning method is configured such as illustrated in FIG. 29. Specifically, it can be conceived that the whole data DA is configured of a dataset $D_1$ obtained at a first time zone, a dataset $D_2$ obtained at a second time zone, and a dataset $D_3$ obtained at a third time zone, and so on.

Estimation of a state transition probability according to learning of the action expanded HMM is performed by the above Expression (3), but here, such as illustrated in FIG. 29, let us consider a case where a plurality of datasets are available such as illustrated in FIG. 29.

An estimated value $a'_{ij}(k)^{(n)}$ of the state transition probability of the n'th learned data set $D_n$ can be obtained by Expression (15).

$$a'_{ij}(k)^{(n)} = \frac{\sum_{t \in D_n, c_t = c_k} \alpha_t(i) a_{ij}(k) b_j(o_{t+1}) \beta_{t+1}(j)}{\sum_{t \in D_n, c_t = c_k} \alpha_t(i) \beta_t(i)} \quad (15)$$

Now, let us say that, with description of estimation of a state transition probability, $t \in Dn$ represents $(t, t+1 \in Dn)$ in the case that there is no reference in particular. Also, let us say that the learning dataset $D_n$ includes information representing an action executed at each point in time, a node at each point in time, and an observation symbol at each point in time.

It can be said that the numerator in Expression (15) represents, of the learned dataset $D_n$, the frequency of transition from a node i to a node j by executing an action $c_k$. On the other hand, it can be said that the denominator in Expression (15) represents, of the learned dataset $D_n$, the frequency of transition from the node i to another node by executing the action $c_k$.

Now, a variable $\chi_{ij}(k)^{(n)}$ representing an expression corresponding to the numerator in Expression (15) is defined as a variable indicated by Expression (16).

$$\chi_{ij}(k)^{(n)} \equiv \sum_{t \in D_n, c_t = c_k} \alpha_t(i) a_{ij}(k) b_j(o_{t+1}) \beta_{t+1}(j) \quad (16)$$

Expression (17) can be obtained from Expression (16).

$$\sum_{t \in D_n, c_t = c_k} \alpha_t(i) \beta_t(j) = \quad (17)$$

$$\sum_{t \in D_n, c_t = c_k} \sum_j \alpha_t(i) a_{ij}(k) b_j(o_{t+1}) \beta_{t+1}(j) = \sum_j \chi_{ij}(k)^{(n)}$$

Expression (18) can be derived from Expressions (17) and (15).

$$a'_{ij}(k)^{(n)} = \frac{\chi_{ij}(k)^{(n)}}{\sum_j \chi_{ij}(k)^{(n)}} \quad (18)$$

Thus, the estimated value of a state transition probability can be represented using the variable $\chi_{ij}(k)^{(n)}$.

Here, the variable $\chi_{ij}(k)^{(n)}$ is equivalent to the numerator in Expression (15), and it can be said that the variable $\chi_{ij}(k)^{(n)}$ represents the frequency of transition from the node i to the node j by executing the action ck within the learning data sets Dn, and accordingly, let us say that the variable $\chi_{ij}(k)^{(n)}$ will be referred to as a frequency variable for estimating a state transition probability.

With an embodiment of the present invention, in the event of performing learning by the additional learning method, in order to enable stable learning to be performed, the estimated value of a state transition probability is obtained using the above the frequency variable $\chi_{ij}(k)^{(n)}$. Specifically, each time the learning device 34 performs learning based on one learned dataset, the frequency variable is updated, and is stored and saved in the internal model data storage unit 37 as one of the internal model data.

That is to say, at the time of newly performing learning, the frequency variable corresponding to the past learned dataset is read out, and the value of the frequency variable is updated by adding a frequency variable obtained based on new learning thereto. Further, learning by the additional learning method is performed by obtaining the estimated value of a state transition probability to be obtained based on the updated frequency variable. In this way, generally the same results as with batch learning of learned datasets $D_1$, $D_2$, $D_3$, and so on being carried out collectively can be obtained.

Next, integration of each of the internal model data obtained by learning of multiple times will be described. Specifically, integration of estimated values $a'_{ij}(k)^{(1)}$, $a'_{ij}(k)^{(2)}$, ..., $a'_{ij}(k)^{(n)}$, and so on of state transition probabilities to be calculated based on the learning datasets $D_1$, $D_2$, ..., $D_n$, and so on will be described.

In such a case, for example, weight $w_n$ ($\Sigma w_n = 1$) is set, and such as shown in Expression (19), it can also be conceived that estimated values $a'_{ij}(k)^{(1)}$, $a'_{ij}(k)^{(2)}$, ..., $a'_{ij}(k)^{(n)}$, and so on of state transition probabilities are integrated.

$$a'_{ij}(k) = \sum_n w_n a'_{ij}(k)^{(n)} \quad (19)$$

Expression (19) means that the estimated values of state transition probabilities are multiplied by weights $w_1$, $w_2$, ..., $w_n$, and so on corresponding to the learned datasets respectively, and are added.

However, such as described above, with an embodiment of the present invention, the estimated values of the state transition probabilities to be obtained based on the frequency variables corresponding to the learned datasets are obtained, and accordingly, integration by Expression (19) is not suitable.

With an embodiment of the present invention, the estimated values of the state transition probabilities to be obtained based on the frequency variables corresponding to the learned datasets are obtained, and accordingly, integration has to be performed while taking the reliability of the estimated values of each of the state transition probabilities into consideration. That is to say, weight has to be set while taking the data amount (sequence length) of a learned dataset.

Also, the frequency variable corresponding to a learned dataset is varied according to the value of a state transition probability already set based on the past learning. For example, the value of a frequency variable obtained from a learned dataset in which a great number of transitions of which the state transition probability has a low value occurred inevitably and readily becomes a small value, and the value of a frequency variable obtained from a learned dataset in which a great number of transitions of which the state transition probability has a high value occurred inevitably and readily becomes a great value. This is because, such as described above, the frequency variable is represented by an expression corresponding to the numerator in Expression (15). Accordingly, weight has to be set while taking the magnitude of the value of the frequency variable into consideration.

With an embodiment of the present invention, the estimated value $a'_{ij}(k)$ of a state transition probability after integration is obtained by Expression (20).

$$a'_{ij}(k) = \frac{\chi_{ij}(k)}{\sum_j \chi_{ij}(k)}, \; \chi_{ij}(k) = \sum_n w_n \chi_{ij}(k)^{(n)} \quad (20)$$

At this time, such as described above, weight $w_n$ has to be taken into consideration. Specifically, the weight $w_n$ is set so as to satisfy relationship shown in Expression (21) regarding a frequency variable $\chi_{ij}(K)^{(n)}$ corresponding to the learning dataset $D_n$ of sequence length $T_n$.

$$w_n \sum_k \sum_i \sum_j \chi_{ij}(k)^{(n)} = T_n - 1 \quad (21)$$

Thus, in the event that, for each learned dataset, while adjusting the weight according to the sequence length of the learned data set thereof, the frequency variable $\chi_{ij}(K)^{(n)}$ is accumulated over all of the datasets, generally the same results as with batch learning of all of the data being carried out collectively can be obtained. Specifically, the frequency variable $\chi_{ij}(K)$ is obtained by Expression (22), and such as described above with reference to Expression (20), the estimated value $a'_{ij}(k)$ of the state transition probability after integration is obtained using the frequency variable $\chi_{ij}(K)$.

$$\chi_{ij}(k) = \sum_n w_n \chi_{ij}(k)^{(n)}, \; w_n = \frac{T_n - 1}{\sum_k \sum_i \sum_j \chi_{ij}(k)^{(n)}} \quad (22)$$

In this way, for example, generally the same results as with batch learning of all of the learned datasets being carried out collectively can be obtained without saving the state transition probability table corresponding to each of the learned datasets $D_1$, $D_2$, ..., $D_n$, and so on, or the like. That is to say, the estimated value of a state transition probability is obtained by adding the frequency variable obtained by learning up to the already stored learned data set $D_{n-1}$, and the frequency variable obtained by learning the learned dataset $D_n$. Thus, generally the same results as with batch learning of the learned datasets $D_1$, $D_2$, ..., $D_n$ being carried out collectively can be obtained.

On the other hand, estimation of an observation probability according to learning of the action expanded HMM is performed by the above Expression (4), but here, let us consider a case where there are multiple datasets, such as illustrated in FIG. 29.

The estimated value $b'_j(o)^{(n)}$ of the observation probability of the n'th learned dataset $D_n$ can be obtained by Expression (23).

$$b'_j(o)^{(n)} = \frac{\sum_{t \in D_n, o_t = o} \alpha_t(j)\beta_t(j)}{\sum_{t \in D_n} \alpha_t(j)\beta_t(j)} \quad (23)$$

Note that, unlike the case of description of estimation of a state transition probability, $(t+1 \in D_n)$ is not represented by the expression of $t \in D_n$ here.

Also, let us say that the learned dataset $D_n$ includes information representing the action executed at each point in time, the node at each point in time, and the observation symbol at each point in time. $o_t = o$ represents that the observation symbol at a point in time t is o.

It can be said that the numerator in Expression (23) represents frequency wherein the observation symbol o was observed at the node j, of the learned dataset $D_n$. On the other hand, it can be said that the denominator in Expression (23) represents frequency wherein one of the observation symbols was observed at the node j, of the learned dataset $D_n$.

Now, let us define a variable $\omega_j(o)^{(n)}$ representing an expression corresponding to the numerator in Expression (23) as Expression (24).

$$\omega_j(o)^{(n)} \equiv \sum_{t \in D_n, o_t = o} \alpha_t(j) \beta_t(j) \quad (24)$$

Expression (25) can be obtained from Expression (24).

$$\sum_{t \in D_n} \alpha_t(j) \beta_t(j) = \sum_o \omega_j(o)^{(n)} \quad (25)$$

Expression (26) is derived from Expressions (25) and (23).

$$b'_j(o)^{(n)} = \frac{\omega_j(o)^{(n)}}{\sum_o \omega_j(o)^{(n)}} \quad (26)$$

Thus, the estimated value of an observation probability can be represented using the variable $\omega_j(o)^{(n)}$.

Here, the variable $\omega_j(o)^{(n)}$ is equivalent to the numerator in Expression (23), and it can be said that the variable $\omega_j(o)^{(n)}$ represents frequency wherein the observation symbol o was observed at the node j, of the learned data set $D_n$, and accordingly, this will be referred to as a frequency variable for estimating an observation probability.

With an embodiment of the present invention, in the same way as with the case of a state transition probability, in the event of performing learning by the additional learning method, in order to perform learning in a stable manner, the estimated value of an observation probability will be obtained using the above variable $\omega_j(o)^{(n)}$. Specifically, whenever performing learning based on one learned dataset, the learning device 34 updates the frequency variable to store and save this in the internal model data storage unit 37 as one of the internal model data.

Subsequently, at the time of newly performing learning, a frequency variable corresponding to the past learned dataset is read out, and the value of the frequency variable is updated by adding a frequency variable obtained based on new learning to that frequency variable. Further, learning by the additional learning method is performed by obtaining the estimated value of an observation probability obtained based on the update frequency variable.

Next, integration of each of the internal model data obtained by learning of multiple times will be described. Specifically, description will be made regarding integration of the estimated values $b'_j(o)^{(1)}, b'_j(o)^{(2)}, \ldots, b'(o)^{(n)}$, and so on of observation probabilities calculated based on the learned datasets $D_1, D_2, \ldots, D_n$, and so on.

At the time of integration, weight $w'_n$ has to be taken into consideration because of the same reason as with the case of the estimated value of a state transition probability.

With an embodiment of the present invention, the estimated value $b'_j(o)$ of a state transition probability after integration is obtained by Expression (27).

$$b'_j(o) = \frac{\omega_j(o)}{\sum_o \omega_j(o)}, \quad \omega_j(o) = \sum_n w_n \omega_j(o)^{(n)} \quad (27)$$

At this time, the weight $w'_n$ is set so as to satisfy relationship indicated by Expression (28) regarding the frequency variable $\omega_j(o)^{(n)}$ corresponding to the learned dataset $D_n$ of the sequence length $T_n$.

$$w'_n \sum_o \sum_j \omega_j(o)^{(n)} = T_n \quad (28)$$

Thus, in the event that, for each learned dataset, while adjusting the weight according to the sequence length of the learned data set thereof, the frequency variable $\omega_j(o)^{(n)}$ is accumulated over all of the datasets, generally the same results as with batch learning of all of the data being carried out collectively can be obtained. Specifically, the frequency variable $\omega_j(o)$ is obtained by Expression (29), and such as described above with reference to Expression (27), the estimated value $b'_j(o)$ of the state transition probability after integration is obtained using the frequency variable $\omega_j(o)$.

$$\omega_j(o) = \sum_n w'_n \omega_j(o)^{(n)}, \quad w'_n = \frac{T_n}{\sum_o \sum_j \omega_j(o)^{(n)}} \quad (29)$$

In this way, for example, generally the same results as with batch learning of all of the learned datasets being carried out collectively can be obtained without saving the observation probability table and state transition probability table corresponding to each of the learned datasets $D_1, D_2, \ldots, D_n$, and so on, or the like. That is to say, the estimated value of an observation probability is obtained by adding the frequency variable obtained by learning up to the already stored learned dataset $D_{n-1}$, and the frequency variable obtained by learning the learned dataset $D_n$. Thus, generally the same results as with batch learning of the learned datasets $D_1, D_2, \ldots, D_n$ being carried out collectively can be obtained.

For example, event though learning by the additional learning method is performed by saving the calculation result in Expression (15) or (23) without change, generally the same results as with batch learning of the learned datasets $D_1, D_2, \ldots, D_n$, being carried out collectively is not obtained. This is because the calculation result in Expression (15) or (23) is calculated as the value of a probability, and accordingly, normalization is performed so that the total value of possible transition probabilities becomes 1. Even if we save the calculation results of Expression (15) or (23) without change and perform learning by the additional learning method, for example, the table corresponding to each of the learned datasets has to be saved in order to obtain generally the same results as with batch learning of the learned datasets $D_1, D_2, \ldots, D_n$, being carried out collectively. Therefore, with an embodiment of the present invention, a frequency variable to be obtained by the expression corresponding to the numerator in Expression (15) or (23) is saved.

In the event of obtaining a state transition probability and an observation probability in this way, even when learning by the additional learning method is performed, better performance can be exhibited under a changing environment, and also stable learning can be performed.

Also, in this way, the internal model data corresponding to each of the past learning does not have to be saved, and accordingly, for example, the storage capacity of the internal model data storage unit 37 can be reduced small. Further, as a result of learning by the additional learning method, the calculation amount at the time of updating the internal model data can be reduced small, and change in the environment can be rapidly recognized.

With description regarding the additional learning method so far, an example of a case where a discrete observation signal is obtained has been described. In the case of obtaining a consecutive observation signal, the parameters of an observation probability density function $b_j(o)$ should be estimated again using a signal distribution weighted by a weighting factor $\gamma_t(j)$ in the case that the agent is in the state j at a point in time t. At this time, adjustment has to be made so that the weighing factor $\gamma_t(j)$ satisfies Expression (30).

$$w'_n \sum_{t \in D_n} \sum_j \gamma_t(j) = T_n \quad (30)$$

In this case, $\gamma'_t(j)$ has meaning equivalent to frequency. The mean vector and covariance matrix of an observation signal should be estimated using $\gamma'_t(j) \equiv w'_n \gamma_t(j)$.

Usually, reestimation of the parameters of the observation probability density function $b_j(o)$ may be performed using a logarithm concave such as a Gaussian distribution, or elliptic symmetry probability density as a model.

As for the parameters of the model of a logarithm concave such as a Gaussian distribution, or elliptic symmetry probability density, a mean vector $\mu'_j$ and a covariance matrix $U'_j$ of the observation signals in the state j may be employed. The mean vector $\mu'_j$ and the covariance matrix $U'_j$ may be obtained by Expressions (31) and (32), respectively.

$$\mu'_j = \frac{\sum_t \gamma'_t(j) o_t}{\sum_t \gamma'_t(j)} \quad (31)$$

$$U'_j = \frac{\sum_t \gamma'_t(j)(o_t - \mu_j)(o_t - \mu_j)^T}{\sum_t \gamma'_t(j)} \quad (32)$$

As described above, stability at the time of learning by the additional learning method can be ensured, but in the case of the additional learning method, the internal model data is often updated by great weight being provided according to the nearest learning results. This is because it is conceived that new experience is convenient for more suitably learning change in the environment.

For example, let us consider a case where new data of 100 samples is provided to a learning device which has finished learning made up of 100000 samples to have the learning device perform learning by the additional learning method. The amount of data to be newly learned (100) is smaller than the amount of data to have already been learned (100000), and accordingly, upon performing learning without change, the degree of incidence of the new learning becomes 0.1%. In such a case, it is difficult to say that change in the environment is suitably learned.

Therefore, for example, it is convenient to allow a learning rate that is the degree of incidence of new learning to be specified. For example, with the above example, in the event of specifying the learning rate to 0.1 (10%), the degree of incidence can be set to 100 times without changing the amount of data to be newly learned.

With an embodiment of the present invention, regardless of specification of the above learning rate, the stability of learning is prevented from being diminished.

As described above, the frequency variable $\chi_{ij}(K)$ for estimating a state transition probability is updated such as shown in Expression (33). Note that an arrow in Expression (33) represents that the $\chi_{ij}(K)$ is updated such as indicated on the right side.

$$\chi_{ij}(k) \Rightarrow \chi_{ij}(k) + w_n \chi_{ij}(k)^{(n)}, \; w_n \equiv \frac{T_n - 1}{\sum_k \sum_i \sum_j \chi_{ij}(k)^{(n)}} \quad (33)$$

The frequency variable $\omega_j(o)$ for estimating an observation probability is updated such as shown in Expression (34). Note that an arrow in Expression (34) represents that the $\omega_j(o)$ is updated such as indicated on the right side.

$$\omega_j(o) \Rightarrow \omega_j(o) + w'_n \omega_j(o)^{(n)}, \; w'_n \equiv \frac{T_n}{\sum_o \sum_j \omega_j(o)^{(n)}} \quad (34)$$

Now, in the case of the learning rate $\gamma$ ($0 \leq \gamma \leq 1$) being specified, with an embodiment of the present invention, in order to calculate a frequency variable for estimating a state transition probability, the weight $W_n$ and weight $z_i(k)^{(n)}$ shown in Expression (35) are calculated. The weight $W_n$ and the weight $z_i(k)^{(n)}$ are calculated as weight by which a frequency variable obtained based on new learning is multiplied, and weight by which the already saved frequency variable is multiplied, respectively.

$$W_n \equiv \frac{r w_n}{T_n - 1} \sum_k \sum_i \sum_j \chi_{ij}(k), \; z_i(k)^{(n)} \equiv \frac{r w_n}{T_n - 1} \sum_j \chi_{ij}(k)^{(n)} \quad (35)$$

Subsequently, a frequency variable for estimating a state transition probability is calculated by Expression (36).

$$\chi_{ij}(k) \Rightarrow (1 - z_i(k)^{(n)}) \chi_{ij}(k) + W_n \chi_{ij}(k)^{(n)} \quad (36)$$

Note that the weight $z_i(k)^{(n)}$ in Expression (35) is weight provided by taking it into consideration that the weight $W_n$ is one-sidedly increased according to learning being repeated, and may not be employed for actual calculation.

Also, in the case of the learning rate $\gamma$ ($0 \leq \gamma \leq 1$) being specified, in order to calculate a frequency variable for estimating an observation probability, the weight $W'_n$ and weight $z_j^{(n)}$ shown in Expression (37) are calculated. The weight $W'_n$ and weight $z_j^{(n)}$ are calculated as weight by which a frequency variable obtained based on new learning is multiplied, and weight by which the already saved frequency variable is multiplied, respectively.

$$W'_n \equiv \frac{r w'_n}{T_n} \sum_k \sum_j \omega_j(k), \; z_j^{(n)} \equiv \frac{r w'_n}{T_n} \sum_k \omega_j(k)^{(n)} \quad (37)$$

Subsequently, a frequency variable for estimating a state transition probability is calculated by Expression (38).

$$\omega_j(k) \Rightarrow (1 - z_j^{(n)}) \omega_j(k) + W'_n \omega_j(k)^{(n)} \quad (38)$$

Note that the weight $z_i^{(n)}$ in Expression (37) is weight provided by taking it into consideration that the weight $W'_n$ is one-sidedly increased according to learning being repeated, and may not be employed for actual calculation.

With description regarding the additional learning method having specification of a learning rate so far, an example of a case where a discrete observation signal is obtained has been described. A case where a consecutive observation signal is obtained is also in the same way, estimation of distribution parameters should be performed after performing the corresponding weight conversion. Thus, even regardless of specification of a learning rate, the stability of learning can be prevented from being diminished.

Incidentally, the calculation of the estimated value $a'_{ij}(k)$ of the state transition frequency using a frequency variable can be obtained by Expression (20) such as described above, but in practice, in the case that the denominator $\Sigma_j \chi_{ij}(k)^{(n)}$ is a small value, calculation results may be disturbed. The above disturbance diminishes the reliability of internal model data obtained by learning, affects on the subsequent recognition of the environment, and allows the agent to erroneously recognize the environment. Further, the recognition results thereof also have a damaging effect on the learning results of the additional learning method recursively, and accordingly, this problem has to be solved.

Now, let us say that $N_{ik} = \Sigma_j \chi_{ij}(k)$. In the case that the $N_{ik}$ is a small value, in order to solve a problem wherein the calculation results are disturbed, a penalty coefficient corresponding to the smallness of the $N_{ik}$ as to a state transition probability has to be multiplied. That is to say, the estimated value $a'_{ij}(k)$ of a state transition probability should be obtained by Expression (39) with the penalty coefficient as $\eta(N_{ik})$.

$$a'_{ij}(k) = \eta(N_{ik}) \frac{\chi_{ij}(k)}{N_{ik}} \tag{39}$$

where the function $\eta(x)$ is a monotonically increasing function satisfying a range $0 \le \eta(x) \le 1$ as to a domain $0 \le x$.

The function $\eta(x)$ is, for example, a function represented by Expression (40).

$$\eta(x) = \frac{1}{1 + \exp(-\alpha(x - \beta))} - \frac{1}{1 + \exp(\alpha\beta)} \tag{40}$$

$\alpha(>0)$ and $\beta$ in Expression (40) are parameters to be suitably adjusted according to use, and may be adjusted according to the specified learning rate $\gamma$, for example.

Incidentally, as described above, with an embodiment of the present invention, the frequency variable for estimating a state transition probability, and the frequency variable for estimating an observation probability have been stored as internal mode data. Thus, the frequency variable for estimating a state transition probability, and the frequency variable for estimating an observation probability have to be subjected to processing for imposing the above one-state one-observation constraint and the action transition constraints as well.

The split algorithm application processing as to the frequency variable for estimating a state transition probability, and the frequency variable for estimating an observation probability will be performed as follows.

Now, an example of a case where a node $s_j$ is divided into K nodes will be described. Now, let us say that the k'th node of the K nodes obtained as a result of the node $s_j$ being divided is represented as $s_j^k$, a state transition probability from a node $s_i$ after the node $s_j$ is divided to the node $s_j^k$ is represented as $a^k_{ij}$. Also, let us say that a state transition probability from the node $s_j^k$ after the node $s_j$ is divided to the node $s_i$ is represented as $a^k_{ji}$.

The learning device 34 obtains the frequency variable $\omega_j(o)$ for estimating an observation probability as to the observation probability $b_j(o)$ regarding the observation symbol o by Expression (41).

$$\omega_j^k(o) = \begin{cases} \omega_j(o) & (o = o_k) \\ 0 & (\exists i \in 1, \ldots, K, i \ne k, o = o_i) \\ \frac{\omega_j(o)}{K} & \text{(otherwise)} \end{cases} \tag{41}$$

Also, the learning device 34 sets the frequency variable $\chi^k_{ij}$ for estimating the state transition probability corresponding to the state transition probability $a^k_{ij}$ so as to be obtained by proportionally dividing the frequency variable $\chi_{ij}$ before division by the ratio of the frequency variable $\omega_j(o_k)$ for estimating the observation probability corresponding to the observation probability of each observation symbol before division.

Further, the learning device 34 sets the frequency variable $\chi^k_{ji}$ for estimating the state transition probability corresponding to the state transition probability $a^k_{ji}$ so as to be obtained by proportionally dividing the frequency variable $\chi_{ji}$ before division by the ratio of the frequency variable $\omega_j(o_k)$ for estimating the observation probability corresponding to the observation probability of each observation symbol before division.

The forward merging algorithm application processing as to the frequency variable for estimating a state transition probability, and the frequency variable for estimating an observation probability will be performed as follows.

Now, an example of a case where L node groups $s_j^{m,l}$ ($l = 1, \ldots, L$) are merged into one node $s_j^m$ will be described. Now, let us say that a state transition probability from the node $s_i$ after merging to the node $s_j^m$ is represented as $a_{ij}^m$, and a state transition probability from the node $s_j^m$ after merging to the node $s_i$ is represented as $a_{ji}^m$. Also, a vector with the observation probability of each observation symbol after merging as a factor is represented as $b_j^m$.

The learning device 34 obtains and sets the frequency variable $\chi_{ij}^m$ for estimating a state transition probability corresponding to the state transition probability $a_{ij}^m$ by $\Sigma_l \chi_{ij}^{m,l}$. Here, $\chi ij^{m,l}$ is a frequency variable for estimating a state transition probability corresponding to a state transition probability from the node $s_i$ before merging to the node $s_j^{m,l}$.

Also, the learning device 34 obtains and sets the frequency variable $\chi_{ji}^m$ for estimating a state transition probability corresponding to the state transition probability $a_{ji}^m$ by $\Sigma_l \chi_{ji}^{m,l}$. Here, $\chi_j^{m,l}$ is a frequency variable for estimating a state transition probability corresponding to a state transition probability from the node $s_j^{m,l}$ before merging to the node $s_i$.

Further, the learning device 34 obtains and sets a vector $\omega_i^m$ with each frequency variable for estimating a state transition probability corresponding to each factor of a vector $b_j^m$ as a factor by $\Sigma_l \omega_j^{m,l}$.

Subsequently, after completing all of the merges, the learning device 34 recalculates a state transition probability and an observation probability using the frequency variable for estimating the corrected state transition probability, and the frequency variable for estimating the corrected observation probability.

The backward merging algorithm application processing as to the frequency variable for estimating a state transition probability, and the frequency variable for estimating an observation probability will be performed as follows.

Now, an example of a case where L node groups $s_j^{m,l}$ (l=1, ..., L) are merged into one node $s_j^m$ will be described. Now, let us say that a state transition probability from the node $s_i$ after merging to the node $s_j^m$ is represented as $a_{ij}^m$, and a state transition probability from the node $s_j^m$ after merging to the node $s_i$ is represented as $a_{ji}^m$. Also, a vector with the observation probability of each observation symbol after merging as a factor is represented as $b_j^m$.

The learning device 34 obtains and sets the frequency variable $\chi_{ij}^m$ for estimating a state transition probability corresponding to the state transition probability $a_{ij}^m$ by $\Sigma_l \chi_{ij}^{m,l}$. Here, $\chi_{ij}^{m,l}$ is a frequency variable for estimating a state transition probability corresponding to a state transition probability from the node $s_i$ before merging to the node $s_j^{m,l}$.

Also, the learning device 34 obtains and sets the frequency variable $\chi_{ji}^m$ for estimating a state transition probability corresponding to the state transition probability $a_{ji}^m$ by $\Sigma_l \chi_{ji}^{m,l}$. Here, $\chi_{ji}^{m,l}$ is a frequency variable for estimating a state transition probability corresponding to a state transition probability from the node $s_j^{m,l}$ before merging to the node $s_i$.

Further, the learning device 34 obtains and sets a vector $\omega_j^m$ with each frequency variable for estimating a state transition probability corresponding to each factor of a vector $b_j^m$ as a factor by $\Sigma_l \omega_j^{m,l}$.

Subsequently, after completing all of the merges, the learning device 34 recalculates a state transition probability and an observation probability using the frequency variable for estimating the corrected state transition probability, and the frequency variable for estimating the corrected observation probability.

Thus, the above one-state one-observation constraint and the action transition constraints are also imposed on the frequency variable for estimating a state transition probability, and the frequency variable for estimating an observation probability.

Description has been made so far regarding the technique for allowing learning by the additional learning method according to the action expanded HMM inevitably having a large scale to be performed in a stable manner.

Incidentally, with the above description, such as described with reference to FIG. 8, an example of the action expanded HMM having the three-dimensional state transition probability table and the two-dimensional observation probability table has been described. Usually, a learning algorithm is determined on the premise that if we say that the number of nodes is N, the number of observation symbols is M, and the number of actions is K, the number of parameters becomes $N^2K+NM$, and the values of N, M, and K are constant.

However, while advancing learning, the values of N, M, and K may have to be changed. For example, in the case that a part to be used for a maze where the robot moves is newly added, the types of observation symbols increases, and accordingly, the value of M has to be increased.

Next, description will be made regarding processing that can be performed in the case that the number of nodes, the number of observation symbols, or the number of actions comes under pressure to be changed at the time of advancing learning.

Figure 30:
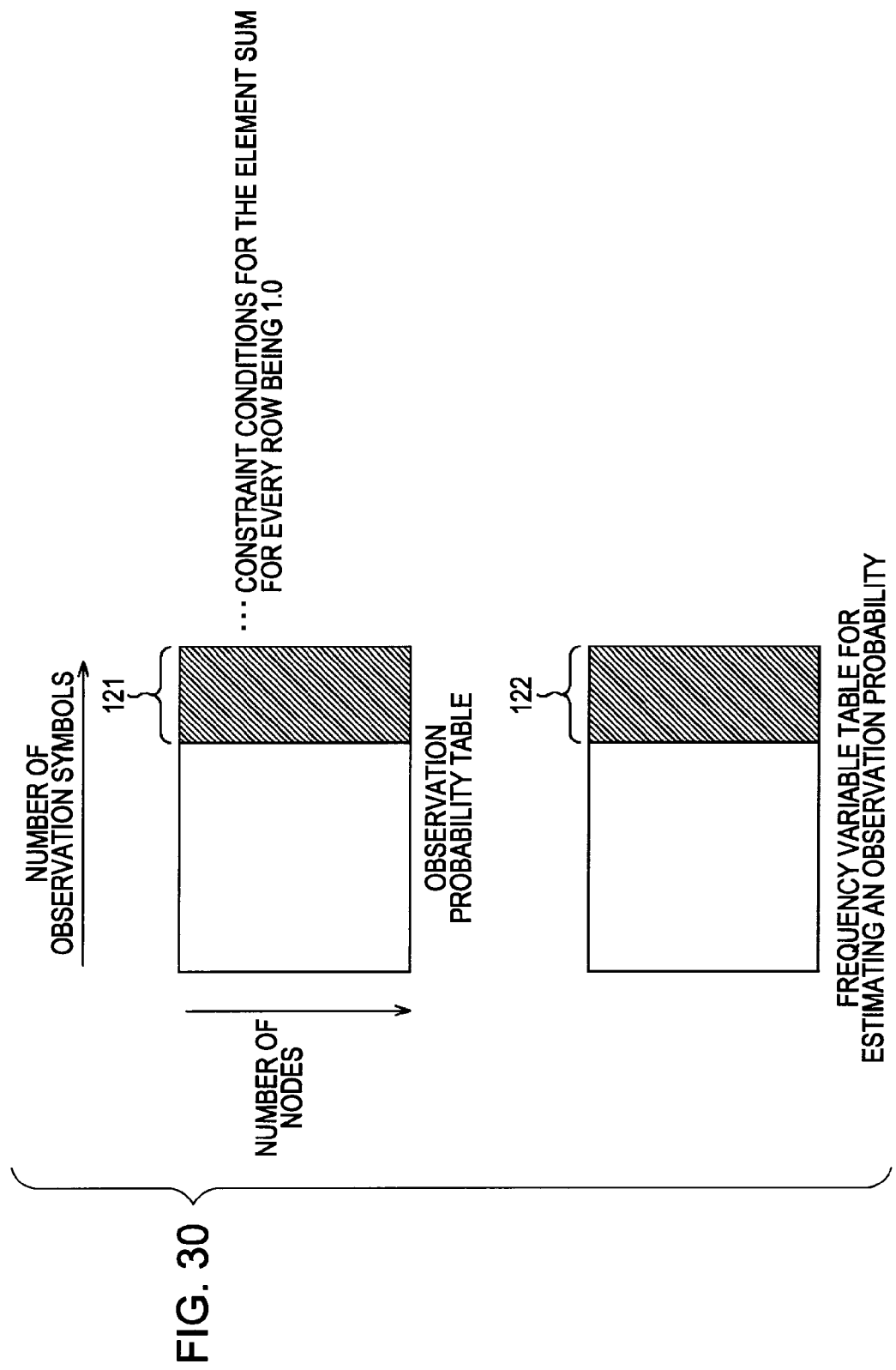
FIG. 30 is a diagram for describing influence due to the types of observation symbol increasing.

FIG. 30 is a diagram for describing influence due to increase in the types of observation symbols. As illustrated in the drawing, when the types of observation symbols increases, expansion in the row direction (horizontal direction in the drawing) of an observation probability table occurs. That is to say, the value of an observation probability corresponding to a region 121 newly has to be set. Note that the observation probability table has a constraint so that the total of observation probability values per one row of the table becomes 1.0.

Also, such as illustrated in FIG. 30, extension in the row direction (horizontal direction in the drawing) of the observation table occurs, and accordingly, the table of frequency variables for estimating an observation probability also has to be extended. That is to say, the value of a frequency variable as to a region 122 newly has to be set.

With an embodiment of the present invention, such as illustrated in FIG. 30, in the case that the observation probability table has to be extended, the learning device 34 will perform the following processing. Now, description will be made regarding the processing of the learning device 34 in the case of commanding to extend the observation probability table such as illustrated in FIG. 30, for example, on the premise that the types of observation symbols increase by a predetermined number as to the robot.

Now, let us say that the M+i'th column is added to the observation probability table with an index corresponding to a new observation symbol $o_{M+i}$ as M+i. The learning device 34 determines observation probability values to be set to the M+i'th column of the observation probability table to be a non-zero factor having a suitable size. The value of this non-zero factor will be determined as follows.

As shown in Expression (42), let us say that the number of observation symbols before a new observation symbol is added is M, and observation probability values to be set to the M+i'th column are all 1/M.

$$b_j(M+i) = \frac{1}{M} \ (i = 1, ...) \tag{42}$$

Alternatively, such as shown in Expression (43), the number of observation symbols of which the observation probability $b_j(\bullet)$ is equal to or greater than a threshold is counted, and observation provability values to be set to the M+i'th column are obtained using the number $n_j$ thereof. Note that $b_j(\bullet)$ represents the observation probability of each observation symbol equal to or greater than the threshold.

$$b_j(M+i) = \frac{1}{n_j} \ (i = 1, ...) \tag{43}$$

As shown in Expression (42) or (43), after setting a non-zero factor having a suitable size to the M+i'th column of the observation probability table, the learning device 34 adjusts the total of observation probability values per one row of the table so as to be 1.0. That is to say, such as shown in Expression (44), the learning device 34 updates each non-zero observation probability $b_j(\bullet)$ within the observation probability table. Thus, expansion of the observation probability table is completed.

$$b_j(\cdot) \Rightarrow b_j(\cdot) \ \text{s.t.} \ \sum_k b_j(k) = 1 \tag{44}$$

Further, the learning device 34 sets all of the observation probability values to be set to the M+i'th column of the table of frequency variables for estimating an observation probability to zero. Thus, expansion of the table of frequency variables for estimating an observation probability is completed.

Subsequently, the learning device 34 performs learning by the additional learning method as to a learned dataset including a new observation symbol under the specification of a predetermined learning rate to update the internal model data. Thus, the frequency variable for estimating a state transition probability, the frequency variable for estimating an observation probability, and each value of the observation probability table and state transition probability table are updated.

In this way, even in the event that a new observation symbol is observed while learning by the additional learning method, the internal model data can suitably be updated.

Also, for example, in the event that a predetermined observation symbol becomes unnecessary while learning, the observation probability table may be reduced in the column direction.

In this case, if we say that an index corresponding to the observation symbol that becomes unnecessary is k, the learning device 34 eliminates the k'th column from the observation probability table so that the observation probability $b_j(k)$ at the node $s_j$ does not exist.

Similarly, the learning device 34 also eliminates the k'th column regarding the table of frequency variables for estimating an observation probability so that $\omega_j(k)$ does not exist.

Further, the learning device 34 recalculates each value within the observation probability table after reduction using the frequency variable for estimating an observation probability.

Subsequently, the learning device 34 performs learning by the additional learning method as to a learned dataset after a predetermined observation symbol becomes unnecessary under the specification of a predetermined learning rate to update the internal model data. Thus, the frequency variable for estimating a state transition probability, the frequency variable for estimating an observation probability, and each value of the observation probability table and state transition probability table are updated.

Also, for example, in the event that a maze where the robot moves is extended in a predetermined direction, the number of nodes increases, and accordingly, the value of the number of nodes N has to be increased.

Figure 31:
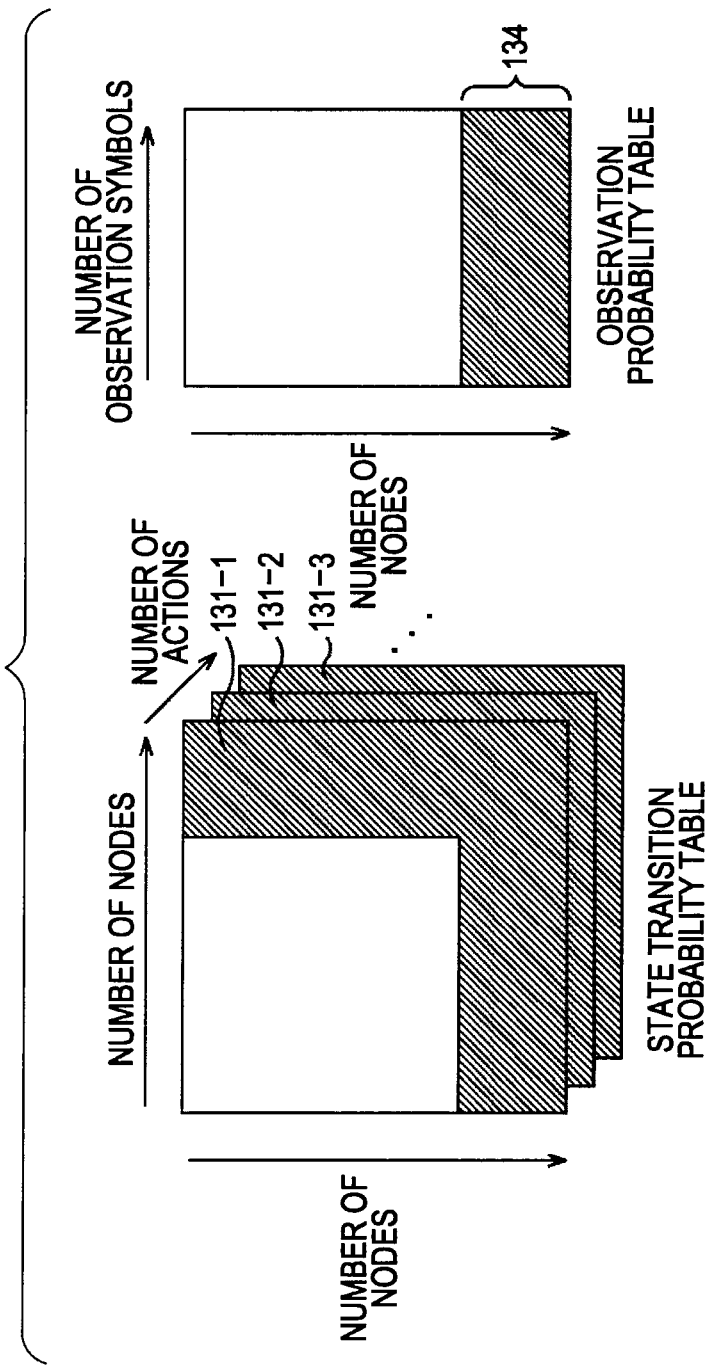
FIG. 31 is a diagram for describing influence due to the number of nodes increasing.

FIG. 31 is a diagram for describing influence due to the number of nodes increasing. As illustrated in the drawing, in the event of the number of nodes increasing, expansion in the matrix direction of the state transition probability table occurs. That is to say, the value of a state transition probability corresponding to an inverted-L-shaped region 131-1 in the first sheet of the state transition probability table in FIG. 31 newly has to be set. Similarly, the value of a state transition probability corresponding to inverted-L-shaped regions 131-2, 131-3, and so on of the state transition probability table corresponding to each action newly has to be set. That is to say, the value of a state transition probability newly has to be set by extending the number of actions K sheets of the state transition probability table. Note that the state transition probability table has a constraint so that the total of observation probability values per one row of the table becomes 1.0.

Also, in the event of the number of nodes increasing, expansion in the column direction (vertical direction in the drawing) of the observation probability table occurs. That is to say, the value of an observation probability corresponding to a region 134 newly has to be set. Note that the observation probability table has a constraint so that the total of observation probability values per one row of the table becomes 1.0.

Further, though not illustrated in the drawing, the table of frequency variables for estimating a state transition probability, and the table of frequency variables for estimating an observation probability have to be extended and a value newly has to be set.

With an embodiment of the present invention, such as illustrated in FIG. 31, in the event that the state transition probability table and the observation probability table have to be extended, the learning device 34 will perform the following processing. Now, description will be made regarding the processing of the learning device 34 in the case of commanding to extend the state transition probability table and the observation probability table such as illustrated in FIG. 31, for example, on the premise that the number of nodes increase by a predetermined number as to the robot.

Now, let us say that the N+i'th row and the N+i'th column are added to the state transition probability table with an index corresponding to a new node $s_{N+i}$ as N+i.

The learning device 34 takes state transition probability values to be set to the N+i'th row and the N+i'th column of the state transition probability table as minute random factors, respectively.

In this way, regarding the table of frequency variables for estimating a state transition probability as well, the learning device 34 adds the N+i'th row and the N+i'th column, and takes state transition probability values to be set as minute random factors, respectively.

The learning device 34 determines the action $c_k$ that has been executed at the node $s_{N+i}$. Subsequently, the learning device 34 sets each of the state transition probability values of the row corresponding to the node $s_{N+i}$ of the k'th sheet of the state transition probability table corresponding to the action $c_k$ to a uniform value. However, a transition probability for an experienced transition destination state may somewhat be raised by taking actual transition results at the time of executing the action $c_k$.

Also, as a result of the action $c_k$ being executed, a transition source node $s_j$ from which transition has been made to the node $s_{N+i}$ is determined. Subsequently, the learning device 34 will set each of the state transition probability values of the row corresponding to the node $s_j$ of the k'th sheet of the state transition probability table corresponding to the action $c_k$ as follows.

With this row, let us say that the number of transition destination nodes $s_i$ of which the state transition probability is equal to or greater than a threshold is counted, and the number thereof is L. Subsequently, let us say that a state transition probability $a_{i,N+i}(k)$ from the node $s_j$ to the node $s_{N+i}$ of the k'th sheet of the state transition probability table is 1/L.

Subsequently, the learning device 34 performs adjustment so that the total of state transition probability values per one row of the table becomes 1.0. That is to say, such as shown in Expression (45), the learning device 34 updates each state transition probability $a_j(k)$ within the state transition probability table. Thus, expansion of the state transition probability table is completed.

$$a_j(k) \Rightarrow a_j(k) \text{ s.t. } \sum_i a_{ji}(k) = 1 \qquad (45)$$

Further, the learning device 34 sets all of the state transition probability values to be set to an additional region of the table of frequency variables for estimating a state transition probability to zero. Thus, expansion of the table of frequency variables for estimating a state transition probability is completed.

Also, the learning device 34 determines observation probability values to be set to the N+i'th row and the N+i'th column of the observation probability table to be a non-zero factor having a suitable size. The value of this non-zero factor is determined to be, for example, a uniform value such as 1/N, but the observation probability of an observation symbol that has actually been observed at the node $S_{N+i}$ may be raised.

Further, the learning device 34 sets all of the N+i'th row corresponding to the node $S_{N+i}$ added in the table of frequency variables for estimating an observation probability to zero. Thus, expansion of the table of frequency variables for estimating an observation probability is completed.

Subsequently, the learning device 34 performs learning by the additional learning method as to a learned dataset including a new node under the specification of a predetermined learning rate to update the internal model data. Thus, the frequency variable for estimating a state transition probability, the frequency variable for estimating an observation probability, and each value of the observation probability table and state transition probability table are updated.

Alternatively, for example, in the case that the robot is reconfigured so as to extend the movable direction on the maze, the number of actions increases, and accordingly, the number of actions K has to be increased.

Figure 32:
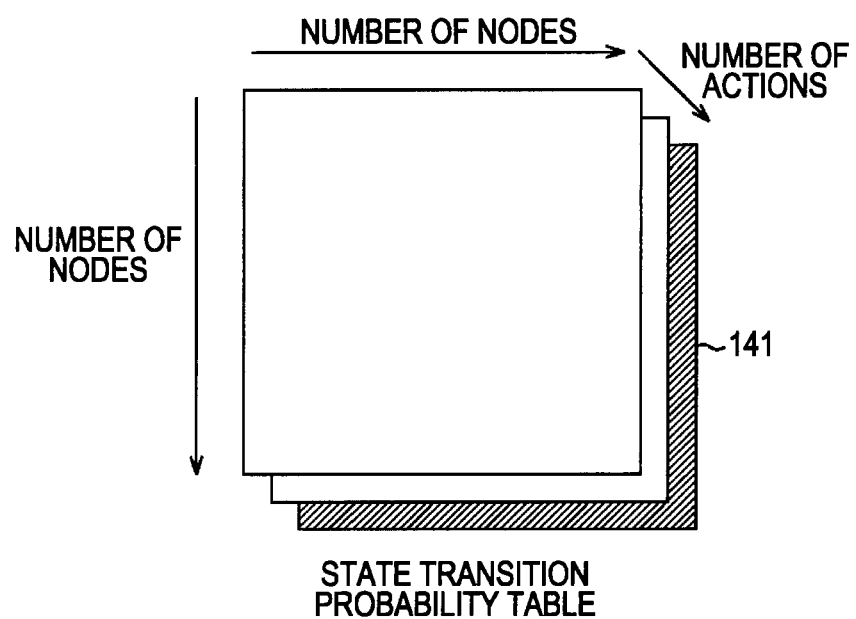
FIG. 32 is a diagram for describing influence due to the number of actions increasing.

FIG. 32 is a diagram for describing influence due to increase in the number of actions. As illustrated in the drawing, as the number of actions increases, expansion in the depth direction of the state transition probability table occurs. That is to say, this expansion is, for example, the state transition probability table corresponding to a newly added action, and the value of the state transition probability of the third sheet of a state transition probability table 141 in FIG. 32 newly has to be set.

Also, though not illustrated in the drawing, the table of frequency variables for estimating a state transition probability also has to be extended in the same way, and a value newly has to be set thereto.

With an embodiment of the present invention, in the case that the state transition probability table has to be extended such as illustrated in FIG. 32, the learning device 34 will perform the following processing. Now, description will be made regarding the processing of the learning device 34 in the case of commanding to extend the state transition probability table such as illustrated in FIG. 32 on the premise that the number of actions increases by a predetermined number as to the robot.

Now, let us say that an index corresponding to a new action $c_{K+i}$ is taken as K+i, the K+i'th sheet of the state transition probability table is added.

The learning device 34 sets all of the state transition probabilities of the added K+i'th sheet of the state transition probability table to zero. Also, in this way, regarding the table of frequency variables for estimating a state transition probability as well, the learning device 34 adds the K+i'th sheet of the table, and sets all of the state transition probabilities of the K+i'th sheet of the state transition probability table to zero. Thus, expansion of the table of frequency variables for estimating a state transition probability is completed.

Further, the learning device 34 determines the node $s_j$ where the new action $c_{K+i}$ has been executed. Subsequently, the learning device 34 sets all of the state transition provability values of the row corresponding to the node $s_j$ of the K+i'th sheet of the state transition probability table to a uniform value. However, a state transition probability for an experienced transition destination node may somewhat be raised while taking a transition result at the time of execution of the actual action $c_{K+i}$. Thus, expansion of the state transition probability table is completed.

Subsequently, the learning device 34 performs learning by the additional learning method as to a learned dataset including execution of a new action under the specification of a predetermined learning rate to update the internal model data. Thus, the frequency variable for estimating a state transition probability, the frequency variable for estimating an observation probability, and each value of the observation probability table and state transition probability table are updated.

According to the above processing, even in the event that the number of nodes, the number of observation symbols, or the number of actions comes under pressure to be added while advancing learning, learning can be continued. The above processing is an example of a case where each table is extended such as illustrated in FIGS. 30 through 32 on the premise that the types of observation symbols increases by a predetermined number as to the robot.

However, for example, it may not be found beforehand that observation symbols, nodes, or actions increase by a predetermined number. That is to say, in the case that change in the environment is successively recognized by an autonomous action of the agent, for example, the manager of the robot, or the like is not allowed to know beforehand how much observation symbols, nodes, or actions are increased. Accordingly, for example, in the case that, while the robot is moving through the maze, an arbitrary new part of the maze appears, the maze is newly extended, or a moving direction is newly added, further consideration has to be made.

Next, description will be made regarding expansion of the state transition probability table and the observation probability table, for example, in the case that, while the robot is moving through the maze, a new part of the maze appears, or the maze is newly extended. That is to say, description will be made regarding an example of a case where the agent autonomously recognizes change in the environment to extend the state transition probability table and the observation probability table.

In the case that the agent autonomously recognizes change in the environment to extend the state transition probability table and the observation probability table, the agent itself has to recognize whether or not the environment is newly extended. That is to say, the agent has to be able to recognize whether the node where itself is now located is a node serving as a learned internal state, or a node serving as an internal state to be newly added. For example, in the event that, while the robot is moving through the maze, the maze is newly extended, when moving above the extended portion, unless the robot is able to recognize that itself is located in a node to be newly added, the robot will not be allowed to autonomously recognize change in the environment.

Now, a node recognition method according to the autonomous action learning device 10 will be described. Recognition of a node is performed by the recognizing device 35 in FIG. 9. The details will be described later, but here, ultimately four types of methods will be described while considering the length value of time series information having an upper limit, and change in the value of entropy of the recognized current state probability.

As described above, the recognizing device 35 recognizes a node where the robot is now located based on information stored in the observation buffer 33 and the action output buffer 39, and the state transition probability table and observation probability table stored in the internal model data storage unit 37.

Also, as described above, observation symbols $o_t$, $o_{t+1}$, $o_{t+2}$, ..., $o_T$ corresponding to observation signals obtained at points in time t, t+1, t+2, ..., T are stored in the observation buffer 33 as an observation symbols at each point in time, respectively. Similarly, for example, actions $c_t$, $c_{t+1}$, $c_{t+2}$, ..., $c_T$ executed at points in time t, t+1, t+2, ..., T are stored in the action output buffer 39 as an action at each point in time, respectively.

Now, information, which is input to the recognizing device 35, stored in the observation buffer 33 and the action output buffer 39 will be referred to as time series information, and the length of the time series information will be represented as a variable N.

Also, the recognition result output from the recognizing device 35 is stored in the recognition result buffer 38 in a manner correlated with the point in time when the recognition result thereof was output.

The recognizing device 35 first sets the length N of the time series information, and obtains time series information of the length N from the observation buffer 33 and the action output buffer 39, and performs recognition based on the state transition probability table and the observation probability table stored in the internal model data storage unit 37.

The recognizing device 35 uses, for example, the Viterbi algorithm to output the node train corresponding to the length N. For example, in the case that N=3, the recognizing device 35 outputs node trains $s_1$, $s_2$, and $s_3$ serving as recognition results. In this case, the recognizing device 35 recognized that the robot is located in the node $s_1$ at the point in time $t_1$, located in the node $s_2$ at the point in time $t_2$, and located in the node $s_3$ at the point in time $t_3$.

Note that, with processing for outputting the node train corresponding to the length N using the Viterbi algorithm, a node train is inferred and output based on the state transition probability table and the observation probability table stored in the internal model data storage unit 37. In the event that the Viterbi algorithm is used to output the node train corresponding to the length N, multiple node trains including a node train having the most likelihood probability may be output. Now, let us say that a node train having the most likelihood probability obtained by the Viterbi algorithm is output.

Further, in order to determine whether or not a node where the robot is now located should newly be added, the recognizing device 35 determines whether or not the node train output by the Viterbi algorithm is an actually possible node train.

Determination regarding whether or not the output node train is an actually possible node train will be performed as follows, for example. Now, the output node train (node train of the length T) will be represented as X, and a train of observation symbols (train of observation symbols of the length T) determined based on the times serried information will be represented as observation series O. Also, the state transition probability table of the internal model data will be represented as a matrix A. Note that the matrix A means the state transition probability table corresponding to each action determined based on the time series information.

The recognizing device 35 determines whether or not the node train X and the observation series O satisfy Expressions (46) and (47).

$$A(X_t, X_{t+1}) > \text{Thres}_{trans} (1 < t < T) \qquad (46)$$

$$P(O|X) > \text{Thres}_{obs} \qquad (47)$$

Here, P(O|X) means the observation probability of each observation symbol making up the observation series O at each node making up the node train X, and can be determined based on the observation probability table. Also, $\text{Thres}_{trans}$ and $\text{Thres}_{obs}$ represent a threshold regarding whether or not transition can be made, and a threshold regarding whether or not observation can be made, respectively.

Accordingly, in the event that determination is made that the node train X and the observation series O do not satisfy any one of Expressions (46) and (47), the recognizing device 35 determines that the output node train is not an actually possible node train. Thus, the node where the robot is now located (the node at the last point in time of the time series information) can be recognized as a node to be newly added, and also an unknown node.

In the event that determination is made that the node train X and the observation series O satisfy Expressions (46) and (47), the recognizing device 35 calculates the entropy of the current state transition probability.

Now, the entropy will be represented as E, the posteriori probability of a node Xi will be represented as P(Xi|O), and a total of the number of nodes existing on the current internal model data will be represented as M. Note that the posteriori probability of a node (state) is a probability output by the Viterbi algorithm, and means a probability corresponding to the node at the last point in time of the time series information. In this case, the entropy E can be represented by Expression (48).

$$E = -\sum_{i=1}^{M} P(Xi|0) \times \log(P(Xi|0)) \qquad (48)$$

For example, in the event that the value of the entropy calculated by Expression (48) is compared with a predetermined threshold, and is less than the threshold, this means a situation in which the output node train is an actually possible node train, and the recognizing device 35 can uniquely determine this. Thus, the node where the robot is now located (the node at the last point in time of the time series information) can be recognized as a node already presented on the internal model data, and also a known node (learned internal state).

Further, determination is made whether or not the number of characteristic nodes included in the output node train is equal to or greater than a threshold Thres, and only in the case of the Thres or more, the node at the last point in time of the time series information may be recognized as a known node. That is to say, the threshold of the number of characteristic nodes of the node train serving as a recognition result is provided for ensuring recognition precision. Here, the number of characteristic nodes means the number of nodes in the case of counting only nodes having a different index.

For example, the indexes of the output node train are "10", "11", "10", "11", "12", and "13", the length of the node train is 6, but the number of characteristic nodes is 4. For example, in the event that the agent repeats transition between the same nodes, even though recognition is performed based on the time series information having the same length, the precision of recognition results is low. Therefore, the threshold of the number of characteristic nodes of the node train serving as a recognition result may be provided for ensuring recognition precision.

On the other hand, in the event that the value of the entropy is equal to or greater than the threshold, this means a situation in which the output node train is an actually possible node train, but there are multiple candidates, which are not uniquely determined. Thus, the recognizing device 35 determines that, of the output node train, i.e., the length of the time series information should be increased. Thus, for example, the processing is repeatedly executed while incrementing the value of the length N of the time series information.

Next, the node recognition processing by the recognizing device 35 will be described with reference to the flowchart in FIG. 33. This processing is processing serving as an example of a first method of the node recognition processing by the recognizing device 35.

In step S201, the recognizing device 35 sets the value of a variable N to 1 that is an initial value.

In step S202, the recognizing device 35 obtains the time series information of the length N from the observation buffer 33 and the action output buffer 39.

In step S203, the recognizing device 35 uses the Viterbi algorithm to output a node train based on the time series information obtained in step S203.

In step S204, the recognizing device 35 determines whether or not, as a result of the processing in step S203, the output node train is an actually possible node train. At this time, as described above, determination is made whether or not the node train X and the observation series O satisfy Expressions (46) and (47). In the event that the node train X and the observation series O satisfy Expressions (46) and (47), determination is made in step S204 that the output node train is an actually possible node train. On the other hand, in the event that the node train X and the observation series O do not satisfy at least one of Expressions (46) and (47), determination is made in step S204 that the output node train is not an actually possible node train.

In the event that determination is made in step S204 that the output node train is not an actually possible node train, the processing proceeds to step S208, and the recognizing device 35 recognizes the node at the last point in time of the time series information as an unknown node. The recognition result in step S208 is stored in the recognition result buffer 38 in a manner correlated with the last point in time of the time series information.

On the other hand, in the event that determination is made in step S204 that the output node train is an actually possible node train, the processing proceeds to step S205.

In step S205, the recognizing device 35 calculates entropy. At this time, as described above, entropy is calculated by Expression (48).

In step S206, the recognizing device 35 compares the value of the entropy calculated in the processing in step S205 with a predetermined threshold, and determines whether or not the value of the entropy is equal to or greater than the threshold.

In the event that determination is made in step S206 that the value of the entropy is equal to or greater than the threshold, the processing proceeds to step S209.

In step S209, the recognizing device 35 increments the value of the variable N by one. Thus, with the subsequently executed processing in step S202, time series information having length N+1 will be obtained. Note that each time the value of the variable N is incremented in step S209, time series information to be obtained in step S202 is extended in the past direction.

In this way, until determination is made in step S204 that the output node train is not an actually possible node train, or until determination is made in step S206 that the value of the entropy is less than the threshold, the processing in steps S202 through S206, and S209 is repeatedly executed.

In the event that determination is made in step S206 that the value of the entropy is less than the threshold, the processing proceeds to step S207.

Alternatively, an arrangement may be made wherein determination is further made in step S204 whether or not the number of characteristic nodes included in the output node train is equal to or greater than a threshold Thres, and only in the case of the threshold Thres or more, the processing proceeds to step S205 or step S208.

Alternatively, an arrangement may be made wherein only in the event that a node train of which the number of characteristic nodes is equal to or greater than the threshold Thres is output in step S203, the processing proceeds to step S204, and in the event that the number of characteristic nodes is less than the threshold Thres, the value of the variable N is incremented, and time series information is obtained again.

In step S207, the recognizing device 35 recognizes that the node at the last point in time of the time series information is a known node. At this time, the index of the node at the last point in time of the time series information may be output. Also, the recognition result in step S207 is stored in the recognition result buffer 38 in a manner correlated with the last point in time of the time series information. Thus, the node recognition processing is executed.

Figure 33:
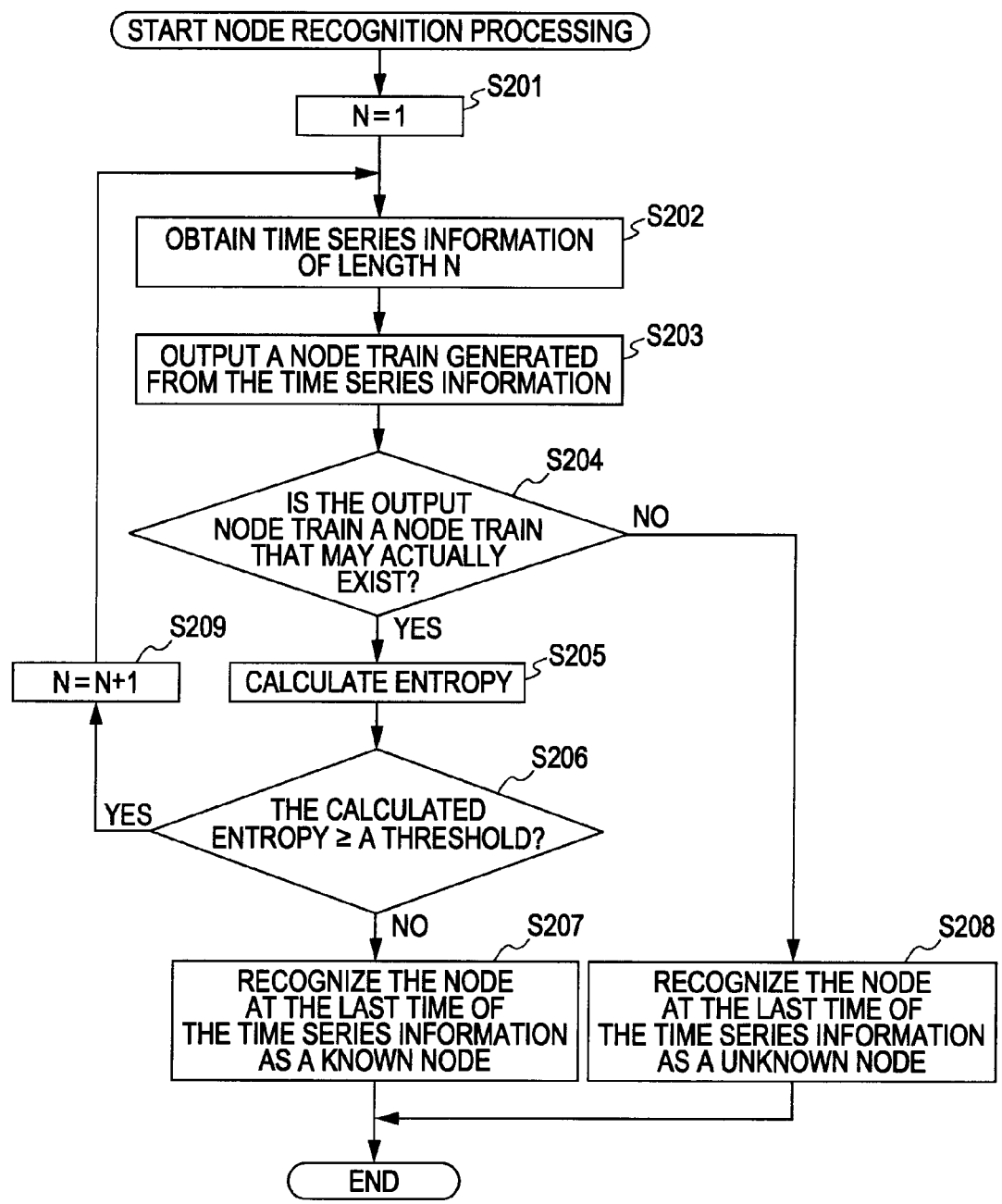
FIG. 33 is a flowchart for describing an example of node recognition processing.

Incidentally, description has been made wherein, with the processing in FIG. 33, each time the value of the variable N is incremented, the time series information to be obtained is extended in the past direction, but the time series information is not allowed to be extended prior to the point in time when transition has been made from a known node to an unknown node. An accurate recognition result is not allowed to be obtained based on a node train including an unknown node to which transition has been made from a known node.

Therefore, an unknown node to which transition has been made from a known node is not allowed to be included in a node train corresponding to the time series information, and accordingly, the value of the length N of the time series information has an upper limit. Note that whether or not the present node is an unknown node to which transition has been made from a known node can be determined based on the information stored in the recognition result buffer 38.

Next, description will be made regarding an example of the node recognition processing in the case of considering that there is an upper limit of the value of the length N of the time series information. This processing is processing serving as an example of a second method of the node recognition processing by the recognizing device 35.

Processing in steps S221 through S229 is the same as the processing in step S201 through S209 in FIG. 33, and accordingly, detailed description thereof will be omitted.

Figure 34:
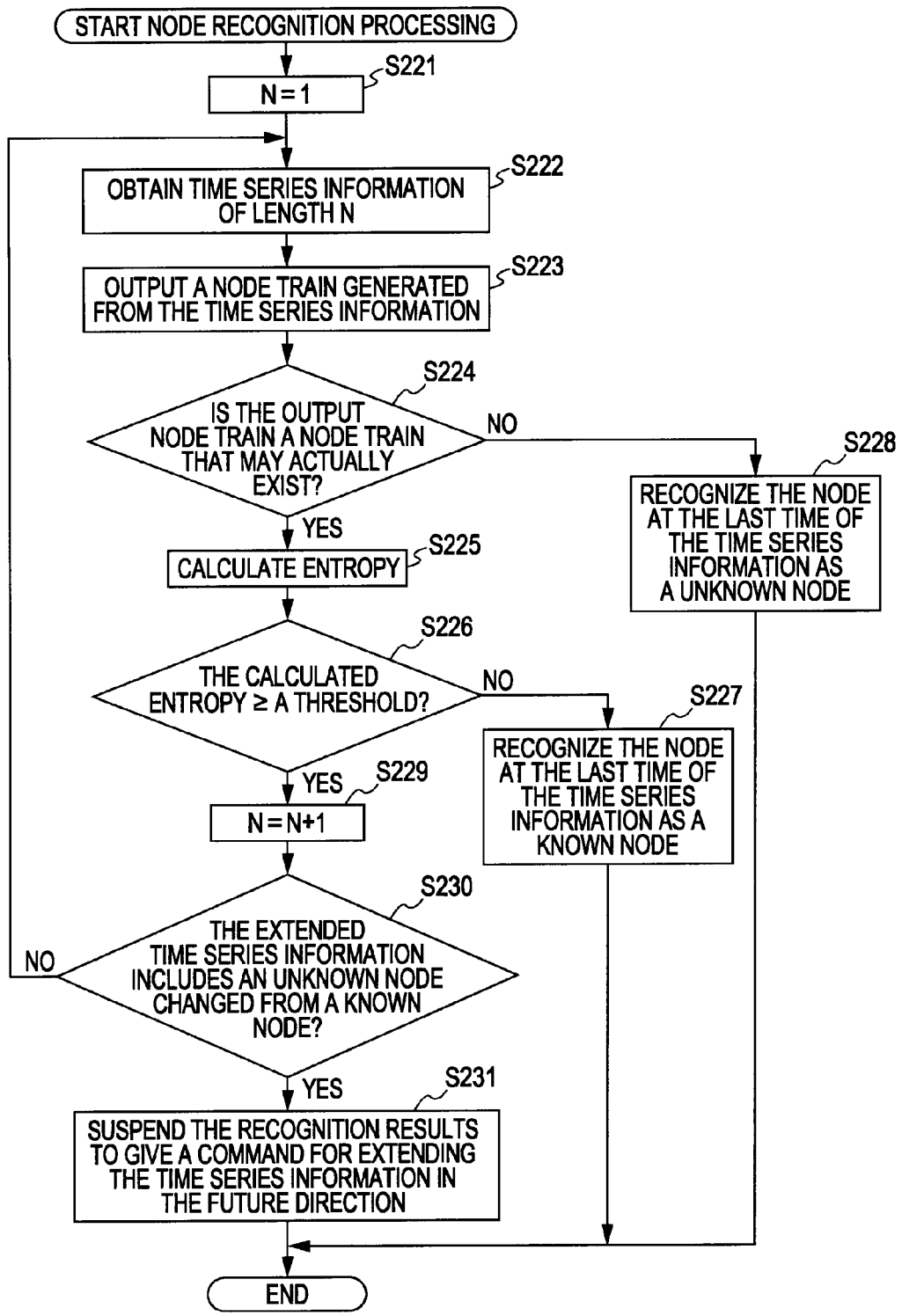
FIG. 34 is a flowchart for describing another example of the node recognition processing.

In the case of the example in FIG. 34, upon the value of the variable N being incremented by one in the processing in step S229, in step S230 determination is made whether or not an unknown node to which transition has been made from a known node is included in the node train. That is to say, each time the value of the variable N is incremented, the time series information to be obtained is extended in the past direction, but upon extending the node train in the past direction, determination is made whether or not an unknown node to which transition has been made from a known node is included. That is to say, the time series information is not allowed to be extended prior to the point in time when transition has been made from a known node to an unknown node.

In the event that determination is made in step S230 that an unknown node to which transition has been made from a known node is included, the processing proceeds to step S231. In the event that determination is made in step S230 that an unknown node to which transition has been made from a known node is not included, the processing returns to step S222.

In step S231, the recognizing device 35 commands to suspend the recognition result, and to extend the time series information in the future direction. That is to say, further an action is executed to output a message or the like to command to accumulate the time series information. At this time, the recognizing device 35 outputs control information so as to control the action generator 36 to execute an action, for example.

That is to say, recognition of a node at the current point is implausibly difficult, or even if we say that recognition is possible an unreliable recognition result is obtained, and accordingly, the recognizing device 35 suspends the recognition result, and outputs a command to further accumulate the time series information.

The recognition processing may be executed such as illustrated in FIG. 34. Incidentally, with the processing described above with reference to FIGS. 33 and 34, description has been made wherein determination is made whether or not the output node train is an actually possible node train depending on whether the node train X and the observation series O satisfy Expressions (46) and (47). However, an arrangement may be made wherein determination is made whether or not the output node train is an actually possible node train based on change in the value of the entropy of the recognized current state probability.

Specifically, an arrangement may be made wherein the entropy to be calculated by Expression (48) based on the time series information of the length N is represented as $E_N$, and the entropy to be calculated by Expression (48) based on the time series information of the length N−1 is represented as $E_{N-1}$, and then $\Delta E = E_N - E_{N-1}$ is calculated. Subsequently, $\Delta E$ and a predetermined threshold $Thres_{ent}$ are compared, the number of times of repetition of the comparison processing thereof is compared with a threshold $Thres_{stable}$, and the node is recognized based on these comparison results.

For example, in the event that $\Delta E < Thres_{ent}$ is not satisfied, the times series information is extended in the past direction, and further entropy is calculated, and determination is made whether or not $\Delta E < Thres_{ent}$ is satisfied. In the event that $\Delta E < Thres_{ent}$ is satisfied, a counter NC is counted up, and when $NC > Thres_{stable}$ is satisfied, recognition of the node will be performed.

Next, description will be made regarding an example of a case where recognition is performed based on change in the value of entropy of a state probability, with reference to the flowchart in FIG. 35. This processing is processing serving as an example of a third method of the node recognition processing by the recognizing device 35.

In step S251, the recognizing device 35 sets the value of a variable N to 1 that is an initial value.

In step S252, the recognizing device 35 obtains the time series information of the length N from the observation buffer 33 and the action output buffer 39.

In step S253, the recognizing device 35 uses the Viterbi algorithm to output a node train based on the time series information obtained in step S252.

In step S254, the recognizing device 35 calculates of difference of entropy. At this time, as described above, the entropy to be calculated by Expression (48) based on the time series information of the length N is represented as $E_N$, and the entropy to be calculated by Expression (48) based on the time series information of the length N−1 is represented as $E_{N-1}$, and then $\Delta E = E_N - E_{N-1}$ is calculated. Note that the calculation in step S254 is executed when the value of the N is equal to or greater than 2.

In step S255, the recognizing device 35 determines whether or not the difference of entropy calculated in step S254 is equal to or greater than the threshold $Thres_{ent}$. In the event that determination is made in step S255 that the difference of entropy calculated in step S254 is less than the threshold, the processing proceeds to step S256.

In step S256, the recognizing device 35 increments the value of the counter NC by one.

In step S257, the recognizing device 35 determines whether or not the value of the counter NC is equal to or greater than the threshold $Thres_{stable}$. In the event that determination is made in step S257 that the value of the counter NC is equal to or greater than the threshold $Thres_{stable}$, the processing proceeds to step S258.

In step S258, the recognizing device 35 determines whether or not, as a result of the processing in step S253, the output node train is an actually possible node train. At this time, as described above, determination is made whether or not the node train X and the observation series O satisfy Expressions (46) and (47). In the event that the node train X and the observation series O satisfy Expressions (46) and (47), determination is made in step S258 that the output node train is an actually possible node train. On the other hand, in the event that the node train X and the observation series O do not satisfy at least one of Expressions (46) and (47), determination is made in step S258 that the output node train is not an actually possible node train.

In the event that determination is made in step S258 that the output node train is not an actually possible node train, the processing proceeds to step S262, and the recognizing device 35 recognizes the node at the last point in time of the time series information as an unknown node. The recognition result in step S262 is stored in the recognition result buffer 38 in a manner correlated with the last point in time of the time series information.

On the other hand, in the event that determination is made in step S258 that the output node train is an actually possible node train, the processing proceeds to step S259.

In step S259, the recognizing device 35 calculates entropy. At this time, as described above, entropy is calculated by Expression (48).

In step S260, the recognizing device 35 compares the value of the entropy calculated in the processing in step S259 with a predetermined threshold, and determines whether or not the value of the entropy is equal to or greater than the threshold.

In the event that determination is made in step S260 that the value of the entropy is equal to or greater than the threshold, the processing proceeds to step S263.

In step S263, the recognizing device 35 commands to suspend the recognition result, and to extend the time series information in the future direction. That is to say, further an action is executed to output a message or the like to command to accumulate the time series information. At this time, the recognizing device 35 outputs control information so as to control the action generator 36 to execute an action, for example.

That is to say, recognition of a node at the current point is implausibly difficult, or even if we say that recognition is possible, an unreliable recognition result is obtained, and accordingly, the recognizing device 35 suspends the recognition result, and outputs a command to further accumulate the time series information.

On the other hand, in the event that determination is made in step S260 that the value of the entropy is less than the threshold, the processing proceeds to step S261, and the recognizing device 35 recognizes the node at the last point in time of the time series information as a known node.

The recognition result in step S261 is stored in the recognition result buffer 38 in a manner correlated with the last point in time of the time series information.

Alternatively, an arrangement may be made wherein in step S258, determination is further made whether or not the number of characteristic nodes included in the output node train is equal to or greater than a threshold Thres, and only in the case of the Thres or more, the processing proceeds to step S259 or step S262. In this case, in the event that determination is made in step S258 that the number of characteristic nodes included in the output node train is less than a threshold Thres, the processing should proceed to step S265. That is to say, the value of the variable N should be incremented by one.

Also, in the event that determination is made in step S255 that the difference of the entropy calculated in step S254 is equal to or greater than the threshold $Thres_{ent}$, the processing proceeds to step S264, and the value of the counter NC is set to zero.

After the processing in step S264, or in the event that determination is made in step S257 that the value of the counter NC is less than the threshold $Thres_{stable}$, the processing proceeds to step S265.

In step S265, the recognizing device 35 increments the value of the variable N by one. Thus, with the processing in step S252 to be subsequently executed, the time series information of which the length is N+1 is obtained. Note that each time the value of the variable N is incremented in step S265, the time series information to be obtained in step S252 is extended in the past direction.

Thus, until determination is made in step S255 that the difference of the entropy is less than the threshold $Thres_{ent}$, and also determination is made in step S257 that the value of the counter NC is equal to or greater than the threshold $Thres_{stable}$, the processing in steps S252 through S257, and S265 is repeatedly executed.

In this way, the node recognition processing is executed. In the case of the example in FIG. 35, it is confirmed by the processing in steps S255 and S257 that the value of the entropy converged, and subsequently, determination is made whether or not the output node train is an actually possible node train. Accordingly, for example, more reliable recognition can be performed as compared to the case described above with reference to FIG. 33.

Figure 35:
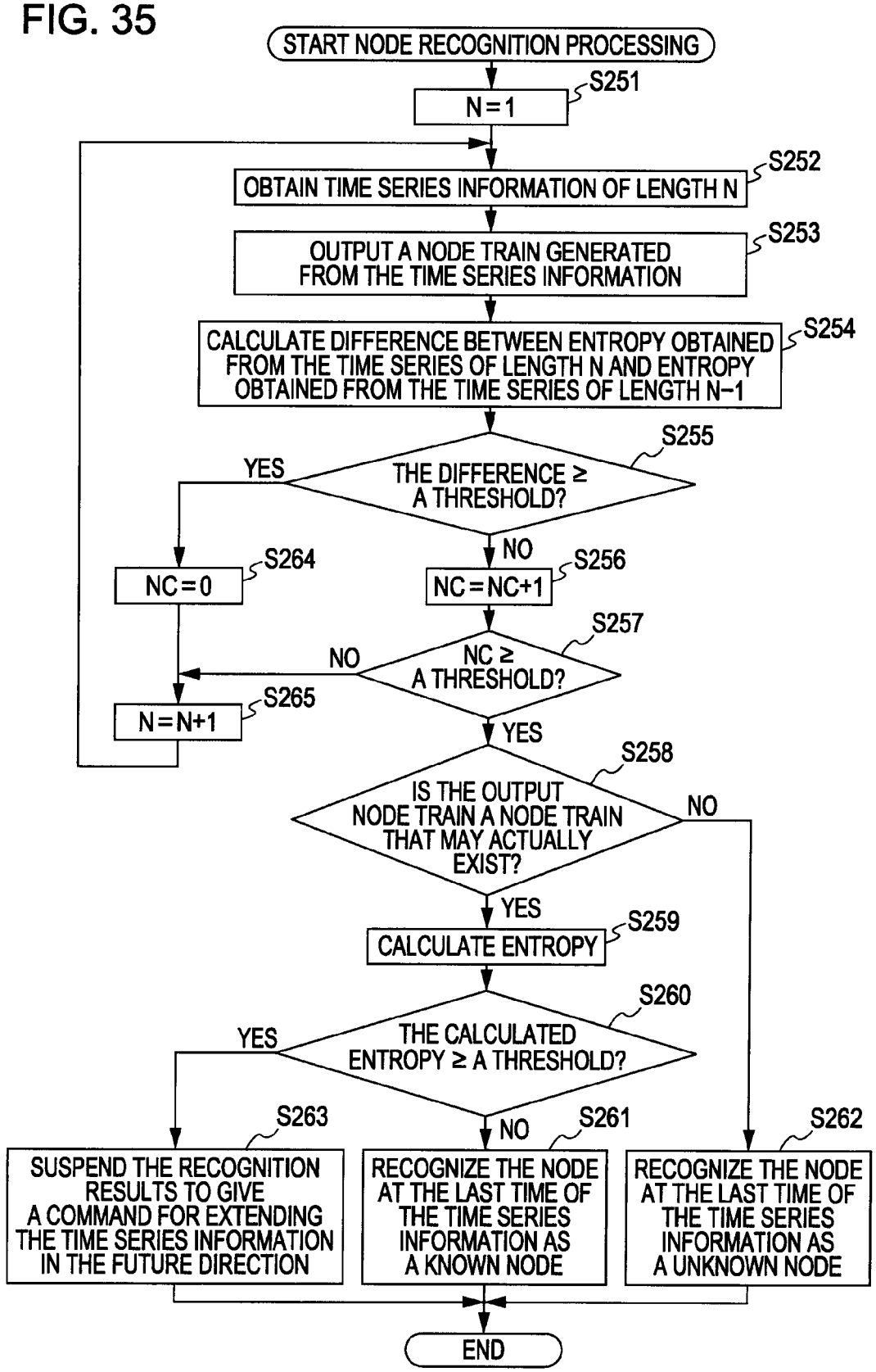
FIG. 35 is a flowchart for describing yet another example of the node recognition processing.

Also, in the case of the processing in FIG. 35 as well, the time series information is not allowed to be extended prior to the point in time when transition has been made from a known node to an unknown node. This is because accurate recognition results are not allowed to be obtained based on the node train including an unknown node to which transition has been made from a known node.

Accordingly, a node recognized as an unknown node to which transition has been made from a known node is not included in the node train corresponding to the time series information, and accordingly, the value of the length N of the time series information has an upper limit. Note that whether or not the present node is an unknown node to which transition has been made from a known node can be determined based on the information stored in the recognition result buffer 38.

Next, description will be made regarding an example of the node recognition processing when considering that there is an upper limit of the value of the length N of the time series information, in the case that recognition is performed based on change in the value of the entropy of a state probability, with reference to the flowchart in FIG. 36. This processing is processing serving as an example of a fourth method of the node recognition processing by the recognizing device 35.

Processing in steps S281 through S295 is the same as the processing in step S251 through S265 in FIG. 35, and accordingly, detailed description thereof will be omitted.

Figure 36:
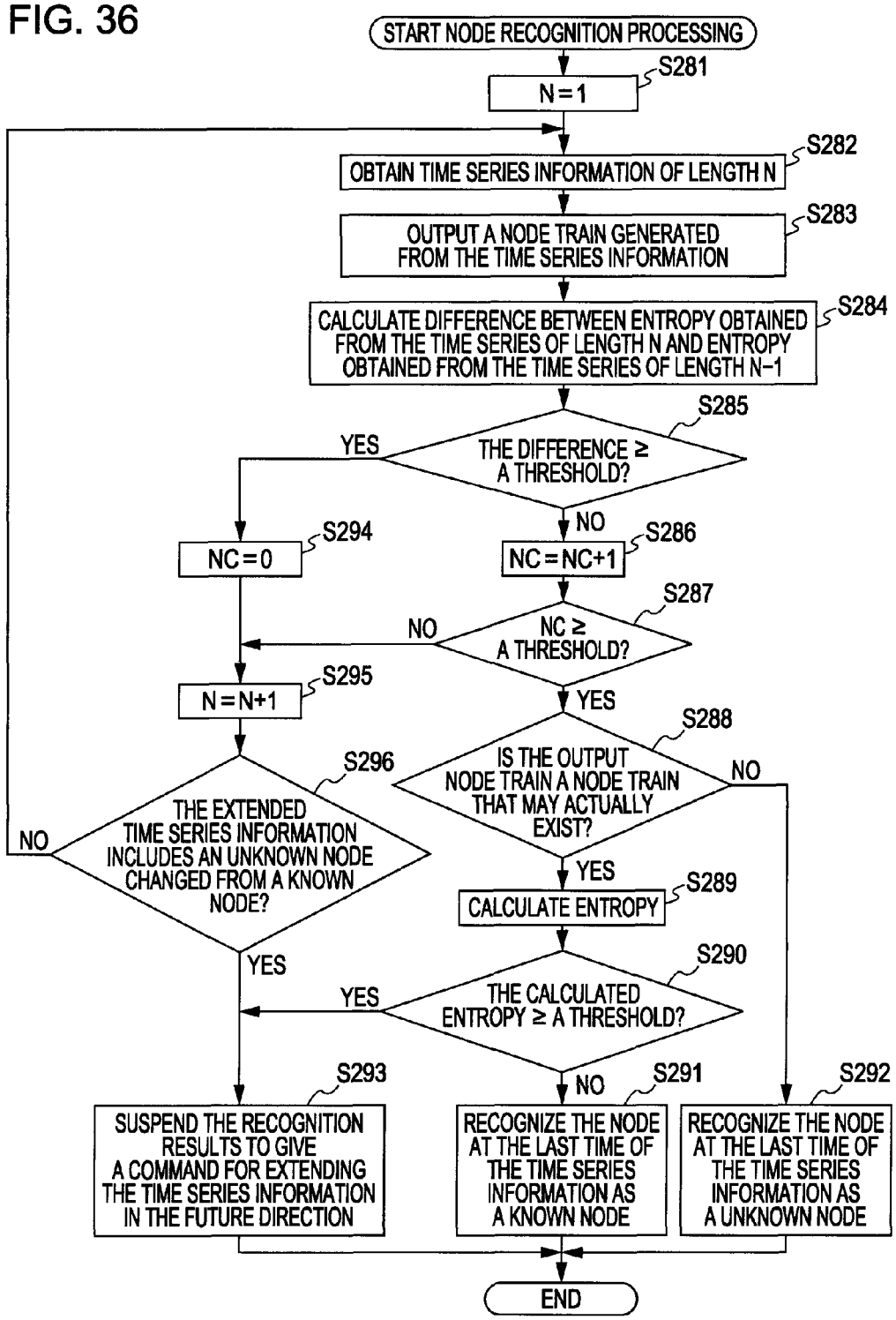
FIG. 36 is a flowchart for describing yet another example of the node recognition processing.

In the case of the example in FIG. 36, upon the value of the variable N being incremented by one in the processing in step S295, in step S296 determination is made whether or not an unknown node to which transition has been made from a known node is included in the node train. That is to say, each time the value of the variable N is incremented, the time series information to be obtained is extended in the past direction, but upon extending the node train in the past direction, determination is made whether or not an unknown node to which transition has been made from a known node is included.

In the event that determination is made in step S296 that an unknown node to which transition has been made from a known node is included, the processing proceeds to step S293. In the event that determination is made in step S296 that an unknown node to which transition has been made from a known node is not included, the processing returns to step S282.

In step S293, the recognizing device 35 commands to suspend the recognition result, and to extend the time series information in the future direction. That is to say, further an action is executed to output a message or the like to command to accumulate the time series information. At this time, the recognizing device 35 outputs control information so as to control the action generator 36 to execute an action, for example.

That is to say, recognition of a node at the current point is implausibly difficult, or even if we say that recognition is possible, an unreliable recognition result is obtained, and accordingly, the recognizing device 35 suspends the recognition result, and outputs a command to further accumulate the time series information. The recognition processing may be executed such as illustrated in FIG. 36.

According to the four types of methods described with reference to FIGS. 33 through 36, the robot can recognize that itself is located above a newly added part (unknown node) of the maze, or that itself is located above an already presented part (known node). The state transition probability and the observation probability relating to an unknown node thus recognized are set to extend the state transition probability table and the observation probability table.

Note that description has been made here regarding an example of a case where recognition according to the action expanded HMM is performed, but the recognition processing in FIGS. 33 through 36 can also be applied to recognition according to usual HMM.

Incidentally, in the case that the agent autonomously recognizes change in the environment to extend the state transition probability table and the observation probability table, a problem is when, and how many unknown nodes to newly include in the state transition probability table and the observation probability table and the like. Next, description will be made regarding the number of unknown nodes to be added, and timing for adding, in the case that change in the environment is autonomously recognized and an unknown node is to be added to the internal model data.

Note that the term "addition of an unknown node to the internal model data" means that a new index representing a node regarded as an unknown node is generated, and for example, the matrix corresponding to the index thereof is added to the state transition probability table and the like.

According to the method described above with reference to FIGS. 33 through 36, time passed from a point in time when recognizing that itself is located at a node to be newly added (unknown node) will be taken as N. This time N can also be translated into the length of the time series information. Also, as a threshold for ensuring recognition precision, a threshold Thres of the number of characteristic nodes in the node train that is a recognition result will be provided.

First, the agent repeats an action until the number of characteristic nodes include in the time series information of the length N reaches the value of the Thres. Specifically, according to the action generator 36 and the action output unit 32, actions of N times are executed, and the time series information of the length N is accumulated in the observation buffer 33 and the action output buffer 39. Note that the term "the time series information of the length N" means the time series information of the temporal length N after a point in time when recognizing that itself is located at an unknown node. Also, hereafter, in the sense that the number of characteristic nodes included in the node train of the length Lr recognized based on "the times series information of the length N" "becomes the value of the Thres", "the Lr becomes the value of the Thres" will be represented as appropriate.

In the case that the Lr becomes equal to or greater than the Thres, the recognizing device 35 executes the recognition processing described above with reference to FIG. 34 or 36 based on the time series information. In this case, there is the upper limit N of the length of the time series information.

The node train to be output in step S223 in FIG. 34 or in step S283 in FIG. 36 of the recognition processing to be executed here will be taken as S, and the length of the node train thereof will be taken as Lr.

Subsequently, in the case that the present node has been recognized as an unknown node in step S228 in FIG. 34 or in step S292 in FIG. 36, the node thereof is regarded as an unknown node, and is added to the internal model data by the learning device 34.

If we say that the number of nodes to have been added after being actually regarded as unknown will be m_add, the number of unknown nodes to be added m can be represented by Expression (49).

$$m = N - (Lr + m\_add + 1) \quad (49)$$

Note that in the case that addition of an unknown node has already been performed since recognition has been made for the first time that itself is located at an unknown node, the m_add will be a number representing the number of added nodes. That is to say, Expression (49) shows that after recognition of being located at an unknown node, the number of nodes regarded as an unknown node and added is subtracted, and then nodes are added until the node to be added reaches the first recognized node.

Also, "1" to be added in the right side in Expression (49) indicates that it is not determined at this point to which node the node corresponding to the most past point in time of the node train of the length Lr should be connected, and accordingly, determination is suspended.

Figure 37:
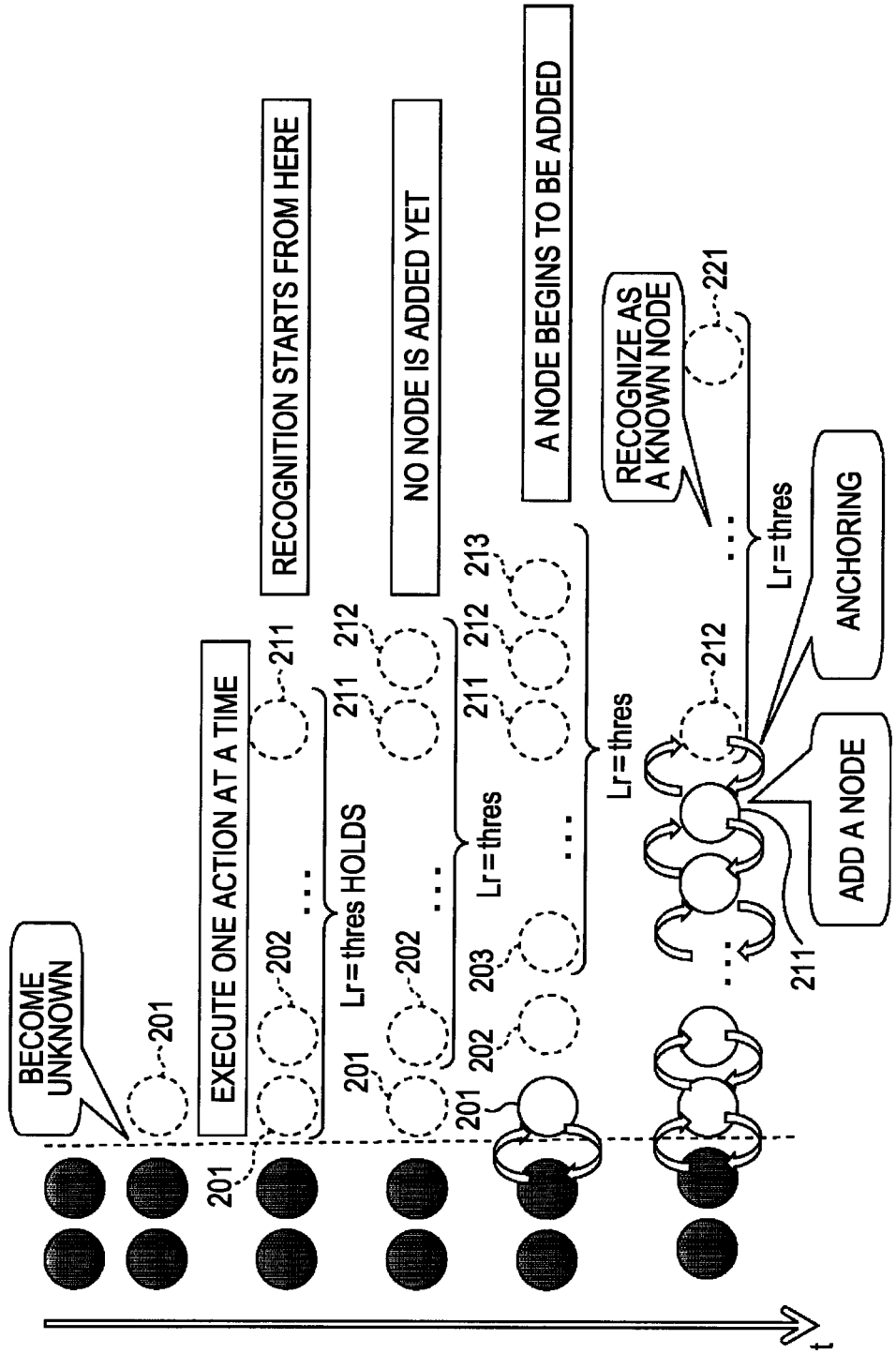
FIG. 37 is a diagram for describing an example of a case where unknown nodes are added.

Description will be made further in detail with reference to FIG. 37. In FIG. 37, a time axis t is provided in the vertical direction in the drawing, a node that the agent proceeded over time is illustrated by a circle in the drawing. Also, in the drawing, a dotted line in the vertical direction is for illustrating a node first recognized as itself being located at an unknown node. With this example, a node 201 is a node first recognized as itself being located at an unknown node.

Further, in order to simplify description, let us say that in the event that an action is executed once, the number of nodes illustrated by a circle in the drawing, and the length of the time series information are increased by one, and these nodes have been all recognized as a characteristic node unless otherwise noted.

As illustrated in the drawing, after first recognizing that itself is located at an unknown node, the time series information is accumulated by an action being executed one at a time. Subsequently, after the length N of the time series information is equal to the threshold Thres (in this case, Lr=N), the recognizing device 35 executes the recognition processing described above with reference to FIG. 34 or 36 based on the time series information. In the case of this example, let us say that a node train of nodes 201, 202, . . . , 211 is output, and the node 211 has been recognized as an unknown node.

Subsequently, further a single action is executed, the agent proceeds to a node 212. At this time, let us say that the recognition processing based on the time series information of the length Lr corresponding to the nodes 202 through 212 has been executed, and the node 212 has been recognized as an unknown node. At this point, addition of the unknown node has not been performed yet.

Subsequently, further a single action is executed, the agent proceeds to a node 213. At this time, let us say that the recognition processing based on the time series information of the length Lr corresponding to the nodes 203 through 213 has been executed, and the node 213 has been recognized as an unknown node. At this point, addition of the node 201 is performed. Thus, with the subsequent recognition processing, the node 201 will be handled as a known node.

In this case, the length (temporal length after a point in time when recognizing that itself is located at an unknown node) N of the time series information is Thres+2. Also, in this case, the nodes 203 through 213 correspond to a node train S, and the length Lr of the node train S is Thres. Therefore, according to Expression (49), the number of nodes m to be added is calculated as Thres+2−(Thres+0+1)=1. Accordingly, the single node 201 that was an unknown node has been newly added.

That is to say, the matrix of a new index representing the node 201 is added to the state transition probability table or the like of the internal model data.

Note that, with the above example, the nodes 211 through 213 have been recognized as an unknown node, but it is unknown whether or not the node 201 was an unknown node in the true sense. For example, the reason why the node 211 has been determined to be an unknown node is a result that the node train of the nodes 201 through 211 has been determined not to be an actually possible node train, and accordingly, the node 211 in not necessarily a node not presented in the existing internal model data. That is to say, in the event that one of the nodes 201 through 211 is a node not presented in the existing internal model data, the node 211 is recognized as an unknown node.

Accordingly, even in the event that the node 201 is regarded as an unknown node at this point, and the matrix of a new index representing the node 201 is added to the state transition probability table or the like of the internal model data, this may result in being duplicated with the matrix of the existing index. Thus, it is unknown whether or not the node 201 was an unknown node in the true sense.

Note that description has been made here whether or not the node 201 was an unknown node in the true sense for convenience of description, but with the example in FIG. 37, it is a precondition that the node 201 was an unknown node in the true sense. Accordingly, under a normal situation, description to the effect that it is unknown whether or not the nodes 202, 203, and so on to be subsequently added were unknown nodes in the true sense is suitable.

As described above, even though it is unknown whether or not the node 201 was an unknown node in the true sense, in the event that a new index representing the node 201 is not added to the internal model data by excessively fearing a probability that the matrix of the new index may be duplicated with the matrix of the existing index, a problem occurs. This is because learning will not be completed eternally depending on the situation of the agent.

For example, in the event that a maze that is an environment has been extended, a new maze room has been created, and a robot which is an agent has been encased in the new maze room, even though it is not assured that a node to be added was an unknown node in the true sense, there is no other choice than adding this node.

Therefore, a predetermined number of nodes have to be added to the internal model data at timing after predetermined elapsed time since it was recognized for the first time that itself is located at an unknown node.

Description will return to FIG. 37. After the node 201 is added to the internal model data, further an action is executed, and the recognition processing is executed based on the time series information. As a result of the recognition processing based on the time series information corresponding to the nodes 212 through 221, in the event that recognition is made that the node 221 is a known node, this means that the nodes 212 through 221 are all known nodes. At this time, the node 211 is added, and also anchoring from the node 211 to the node 212 is performed. Anchoring is processing wherein in the case that transition from an unknown node to a known node has been recognized, a state transition probability between an unknown node and a known node, or the like is set. Note that the details of anchoring will be described later.

Incidentally, with the recognition processing described above with reference to FIG. 34 or 36, there is a case where a command for suspending the recognition result to extend the time series information in the future direction is output. In such a case, with the length Thres of the time series information, suitable recognition is not performed, and accordingly the length of the time series information has to be extended in the future direction.

Figure 38:
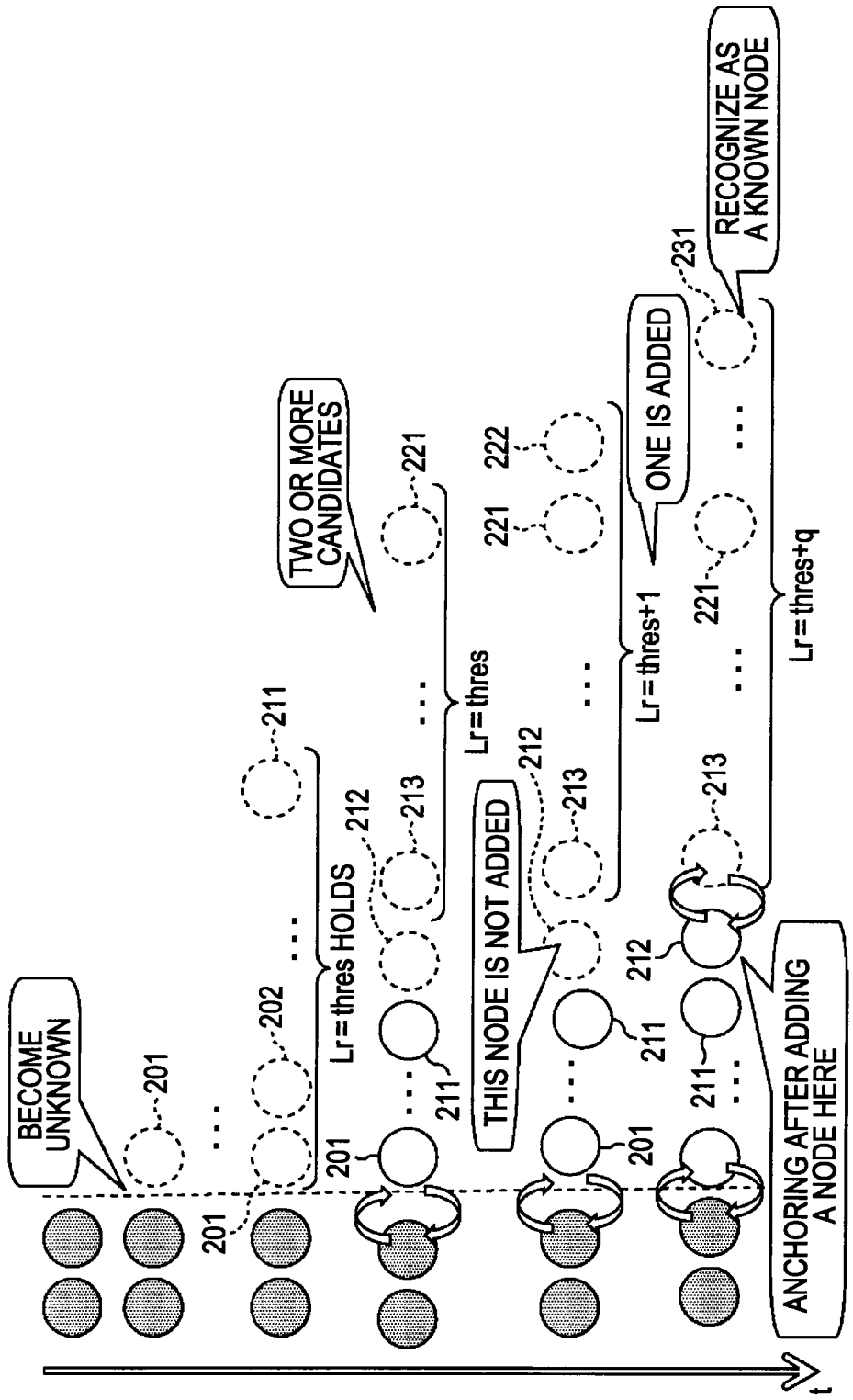
FIG. 38 is a diagram for describing another example of a case where unknown nodes are added.

Description will be made further in detail regarding a case where, with the recognition processing, the recognition result has been suspended, and a command for extending the time series information in the future direction has been output, with reference to FIG. 38. In FIG. 38, in the same way as FIG. 37, the time axis t is provided in the vertical direction in the drawing, a node that the agent proceeded over time is illustrated by a circle in the drawing. Also, in the drawing, a dotted line in the vertical direction is for illustrating a node first recognized as itself being located at an unknown node. With this example, the node 201 is a node first recognized as itself being located at an unknown node.

As illustrated in the drawing, after first recognizing that itself is located at an unknown node, the time series information is accumulated by an action being executed one at a time. Subsequently, after the length N of the time series information is equal to the threshold Thres (in this case, Lr=N), the recognizing device 35 executes the recognition processing described above with reference to FIG. 34 or 36 based on the time series information. In the case of this example, let us say that a node train of nodes 201, 202, . . . , 211 is output, and the nodes 201 through 211 have all been recognized as an unknown node. Also, with this example, let us say that the nodes 201 through 211 have been added to the internal model data. Thus, with the subsequent recognition processing, the nodes 201 through 211 will be handled as a known node.

When the agent proceeds to the node 221, the recognition processing is executed based on the time series information of the length Lr, and at this point, let us say that the recognition result has been suspended, and a command for extending the time series information in the future direction has been output. That is to say, at this point, no node train is allowed to be uniquely recognized, and even in the event of recognizing a node train, there are multiple candidates.

In such a case, the value of the threshold Thres is incremented by one, a single action is newly executed, and the length of the time series information serving as an object of the recognition processing is also incremented by one. Thus, let us say that the agent has proceeded to the node 222. At this point, the recognition processing has been executed based on the time series information of the length Thres+1, a node train of the length Lr (=Thres+1) has been obtained, but also at this point, the recognition result has been suspended, and a command for extending the time series information in the future direction has been output.

Subsequently, the value of the threshold Thres has been incremented, and further an action has been executed, and accordingly, the agent has proceeded to the node 231. At this point, let us say that the recognition processing has been executed based on the time series information of the length Thres+q, and accordingly, the node 231 has been recognized as a known node.

In the event that the node 231 has been recognized as a known node, this means that the nodes 213 through 231 have all been known nodes. At this time, the node 212 is added, and also anchoring from the node 212 to the node 213 is performed.

However, as described above, of the nodes regarded as an unknown node and added, a node that is actually a known node may be included. Also, for example, even in the event that the agent has actually repeatedly proceeded to the same node (e.g., in the case of reciprocating between two nodes), these may be recognized as different nodes.

Thus, in order to prevent a node that is not necessarily an unknown node being regarded as an unknown node, and such an unknown node being added to the internal model data, for example, a necessity check for adding or deleting a node is performed at the time of performing anchoring.

Figure 39:
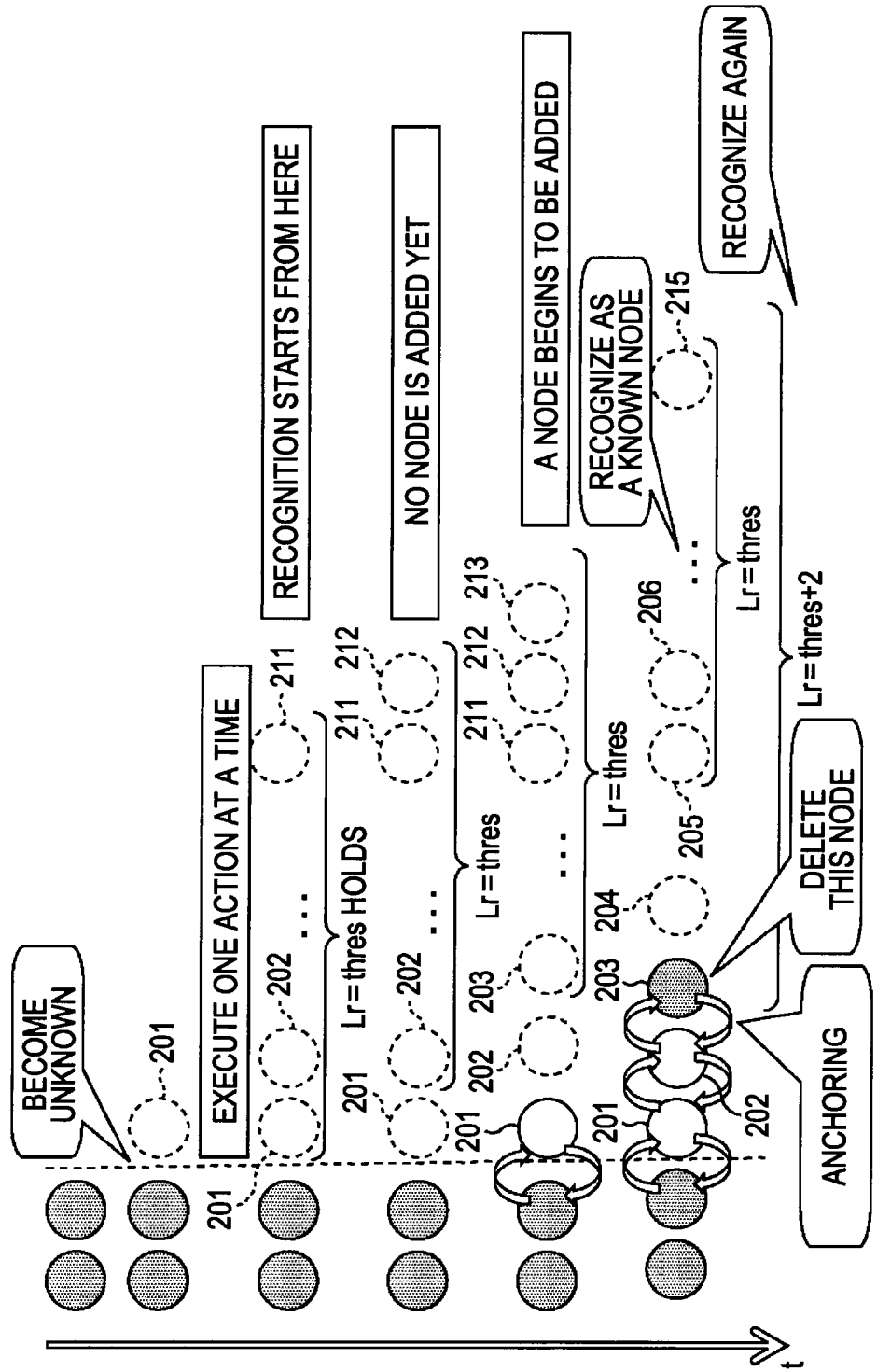
FIG. 39 is a diagram for describing an example of a case where addition/deletion necessity check is performed at the time of performing anchoring.

Description will be made further in detail regarding an example of a case where necessity check for adding or deleting a node is performed at the time of performing anchoring, with reference to FIG. 39. In FIG. 39, in the same way as FIG. 37, the time axis t is provided in the vertical direction in the drawing, a node that the agent proceeded over time is illustrated by a circle in the drawing. Also, in the drawing, a dotted line in the vertical direction is for illustrating a node first recognized as itself being located at an unknown node. With this example, the node 201 is a node first recognized as itself being located at an unknown node.

As illustrated in the drawing, after first recognizing that itself is located at an unknown node, the time series information is accumulated by an action being executed one at a time. Subsequently, after the length N of the time series information is equal to the threshold Thres (in this case, Lr=N), the recognizing device 35 executes the recognition processing described above with reference to FIG. 34 or 36 based on the time series information. In the case of this example, let us say that a node train of nodes 201, 202, . . . , 211 is output, and the nodes 201 through 211 have all been recognized as an unknown node.

Subsequently, further a single action is executed, the agent proceeds to the node 212, but at this point, addition of the unknown node has not been performed yet.

Subsequently, further a single action is executed, and upon the agent proceeding to a node 213, addition of the node 201 is performed.

Let us say that, in this way, actions have been executed, and the agent has proceeded to the node 215. Also, at this time, let us say that addition of the nodes 201 through 203 has already been performed. At this point, the nodes 201 through 203 have been regarded as an unknown node and added, and for example, a node having a new index has been added to the internal model data. Subsequently, as a result of the recognition processing based on the time series information corresponding to the nodes 205 through 215 having been executed, in the event that the node 215 has been recognized as a known node, this means that the nodes 205 through 215 have all been known nodes.

At this time, necessity check for deleting a node is performed. Specifically, the length of the time series information is extended in the past direction, and the recognition processing based on the extended time series information is executed. As a result thereof, for example, the recognition processing based on the time series information corresponding to the nodes 203 through 215 is executed. As a result thereof, the nodes 203 through 215 have all been recognized as known nodes. That is to say, the node 203 has been regarded as an unknown node and added, and for example, a node having a new index has been added to the internal model data, but originally, this node is a known node, and accordingly, the added index node has to be deleted from the internal model data.

For example, in the event that the nodes 203 and 205 are actually nodes having the same index, and also the nodes 204 and 206 are actually nodes having the same index, recognition will be performed such as described above.

For example, let us say that a new matrix has been added to the state transition probability table or the like with the index of the node 203 as u, but as a result of the necessity check for deleting a node being performed, it has found that the index of the node 203 is f. Let us say that the matrix corresponding to the index f has already been presented in the state transition probability table or the like before the agent proceeds to the node 201. In this case, the matrix corresponding to the index u, and the matrix corresponding to the index f are presented in a duplicated manner, and accordingly, the matrix corresponding to the index u has to be deleted from the state transition probability table or the like.

As a result thereof, the matrix corresponding to the index u newly added as the index of the node 203, or the like is deleted from the internal model data, and anchoring from the node 202 to the node 203 recognized as a known node is performed.

For example, with the above example, in the event that a new matrix has been added to the state transition probability table or the like with the index of the node 202 as t, a state transition probability from the node of the index t to the node of the index f, or the like is set by anchoring.

Note that, after anchoring is performed, learning by the addition learning method will be performed based on the time series information accumulated so far. Specifically, with the internal model data immediately after anchoring as an initial value, learning based on the time series information corresponding to the nodes 201 through 215 in FIG. 39, and one node on the left side of the node 201 is performed.

As described above, anchoring is processing wherein in the case that transition from an unknown node to a known node has been recognized, a state transition probability between an unknown node and a known node, or the like is set. With an embodiment of the present invention, after anchoring is performed, learning by the additional learning method is performed based on the time series information accumulated so far.

That is to say, learning by the additional learning method is performed based on the internal model data after an unknown node is added. Even if we say that nodes actually having the same index have been added in a duplicated manner as unknown nodes, there is a high possibility by this learning that these nodes may be merged as the same nodes by the above forward merging algorithm and backward merging algorithm being applied.

Also, learning by the additional learning method is not allowed to be executed until anchoring is performed, whereby the number of parameters to be updated in the internal model data can be reduced as much as possible. This is because necessity check for deleting a node is performed at the time of anchoring. Accordingly, the internal model data can suitably be updated while suppressing the calculation amount.

Thus, in the event that necessity check for deleting a node is performed at the time of anchoring, the number of unknown nodes m to be added can be represented by Expression (50) instead of Expression (49).

$$m=N-(Lr+m\_add) \quad (50)$$

In this case, the length (temporal length after a point in time when recognizing that itself is located at an unknown node) N of the time series information is 11. Also, in this case, the nodes 203 through 215 correspond to a node train S, and the length Lr of the node train S is Thres+2. Therefore, according to Expression (50), the number of nodes m to be added is calculated as Thres+4−(Thres+2+3)=−1. Accordingly, of the three nodes already added, (the matrix corresponding to the index of) the single node 203 is deleted.

Description has been made here regarding an example of only a case where a node is deleted, but a node may be added depending on the value of the m_add. Specifically, in the event that the m calculated by Expression (50) or later-described Expression (51) is a positive value, the nodes of the worth thereof are added. Accordingly, in reality, necessity check for adding or deleting a node is performed at the time of anchoring.

Note that in the event that, as a result of the recognition processing, a node to be deleted is recognized as a known node, deletion of the node thereof is not performed.

Even in the event that the K'th node of the nodes regarded as an unknown node and added is included in the node train S output in the recognition processing, the number of nodes m to be deleted can be represented by Expression (51) instead of Expression (50).

$$m=N-(Lr+K) \quad (51)$$

The |m| nodes calculated by Expression (51) become nodes to be deleted.

Also, in this case, a node to be subjected to anchoring is the ((Lr+K)−N)'th node within the node train S.

Thus, after anchoring is performed, learning by the additional learning method is performed based on the time series information accumulated so far. Also, learning by the additional learning method is not allowed to be executed until anchoring is performed. Accordingly, a node regarded as an unknown node and added to the internal model data before being subjected to anchoring will be recognized as one of known nodes in the subsequent recognition processing, but will be recognized as a tentative known node. A node regarded as an unknown node and added to the internal model data before being subjected to anchoring has a possibility that this node may be a node to be ultimately deleted. Also, the value of a state transition probability or the like between a node regarded as an unknown node and added to the internal model data before being subjected to anchoring, and another node may be changed by learning by the additional learning method.

Incidentally, it has been described above that even though it is not assured that a node to be added was an unknown node in the true sense, there is no other choice than adding a predetermined number of nodes to the internal model data at timing after predetermined elapsed time since it was recognized for the first time that itself is located at an unknown node. That is to say, it can be said that there is an extremely high possibility that information corresponding to an index representing a node simply regarded as an unknown node has been added to the internal model data before anchoring.

However, in the event that an extremely great number of nodes that are not assured of having been unknown nodes in the true sense are each uniformly regarded as an unknown node and added to the internal model data, this may lead to erroneous recognition in the recognition processing. This is because a node regarded as an unknown node and added will also be handled as a known node in the subsequent recognition processing.

As a result thereof, for example, an already existing known node may erroneously be recognized as a node to be regarded as an unknown node and added. This is because the recognition processing is performed based on the internal model data.

In order to suppress such erroneous recognition, a node regarded as an unknown node added may be deleted before anchoring as appropriate. In this case, when the value of the m shown in Expression (49) is smaller than 0, the |m| nodes should be deleted.

For example, let us consider a case where the value of the threshold Thres of the number of characteristic nodes is 7. For example, let us say that a node 216 (not shown) is a node first recognized as itself being located at an unknown node, and now, the agent has proceeded to a node 226 (not shown). Now, let us say that the node 216 is a node already added to the internal model data.

As a result of the recognition processing being performed based on the time series information corresponding to nodes 219 through 226, let us say that the node 226 has been recognized as an unknown node. At this time, the node 217 is added to the internal model data.

Subsequently, the agent proceeds to a node 227 (not shown) by executing an action, and as a result of the recognition processing at this point, let us say that the node 227 has been recognized as an unknown node. At this time, a node 218 is added to the internal model data. However, as a result of the node 218 being added to the internal model data, let us say that the nodes 220, 222, 224, and 226 have been recognized as nodes having the same index as the node 218.

In this case, in order to output a node train including the number of characteristic nodes equal to or greater than the threshold Thres, the length of the time series information has to be the length corresponding to the nodes 217 through 227.

In such a case, the length (nodes 216 through 227) N of the time series information is 12, and the number of already added nodes (nodes 216 through 218) m_add is 3. Also, in this case, the nodes 217 through 227 correspond to the node train S, and the length L of the node train S is 11. Accordingly, the number of nodes m to be added is calculated as 12−(11+3+1)=−3. Accordingly, the nodes 216 through 218, which are three nodes added to the internal model data, are deleted. In this way, erroneous recognition can be suppressed by deleting a node regarded as an unknown node and added as appropriate before performing anchoring.

That is to say, before performing anchoring, processing is performed wherein an unknown node is added, or a node regarded as an unknown node and added is deleted as appropriate. This processing corresponds to later-described step S316 in FIG. 40.

Also, at the time of performing anchoring as well, processing is performed wherein an unknown node is added, or a node regarded as an unknown node and added is deleted as appropriate. This processing corresponds to later-described step S318 in FIG. 40.

Figure 40:
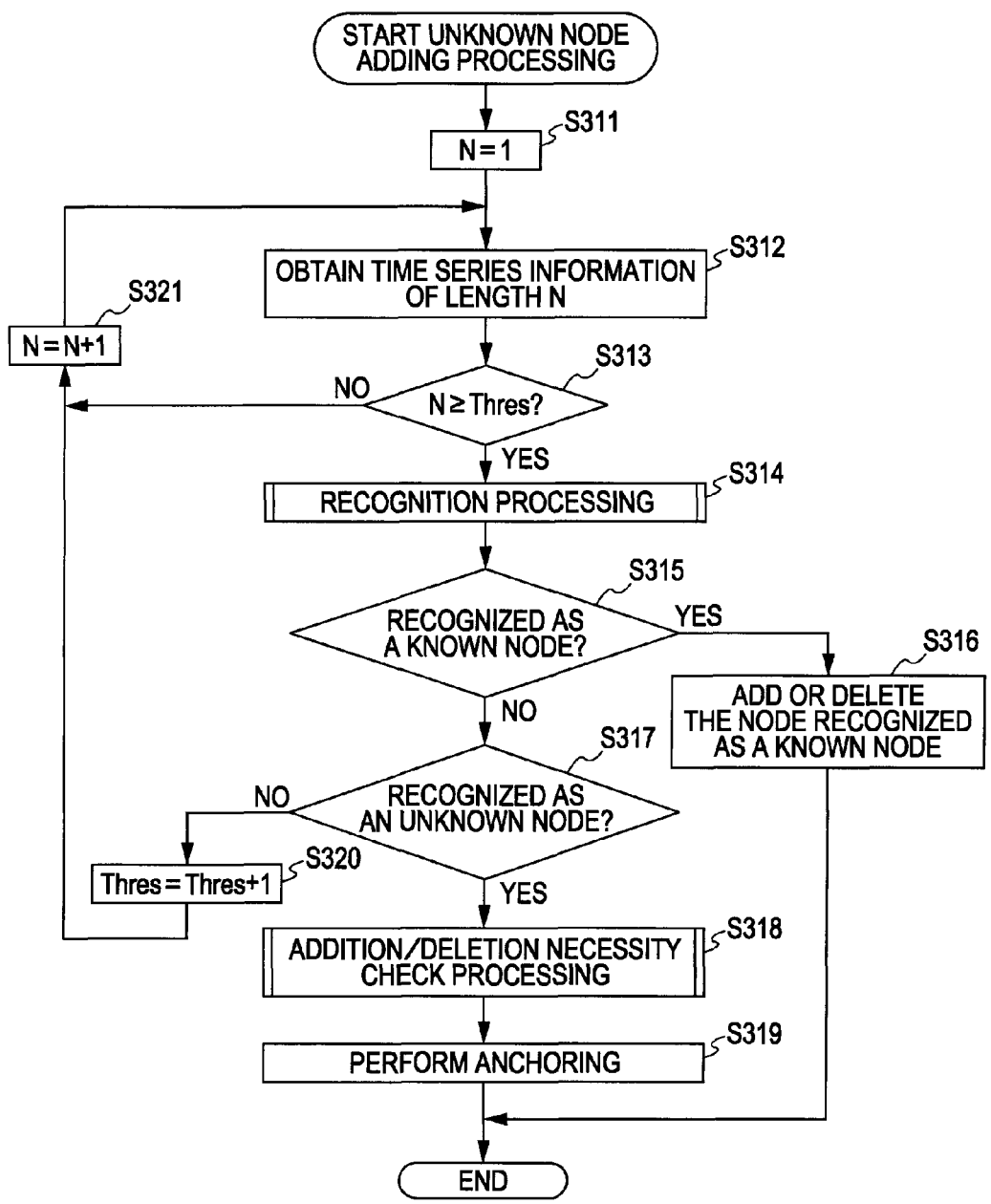
FIG. 40 is a flowchart for describing an example of unknown node adding processing.

Next, unknown node adding processing will be described with reference to the flowchart in FIG. 40. This processing is executed by the autonomous action learning device 10 in the case that the agent autonomously has recognized change in the environment, and has to extend the internal model data.

In step S311, the recognizing device 35 sets the value of a variable N to 1 that is an initial value.

In step S312, the recognizing device 35 obtains the time series information of the length N from the observation buffer 33 and the action output buffer 39.

In step S313, the recognizing device 35 determines whether or not the N is equal to or greater than the threshold Thres of the number of characteristic nodes, and in the event that determination is made that the N is less than the threshold Thres, the processing proceeds to step S321.

In step S321, the value of the variable N is incremented by one, and the processing returns to step S312.

On the other hand, in the event that determination is made in step S313 that the N is equal to or greater than the threshold Thres, the processing proceeds to step S314.

In step S314, the recognizing device 35 executes the recognition processing described above with reference to FIG. 34 or 36. However, in this case, the time series information has been obtained in the processing in step S312, and accordingly, the recognition processing is executed based on the time series information thereof.

In step S315, the learning device 34 determines whether or not, as a result of the recognition processing in step S314, the last node of the node train has been recognized as an unknown node. In the event that determination is made in step S315 that as a result of the recognition result, the last node of the node train has been recognized as an unknown node, the processing proceeds to step S316.

In step S316, the learning device 34 adds or deletes the node regarded as an unknown node.

In step S316, addition of a node is performed, for example, such that in FIG. 37, the node 201 regarded as an unknown node was added to the internal model data. Also, for example, as described above, in order to suppress erroneous recognition, deletion of a node regarded as an unknown node and added is performed before anchoring.

On the other hand, in the event that determination is made in step S315 that, as a result of the recognition processing, the last node of the node train has not been recognized as an unknown node, the processing proceeds to step S317.

In step S317, the learning device 34 determines whether or not, as a result of the recognition processing in step S314, the last node of the node train has been recognized as a known node. In the event that determination is made in step S317 that as a result of the recognition result, the last node of the node train has been recognized as a known node, the processing proceeds to step S318.

Figure 41:
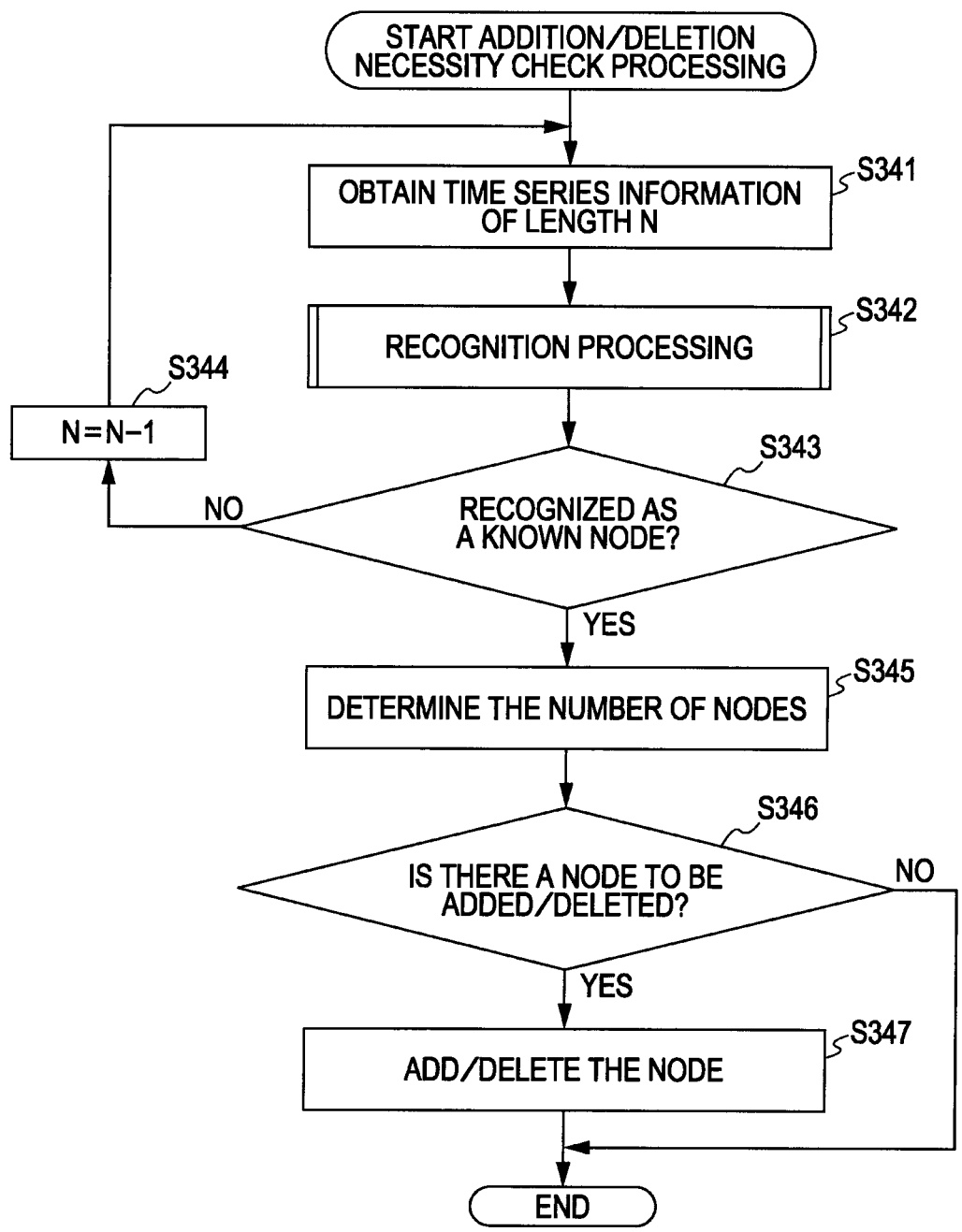
FIG. 41 is a flowchart for describing an example of addition/deletion necessity check processing.

In step S318, the learning device 34 and the recognizing device 35 execute addition/deletion necessity check processing described later with reference to FIG. 41. Thus, for example, such as described above with reference to FIG. 39, necessity for deleting a node at the time of anchoring is checked, when deletion is has to be performed, a node regarded as an unknown node and added is deleted.

In step S319, the learning device 34 performs anchoring. Thus, for example, a state transition probability from a known node to an unknown node, or the like is set.

On the other hand, in the event that determination is made in step S317 that as a result of the recognition result, the last node of the node train has not been recognized as a known node, the processing proceeds to step S320.

In step S320, the recognizing device 35 increments the value of the threshold Thres by one. That is to say, in the event that determination is made in step S317 that as a result of the recognition result, the last node of the node train has not been recognized as a known node, this means that, with the recognition processing, the recognition result has been suspended, and a command for extending the time series information in the future direction has been output. Examples of this include a case where the processing in step S231, or the processing in step S293, described above with reference to FIG. 36 is performed. In this case, for example, as described above with reference to FIG. 38, the value of the threshold Thres has to be incremented, and also the length of the time series information has to be extended in the future direction.

Accordingly, after the processing in step S320, the processing proceeds to step S321. Thus, the unknown node adding processing is executed.

Next, description will be made regarding a detailed example of addition/deletion necessity check processing in step S318 in FIG. 40, with reference to the flowchart in FIG. 41.

In step S341, the recognizing device 35 obtains the time series information of the length N. That is to say, the time series information of the temporal length N after recognizing that itself is located at an unknown node is obtained. For example, in the case of the example in FIG. 39, the time series information of the length corresponding to the nodes 201 through 215 is obtained.

In step S342, the recognizing device 35 executes the recognition processing based on the time series information of the length N. At this time, the recognition processing described above with reference to FIG. 34 or 36. However, in this case, the time series information has obtained in the processing in step S341, and accordingly, the recognition processing is executed based on the time series information thereof.

In step S343, the learning device 34 determines whether or not as a result of the recognition processing in step S342, the last node (temporally the rearmost node) of the node train has been recognized as a known node. In the event that determination is made in step S343 that the last node of the node train has not been recognized as a known node, the processing proceeds to step S344.

In step S344, the recognizing device 35 decrements the length N of the time series information. In this case, the time series information is reduced from the past side. For example, in the case of the example in FIG. 39, the time series information of the length corresponding to the nodes 201 through 215 has been obtained, but this is updated to the time series information of the length corresponding to the nodes 202 through 215.

Thus, until determination is made in step S343 that as a result of the recognition processing, the last node has been recognized as a known node, the time series information is reduced from the past side, and the recognition processing is repeatedly executed.

In the event that determination is made in step S343 that as a result of the recognition processing, the last node has been recognized as a known node, the processing proceeds to step S345. For example, in the case of the example in FIG. 39, as a result of the recognition processing based on the time series information of the length corresponding to the nodes 203 through 215, the nodes 203 through 215 have all been recognized as known nodes. At this time, the number of nodes in the node train of the nodes 203 through 215 is determined.

In step S345, the learning device 34 determines the number of nodes, and performs the calculation described above with reference to Expression (50) with the determined number of nodes as the length Lr of the node train S.

In step S346, the learning device 34 determines whether or not there is a node to be added (or deleted). In the event that determination is made in step S346 that there is a node to be added (or deleted), the processing proceeds to step S347. On the other hand, in the event that determination is made in step S346 that there is no node to be added (or deleted), the processing in step S347 is skipped.

In step S347, the learning device 34 adds (or deletes) the node to be added (or deleted) determined in the processing in step S346. For example, in the case of the example in FIG. 39, according to Expression (50), the number of nodes m to be added is calculated as Thres+4−(Thres+2+3)=−1, and accordingly, of the already added three nodes, the single node 203 is deleted. That is to say, the node 203 has been added as an unknown node, e.g., a node having a new index has been added to the internal model data, but originally, this node is a known node, and the node of the added index is deleted from the internal model data. In this way, the addition/deletion necessity check processing is executed.

When encountering a new situation that is not expressed by the internal model data obtained through learning so far, this situation has to be solved by increasing the number of nodes to express this situation. For example, in the case that the maze where the robot moves is extended in a predetermined direction, the number of nodes increases, and accordingly, the value of the number of nodes N has to be increased.

With the technique according to the related art, in the event that a new node has been detected, immediately on site, the internal model data has been extended, and addition of an index representing a new node has been performed.

However, in general, at the time of incorporating new experience, it is the most important problem what kind of relationship with the existing configuration the experience thereof is positioned in, and for example, immediately after detecting a new node, relationship with the existing configuration is not often sufficiently clear.

Accordingly, immediately adding an index representing a new node to the internal model data may cause future erroneous recognition. For example, under a situation in which new nodes are consecutively detected, a new node is allowed to define relationship as to the last state alone, and the more such a daisy chain continues, the more ambiguity of relationship as to an existing configuration advances at an accelerating pace. Also, even though learning by the additional learning method is performed based on such internal model data, parameters to be adjusted at the time of learning astronomically increase.

Therefore, with an embodiment of the present invention, as described above, an arrangement is made wherein a predetermined number of unknown nodes are added at predetermined timing, and also learning by the additional learning method is performed based on the internal model data immediately after anchoring. Thus, sufficiently effective learning can be performed, for example, not only in a case where a new node sporadically appears in known nodes, but also in an arduous environment where a new node is consecutively detected over along period of time.

As described above, the state transition probability table and the observation probability table can be extended by the agent autonomously recognizing change in the environment, but at this time, the values of a state transition probability and an observation probability and the like to be set in the region extended from each of the tables have to be determined.

An example of a case where each table is extended has been described in FIGS. 30 through 32, but description will be made here regarding a method for estimating a state transition probability as to a node of the extended region from the already stored state transition probability, and setting this.

For example, in a case where the state transition probability table has to be extended such as illustrated in FIG. 31, description has been made wherein normalization has to be performed so that the summation of the probability values of each row of the state transition probability table becomes 1. In other words, with the processing described above in the example in FIG. 31, when setting a state transition probability in the added region, a state transition probability from an already stored known node to another stored known node is not taken into consideration. However, it is predictable that transition from multiple known nodes as to an unknown node added to the internal model data occurs.

For example, in the case that a certain part A in the maze is replaced with another part B, a part C adjacent to the part A is connected to the part B. In such a case, when the robot executes an action for moving from the part C to the part A, there is a high possibility that the robot may move to the part B. Also, when the robot executes an action for moving from the part A to the part C at the part B, there is a high possibility that the robot may move to the part C. With this example, a node of the HMM corresponding to the part B newly has to be added as an unknown node, but a state transition probability with a known node corresponding to the part C has to be set while taking the above into consideration.

Accordingly, it can be conceived that if a state transition probability between an unknown node and a known node, or the like can be set based on a state transition probability from an already stored known node to another stored known node, the state transition probability can be set in a more suitable manner. In other words, if a state transition probability between an unknown node and a known node, or the like can be set based on the past experience, the state transition probability can be set in a more suitable manner.

Now, let us say that known nodes that will be described here include, for example, a node regarded as an unknown node and already stored in the internal model data while the robot is moving through the maze.

The value of a state transition probability to be set as described above has to be determined while taking the following patterns into consideration.

Specifically, in reality, in a case where transition from a node $s_i$ to a node $s_j$ occurs, it has to be taken into consideration whether the node $s_i$ to the node $s_j$ are known nodes or newly added unknown nodes.

That is to say, three patterns of transition from a known node to an unknown node, transition from an unknown node to an unknown node, and transition from an unknown node to a known node have to be taken into consideration.

Figure 42:
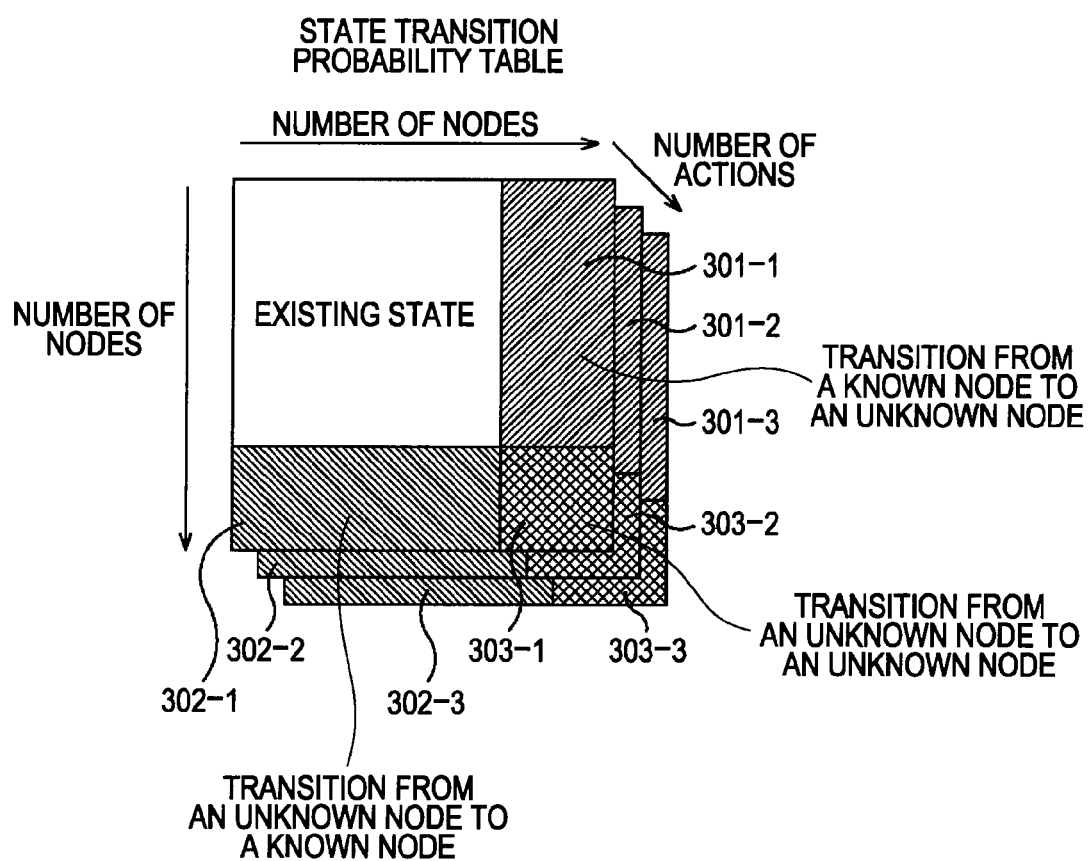
FIG. 42 is a diagram for describing a region to be extended of the state transition probability table in the case of an unknown being added.

For example, in the event that the state transition probability table is extended, a state transition probability from a known node to an unknown node has to be set to regions 301-1 through 301-3 illustrated in FIG. 42. Also, a state transition probability from an unknown node to an unknown node has to be set to regions 303-1 through 303-3. Further, a state transition probability from an unknown node to a known node has to be set to regions 302-1 through 302-3.

Also, as described above, when totaling all of the numeric values described in each row (e.g., the n'th row) of the state transition probability table, the total is arranged to become 1, and accordingly, the probability of a region described as an existing state in FIG. 42 has to be set again.

Figure 43:
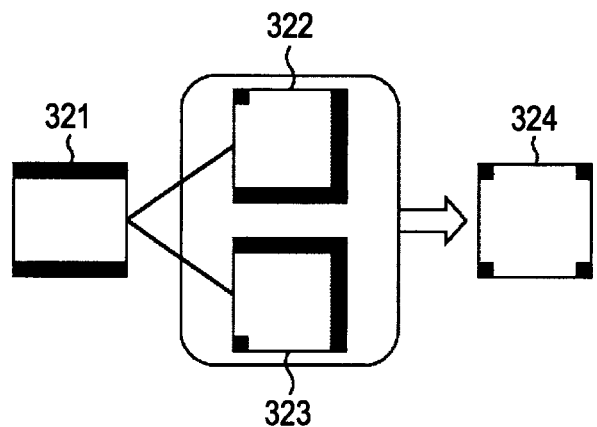
FIG. 43 is a diagram for describing an example of an unknown node to be added.

For example, a case such as illustrated in FIG. 43 will be described. Specifically, let us say that, as a result of an action corresponding to movement in the right direction in the drawing being executed at a transition source node 321 that is a known node, a node 322 or 323 was expected as a transition destination node having a high possibility that transition may be made thereto based on the state transition probability table. However, in reality, as a result of an action corresponding to movement in the right direction in the drawing being executed at the transition source node 321, the transition destination node to which transition has been made was a node 324. In this case, the node 324 becomes an unknown node.

With the example in FIG. 43, the observation symbol corresponding to the part 5 in FIG. 2 is observed at the node 321, the observation symbol corresponding to the part 12 in FIG. 2 is observed at the node 322, and the observation symbol corresponding to the part 6 in FIG. 2 is observed at the node 323.

Note that, in FIG. 43, the reference numerals of the nodes 321 through 324 are appended to rectangles representing a part in the maze, but in reality, these are reference numerals to be appended to nodes where an observation symbol corresponding to such a part is observed. That is to say, the agent can uniquely recognize the nodes 321 through 323 based on the learned internal model data, and the node 324 is recognized as an internal state (node) not stored so far.

Specifically, the agent was expected to come out to the upward corner (node 322) or the downward corner (node 323) in the drawing when moving in the right direction in the drawing from the node 321.

However, in reality, when moving in the right direction in the drawing from the node 321, the agent came out to a crossroad (node 324). That is to say, the observation symbol corresponding to the part 15 in FIG. 2 is observed at the node 324.

For example, in the case that the part disposed in the position corresponding to the node 321 in the maze is replaced, such a situation occurs. In such a case, the node 324 can be conceived as a node not included in the internal model data so far, and accordingly, at least the node 324 has to be added to the internal model data.

In such a case, a new index corresponding to the node 324 is generated, and a matrix of the state transition probability table is added. Accordingly, a state transition probability from the node 321 to the node 324 of the state transition probability table corresponding to the action in the right direction has to be set. However, in reality, timing when a new index is generated, and a matrix of the state transition probability table is added is as described above with reference to FIGS. 37 through 41.

As this state transition probability, for example, a value obtained by dividing the summation of state transition probabilities from the node 321 to the nodes 322 and 323 by 3 is set. At this time, the state transition probabilities from the node 321 to the nodes 322 and 323 should be set by being proportionally divided by weighting according to each state transition probability.

As node candidates $s_j^l$ (l=1, ..., L) to which transition may be made by an action (e.g., action k') in the right direction from the node 321 (e.g., node $s_i$), the transition destination node $s_j$ of which the state transition probability $a_{ij}(k')$ is equal to or greater than a threshold should be listed.

With the example in FIG. 43, two nodes of the nodes 322 and 323 to which transition may be made by an action in the right direction from the node 321 are listed. In this case, the value of the L is 2.

The node 324 that is an unknown node is represented as a node $s_{new}$, and a state transition probability $a_{inew}(k')$ from each known node $s_i$ corresponding to the action k to the node $s_{new}$ is set as 1/L.

With the example in FIG. 43, a state transition probability form the node 321 to the node 324 is set as ½. The state transition probability $a_{inew}(k')$ is set to one region of the regions 301-1 through 301-3 in the example in FIG. 42.

Subsequently, normalization is performed so that the summation of the state transition probability of each row of the state transition probability table corresponding to the action k' becomes 1. That is to say, each value of a row to which a non-zero value is set as the state transition probability $a_{inew}(k')$ should be multiplied L/(L+1) times.

However, in the case that there is no transition destination node of which the state transition probability $a_{inew}(k')$ is equal to or greater than a threshold, normalization such as described above is performed with the state transition probability $a_{inew}(k')$ as around 1.

Note that a minute value approximate to 0 should be set to a state transition probability that transition may be made to the node 324 by executing an action other than the action k' at the node 321, and accordingly, normalization does not have to be performed so that the summation of the state transition probability of each row of the state transition probability table becomes 1.

Figure 44:
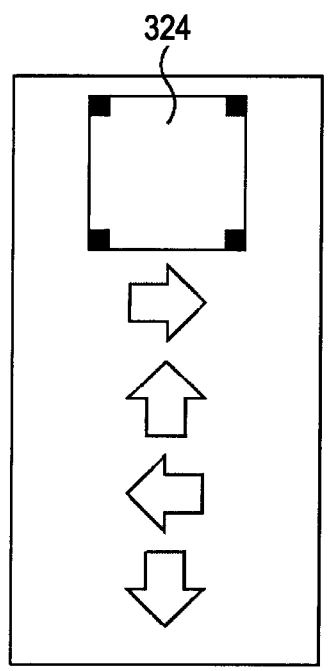
FIG. 44 is a diagram for describing an example of an unknown node to be added and action thereof.

Also, such as illustrated by an arrow in the drawing of FIG. 44, transition may be made to another node by executing four actions in the four directions at the node 324 that is a crossroad. Accordingly, a state transition probability from the node 324 to each known node of the state transition probability table corresponding to the four directions has to be set. These state transition probabilities are set to one of the regions 302-1 through 302-3 in the example in FIG. 42. Note that in the case that there may be transition from an unknown node to an unknown node, in addition to the above, one of the regions 303-1 through 303-3 in the example in FIG. 42 is also included.

For example, with regard to a state transition probability from the node 324 to each known node of the state transition probability table corresponding to an upward action, a state transition probability from the node 322 to each known node is copied. The node 322 is an upward corner, and is, of nodes to which transition may be made from the node 321 by an action in the right direction, one and only node from which transition may be made to another known node by an upward action. Note that nothing is changed regarding a state transition probability from the node 322 to each known node.

Also, for example, with regard to a state transition probability from the node 324 to each known node of the state transition probability table corresponding to a downward action, a state transition probability from the node 323 to each known node is copied. The node 323 is a downward corner, and is, of nodes to which transition may be made from the node 321 by an action in the right direction, one and only node from which transition may be made to another known node by a downward action. Note that nothing is changed regarding a state transition probability from the node 323 to each known node.

Further, a state transition probability from the node 324 to each known node of the state transition probability table corresponding to a leftward action is set to a value obtained by averaging a state transition probability from the node 322 to each known node, and a state transition probability from the node 323 to each known node. This is because the nodes 322 and 323 are, of nodes to which transition may be made from the node 321 by a rightward action, nodes from which transition may be made to another known node by a leftward action. That is to say, the mean value of the state transition probabilities of the nodes 322 and 323 should be employed as a state transition probability from the node 324 to each known node of the state transition probability table corresponding to a leftward action. Note that at this time nothing is changed regarding a state transition probability from the nodes 322 and 323 to each known node.

Figure 45:
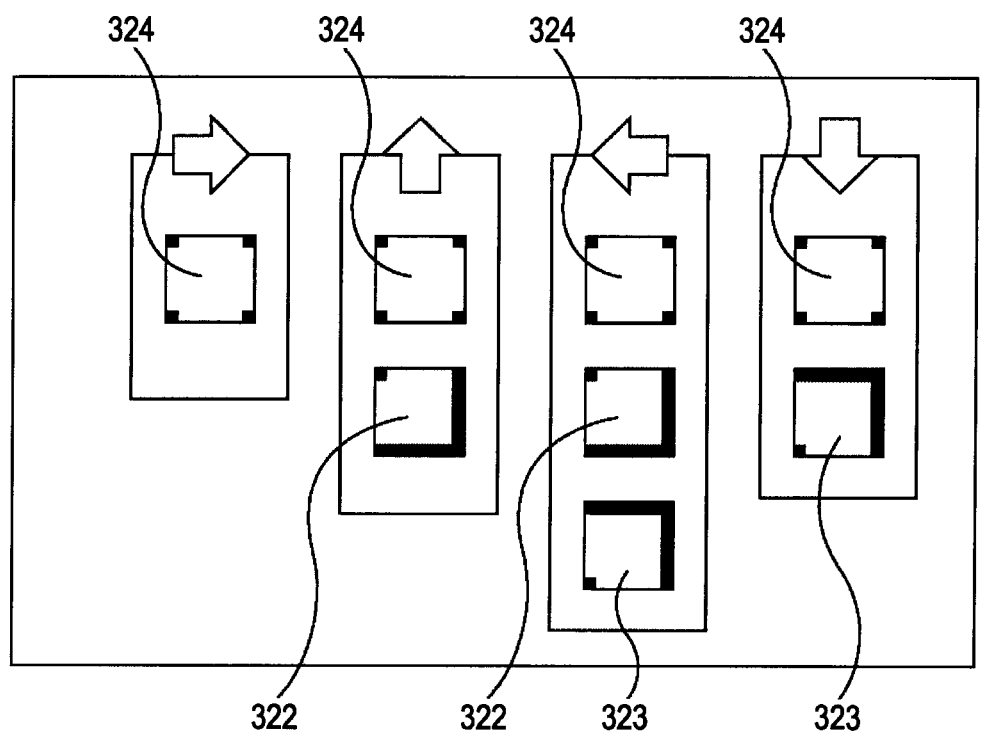
FIG. 45 is a diagram illustrating an example of an unknown node to be added, and a candidate node and action thereof.

Also, a state transition probability from the node 324 to each known node of the state transition probability corresponding to a rightward action is each set to a uniform value. This is because, such as illustrated in FIG. 45, there is no any other candidate node from which transition may be made to another known node by a rightward action. Further, a state transition probability from each known node other than the node 321 to the node 324 also has to be set.

The node 324 is a crossroad, and accordingly, transition from another node to the node 324 may be caused by one of the four directions. That is to say, there will be a transition source node from which transition is made to the node 324 by an upward action, and a transition source node from which transition is made to the node 324 by a downward action. Also, there will be a transition source node from which transition is made to the node 324 by a leftward action, and a transition source node from which transition is made to the node 324 by a rightward action.

In this case, there have to be determined not only transition source nodes, but also whether transition is made to the node 324 by executing which action at each of the transition source nodes. That is to say, a backward transition action for an unknown node has to be determined.

First, a node similar to the node 324 is extracted to obtain information serving as grounds for estimation of a transition source node. A node similar to the node 324 is, for example, in the case that the agent is located at a node other than the node 324, will be referred to as a probable node to some extent.

For example, let us consider a case where there are multiple parts which are similar on the structure of the maze. Let us say that the agent is located on a predetermined part which is one of those parts. In such a case, in reality, the agent may be on a predetermined part different from a portion where the agent recognized. Thus, a node similar to a node which the agent recognized can be extracted.

A similar node can be determined by n-step state recognition using the time series information for the past n steps worth.

At a point in time t, estimating the current node using action sequence $c_{t-n}, \ldots, c_{t-1}$ for the past n steps worth, and observation symbol sequence $o_{t-n}, \ldots, o_t$ for the past n+1 steps worth, or calculating a probability that the agent may exist at the current point in time t will be referred to as "n-step state recognition".

With the n-step state recognition, first, a priori probability $\pi_i$ corresponding to the node of index i (i=1, ..., N) is set, for example, by a predetermined method.

Subsequently, the recognizing device 35 calculates a probability $\delta_{t-n}(i)$ that the agent may exist on each node at a point in time t−n by Expression (52).

$$\delta_{t-n}(i) = \pi_i b_i(o_{t-n}) \tag{52}$$

Subsequently, the recognizing device 35 calculates a probability $\delta_\tau(i)$ that the agent may exist on each node in the order of points in time τ=t−n+1, . . . , t by the recurrence equation of Expression (53).

$$\delta_\tau(j) = \max_i [\delta_{\tau-1}(i) a_{ij}(C_\tau) b_j(o_\tau)] \quad (53)$$

Alternatively, calculation of Expression (54) may be performed instead of Expression (53).

$$\delta_\tau(j) = \sum_{i=1}^{N} \delta_{\tau-1}(i) a_{ij}(C_\tau) b_j(o_\tau) \quad (54)$$

Further, the recognizing device 35 calculates a state probability $\delta'_t(i)$ regarding each node at the point in time t by normalizing a probability $\delta_t(i)$ that the agent may exist on each node at the final point in time t in Expression (53) or (54) by Expression (55).

$$\delta'_t(i) = \frac{\delta_t(i)}{\sum_{i=1}^{N} \delta_t(i)} \quad (55)$$

Each of the nodes of which the state probability obtained by Expression (55) is equal to or greater than a threshold will be referred to as a similar node.

Note that, with the n-step state recognition, the action sequence and observation symbol sequence for the past n steps worth are employed, but if we say that the n is set to 0, all of the nodes of which the observation symbols $o_t$ are observed with a probability equal to or greater than a predetermined threshold become similar nodes. Also, the greater the n is increased, the less the number of similar nodes usually decreases. The value of the n of the n-step state recognition is, for example, a predetermined value adapted to use such as estimation performed in an embodiment of the present invention, or the like.

In the event that similar nodes have been obtained, an action is determined whereby transition can be made to another node by this action being executed at these nodes. For example, the node 324 is a crossroad, and accordingly, there is a high possibility that nodes similar to the node 324 may be crossroads. Accordingly, transition can be made to another node by executing a moving action in the four directions at the similar nodes.

Subsequently, a known node from which transition may be made to another node by executing such an action is determined. For example, at the node 322 which is a known node to which transition may be made from the node 321 by a rightward action, transition may be made to another node by executing leftward and upward actions. Similarly, at the node 323 which is a known node to which transition may be made from the node 321 by a rightward action, transition may be made to another node by executing leftward and downward actions.

Thus, assumption may be made wherein transition can be made to the unknown node 324 by executing the backward actions of the leftward and upward actions at each of the transition destination nodes to which transition is made by executing leftward and upward actions at the node 322. In this case, the right and downward actions are backward transition actions.

Also, assumption may be made wherein transition can be made to the unknown node 324 by executing the backward actions of the leftward and downward actions at each of the transition destination nodes to which transition is made by executing leftward and downward actions at the node 323. In this case, the right and upward actions are backward transition actions.

The backward transition actions can be estimated, for example, as follows. For example, in the case that transition from a node $s_a$ to a node $s_b$ by an action $c_z$ occurs, backward transition, i.e., an action $c_{z'}$ for causing transition from the node $s_b$ to the node $s_a$ is estimated.

At the time of estimating a backward transition action, the recognizing device 35 determines a similar node such as described above which is also a known node. Let us say that each of the known nodes determined here is represented as node $s_j^q$ (q=1, . . . , Q).

Subsequently, the recognizing device 35 extracts a transition source node from which transition is made to the node $s_j^q$ by the action $c_z$ regarding each of the node $s_j^q$. In this case, for example, the node $s_i$ of which the state transition probability $a_{ij}^q(z)$ is equal to or greater than a threshold should be listed.

Subsequently, the recognizing device 35 calculates the mean value a*(k) of a state transition probability from the node $s_j^q$ to the node $s_i^{q,l}$ regarding all of the combinations of $(s_i^q, s_i^{q,l})$ (q=1, . . . , Q, l=1, . . . , $L_q$) by Expression (56).

$$a^*(k) = \frac{1}{N_{q,l}} \sum_{q,l} a_{ji}^{q,l}(k) \quad (56)$$

Of the mean value a*(k) of the state transition probabilities thus obtained, the values that are equal to or greater than a threshold are selected, the action $c_k$ corresponding to the a*(k) thereof is determined, whereby backward transition action $c_z^r$ (r=1, . . . , R) can be determined.

When assuming that transition to the node 324 is realized by executing backward transition at the transition source nodes thus determined, a state transition probability can be set by the same operation as with the above case of setting the state transition probability from the node 321 to the node 324.

Therefore, when adding a matrix corresponding to the index of a node regarded as an unknown node to the state transition probability table, all of the state transition probabilities of the region illustrated in FIG. 42 have to be reset.

That is to say, when adding a matrix corresponding to the index of a node regarded as an unknown node to the state transition probability table, an action that can be executed at the unknown node, and a transition destination node to which transition can be made by the action thereof have to be determined. Thus, a predetermined matrix position of the state transition probability table can be determined from a pair between the determined action and transition destination node, and the value of a state transition probability to be set should be set to these positions, and also each value of the row thereof should be normalized.

Also, when adding a matrix corresponding to the index of a node regarded as an unknown node to the state transition probability table, a transition source node from which transition can be made, and an action whereby transition from the transition source node to the unknown node can be performed, have to be determined. Thus, a predetermined matrix position of the state transition probability table can be determined from a pair between the determined action and transition source node, and the value of a state transition probability to be set should be set to these positions, and also each value of the row thereof should be normalized.

Figure 46:
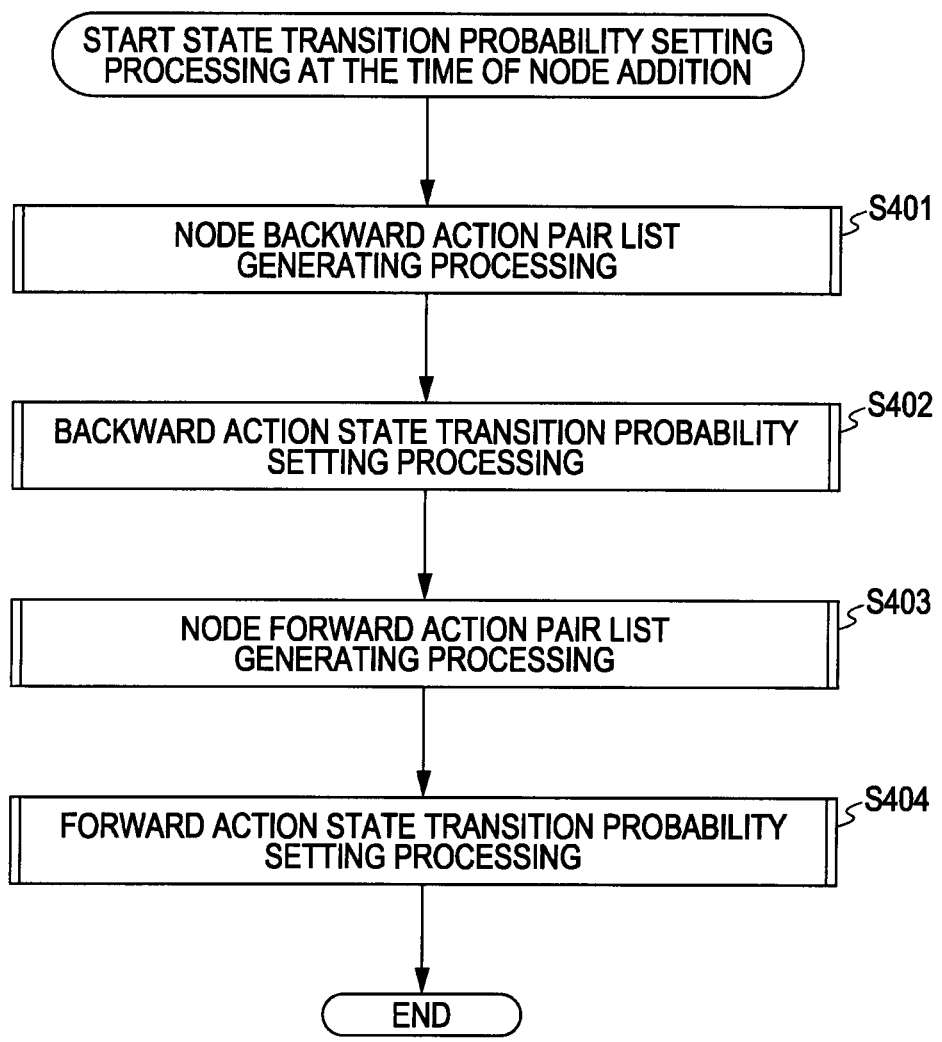
FIG. 46 is a flowchart for describing an example of state transition probability setting processing at the time of node addition.

Accordingly, such as described above, in the case that the agent has autonomously recognized change in the environment to extend the state transition probability table, processing for setting the value of a state transition probability to be set to the extended region can be executed, for example, in accordance with the procedures illustrated in FIG. 46.

FIG. 46 is a flowchart for describing state transition probability setting processing at the time of node addition. This processing will be executed, for example, when the agent autonomously recognizes change in the environment to add an unknown node to the state transition probability table or the like.

Now, let us say that an unknown node $s_{new}$ is to be added to the internal model data, a node immediately before the agent proceeds to the node $s_{new}$ is taken as a node $s_i'$, and the agent has proceeded to the node $s_{new}$ by an action $c_k'$ being executed at the node $s_i'$.

In step S401, the recognizing device 35 refers to the flowchart in FIG. 47 to execute later-described node backward action pair list generating processing.

Thus, a transition source node as to an unknown node will be determined, and a backward transition action as to the unknown node will be determined.

Figure 48:
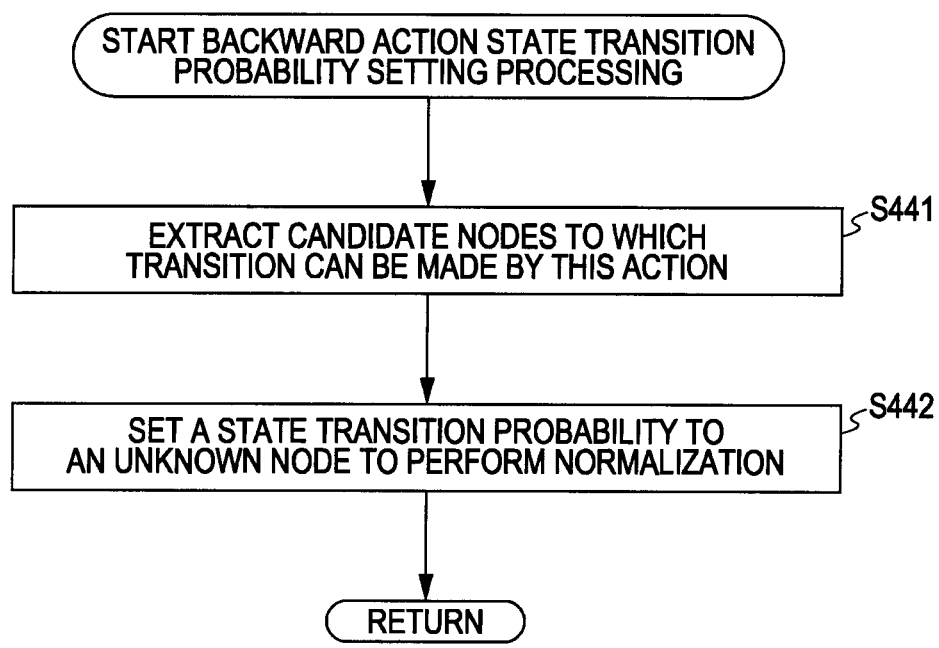
FIG. 48 is a flowchart for describing an example of backward action state transition probability setting processing.

In step S402, the learning device 34 refers to the flowchart in FIG. 48 to execute later-described backward action state transition probability setting processing.

Thus, a state transition probability that transition may be made to the unknown node will be set by a backward transition action being executed at the transition source node determined by the processing in step S401. Also, the value of each row of the state transition probability table will be normalized according to the state transition probability newly set here.

In step S403, the recognizing device 35 refers to the flowchart in FIG. 49 to execute later-described node forward action pair list generating processing.

Thus, a transition destination node from the unknown node will be determined, and also a forward transition action for proceeding to the transition destination node will be determined.

Figure 50:
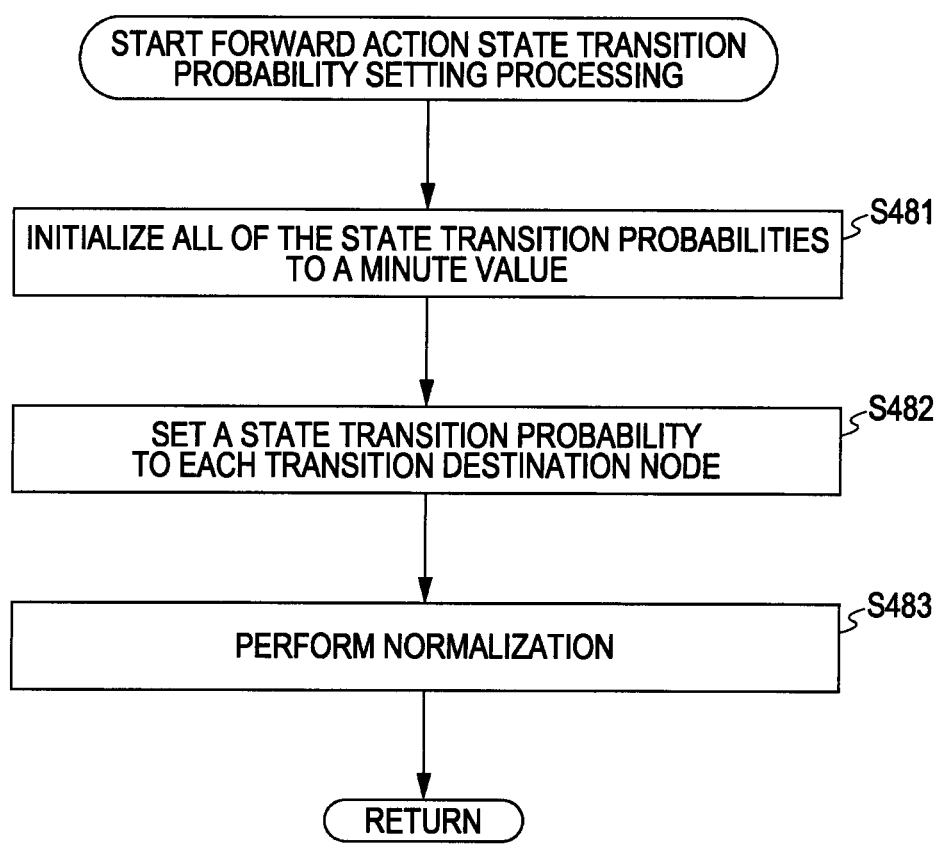
FIG. 50 is a flowchart for describing an example of forward action state transition probability setting processing.

In step S404, the learning device 34 refers to the flowchart in FIG. 50 to execute later-described forward action state transition probability setting processing.

Thus, a state transition probability that transition may be made to the transition destination node will be set by a forward transition action determined by the processing in step S403 being executed. Also, the value of each row of the state transition probability table will be normalized according to the state transition probability newly set here.

Next, the details of the node backward action pair list generating processing in step S401 in FIG. 46 will be described with reference to the flowchart in FIG. 47.

In step S421, the recognizing device 35 extracts a candidate node $s_j^l$ (l=1, . . . , L) to which transition may be made by the action $c_k'$ being executed at the node $s_i'$. With regard to the candidate node $s_j^l$, for example, a transition destination node $s_j'$ of which the state transition probability $a_{i'j}^l(k')$ is equal to or greater than a threshold should be listed.

In step S422, the recognizing device 35 performs the n-step state recognition using the time series information for the past n steps worth.

In step S423, the recognizing device 35 extracts known nodes which are similar nodes similar to the node $s_{new}$ based on the processing results in step S422. Each of the known nodes determined here will be represented as a node $s_j^q$ (q=1, . . . , Q). At this time, similar nodes similar to the node $s_{new}$ are extracted by the calculations of the above Expressions (52) through (55) being performed.

In step S424, the recognizing device 35 extracts the effective action of the similar nodes extracted in the processing in step S423.

Here, the effective action means an action whereby transition may be made to another node by being executed at each of the above similar nodes.

In step S424, for example, an evaluation value $E_k$ for each action is calculated by Expression (57). Note that this calculation is calculated so as to correspond to each action, and one evaluated value is obtained as to one action.

$$E_k \equiv \sum_{q=1}^{Q} \left( \sum_{x=1}^{N} a_{jx}^q(k) - a_{jj}^q(k) \right) \quad (57)$$

Here, $a_{jx}^q(k)$ (q=1, . . . , Q, x=1, . . . , N) is a state transition probability that transition may be made to a node $s_x$ when executing the action $c_k$ at the node $s_j^q$ (q=1, . . . , Q).

Subsequently, an action k of which the evaluated value calculated by Expression (57) is equal to or greater than a threshold is selected, and is taken as an effective action candidate.

Further, the state transition probability $a_{jx}^q(k)$ is checked regarding each of the selected actions k, and determination is made whether or not there is at least one set of (q, x) of which the state transition probability $a_{jx}^q(k)$ is equal to or greater than a threshold. In the case that there is no such a set of (q, x), the action k thereof is excluded from the effective action candidates.

Thus, in step S424, an effective action $c_k^r$ (r=1, . . . , R) is extracted.

In step S425, the recognizing device 35 extracts, of the candidate nodes $s_j^l$ extracted in the processing in step S421, a candidate node having the action $c_k^r$ extracted in the processing in step S424 as an effective action. That is to say, of the candidate nodes, a node $s_j^{ru}$ (u=1, . . . , Ur) having the same effective action as the similar nodes is extracted.

In step S425, for example, an evaluated value Elr is calculated by Expression (58) regarding each of the nodes $s_j^l$. Note that this calculation is performed at each of the nodes $s_j^l$ in response to each case of each of the actions $c_k^r$ being executed, and one evaluated value is obtained as to one combination between a node and an action.

$$E_{lr} \equiv \sum_{x=1}^{N} a_{jx}^l(k) - a_{jj}^l \quad (58)$$

Note that Expression (58) is calculated regarding a case where the action $c_k$ determined by the variable r is executed at the candidate node of the index j determined by the variable l. Also, let us say that the k (or $c_k$) that is the action of the state transition probability of the right side of Expression (58) is determined by the variable r of the left side.

Thus, in step S425, a node of which the evaluated value calculated by Expression (58) is equal to or greater than a threshold is extracted as the node $s_j^{ru}$.

In step S426, the recognizing device 35 generates a pair ($s_j^{ru}$, $c_k^r$) between a node extracted in step S425 and an effective action extracted in step S424, and determines a transition destination node to be determined from each pair.

For example, the state transition probability $a_{ji}^{ru}(k)$ (l=1, ..., N) in the case of executing the action $c_k^r$ at the node $s_j^{ru}$ is checked, and the transition destination node $s_i^q$ (q=1, ..., $Q_{ru}$) corresponding to a state transition probability exceeding a threshold is determined.

In step S427, the recognizing device 35 estimates a backward transition action of the action $c_k^r$ at the node $s_j^{ru}$. That is to say, the recognizing device 35 estimates an action for performing transition from the node $s_i^q$ to the node $s_j^{ru}$. The backward transition action estimated at this time is taken as $c_{ruq}^v$ (v=1, ..., $V_{ruq}$). However, in the case that the transition destination node is the node $s_i'$, this estimation is not performed.

Subsequently, the recognizing device 35 generates a pair $(s_i^q, c_{ruq}^v)$ (l=1, ..., L, r=1, ..., R, u=1, ..., $U_r$, q=1, ..., $Q_{ru}$, v=1, ..., $V_{rug}$) between a transition destination node determined in step S426 and a backward transition action determined above.

In step S428, the recognizing device 35 eliminates duplication by adding $(s_i', c_k')$ to the pair $(s_i^q, c_{ruq}^v)$ generated in step S427 to generate a pair $(s_i^x, c_k^x)$ (x=1, ..., X) of a transition destination node and a backward transition action as to the unknown node. Subsequently, the pairs of a transition destination node and a backward transition action as to the unknown node are each listed. Thus, the node backward action pair list generating processing is executed.

Figure 47:
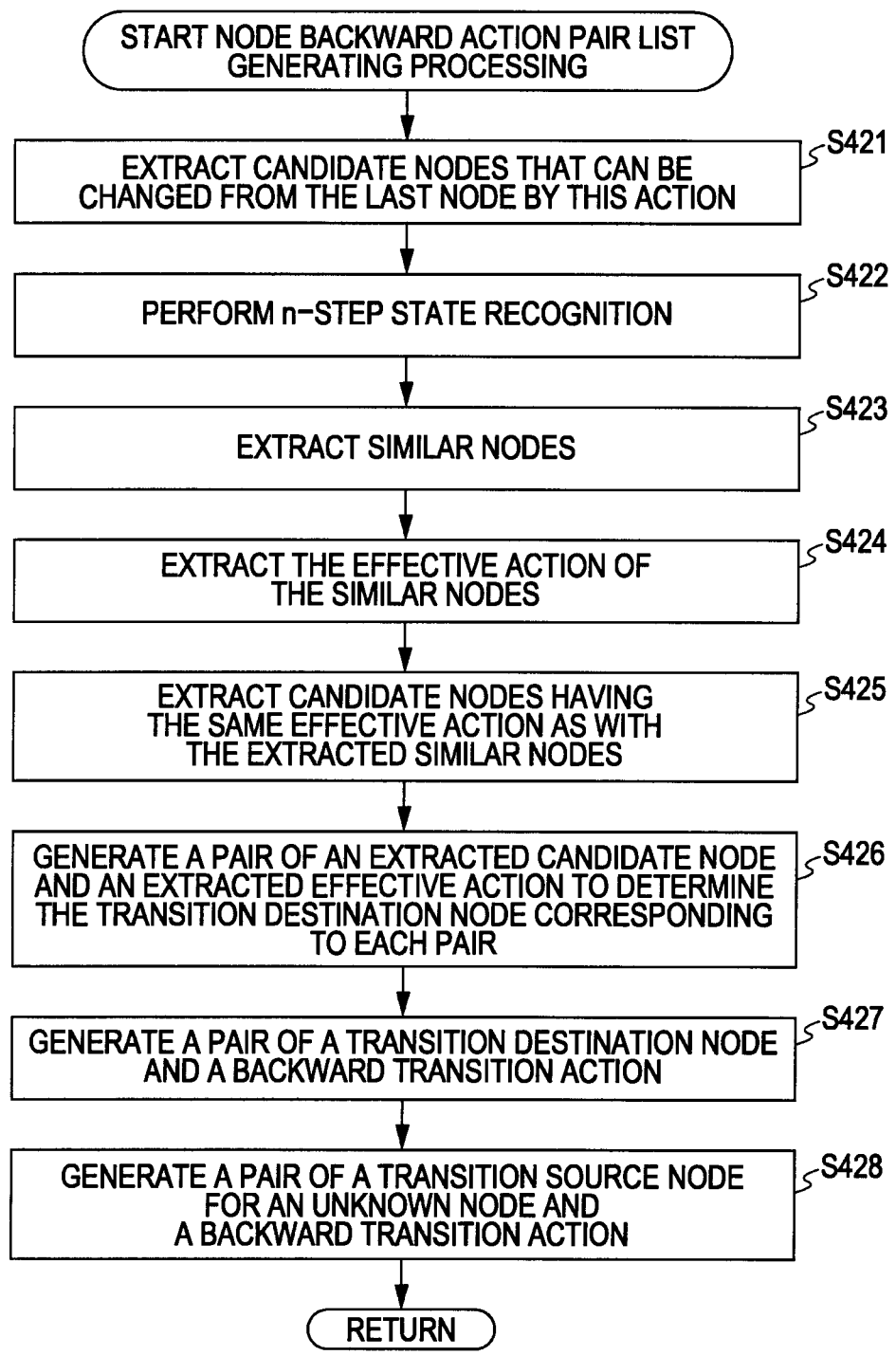
FIG. 47 is a flowchart for describing an example of node backward action pair list generating processing.

Transition to the node $s_{new}$ is assumed to have been made by executing the action $c_k^x$ at the node $s_i^x$ based on the pairs obtained in the processing in FIG. 47, and the processing in step S402 in FIG. 46 is executed.

Next, description will be made regarding a detailed example of the backward action state transition probability setting processing in step S402 in FIG. 46, with reference to the flowchart in FIG. 48.

For example, let us assume that transition has been made to the node $s_{new}$ from the transition source node $s_i$ by the action $c_k$.

In step S441, the learning device 34 extracts a node candidate to which transition may be made from the node $s_i$ by the action $c_k$. With regard to the node candidate $s_j^l$ (l=1, ..., L), for example, a transition destination node $s_j$ of which the state transition probability $a_{ij}(k)$ is equal to or greater than a threshold should be listed.

In step S442, the learning device 34 sets a state transition probability as to the unknown node, and performs normalization.

For example, the state transition probability $a_{inew}(k)$ form each candidate node $s_i$ to the node $s_{new}$ corresponding to the action $c_k$ is set as 1/L. Subsequently, normalization is performed so that the summation of the state transition probability of each row of the state transition probability table corresponding to the action $c_k$ becomes 1. That is to say, each value of a row to which a non-zero value is set as the state transition probability $a_{inew}(k)$ is multiplied L/(L+1) times.

However, as a result of the processing in step S441, in the case that there is no transition destination node of which the state transition probability $a_{ij}(k)$ is equal to or greater than a threshold, normalization such as described above is performed with the state transition probability $a_{inew}(k)$ as 1 or so. Thus, the backward state transition probability setting processing is executed.

Next, description will be made regarding a detailed example of the node forward action pair list generating processing in step S403 in FIG. 46, with reference to the flowchart in FIG. 49.

In step S461, the recognizing device 35 extracts transition destination node $s_i^q$ (q=1, ..., $Q_{ru}$) in the same way as with the processing in step S426 in FIG. 47. That is to say, the recognizing device 35 generates a pair of a candidate node and an effective action, and determines a transition destination node corresponding to each pair.

In step S462, the recognizing device 35 generates a pair of the transition destination node $s_i^q$ (q=1, ..., $Q_{ru}$) obtained in the processing in step S461, and the action $c_k^r$ (r=1, ..., R) for performing transition to the transition destination node thereof.

In step S463, the recognizing device 35 eliminates duplication of the pairs obtained in the processing in step S462 to generate a pair $(s_j^y, c_k^y)$ (y=1, ..., Y). Subsequently, pairs of a transition destination node and an action for performing transition to the transition destination thereof are each listed.

In this way, the node forward action pair list generating processing is executed.

Figure 49:
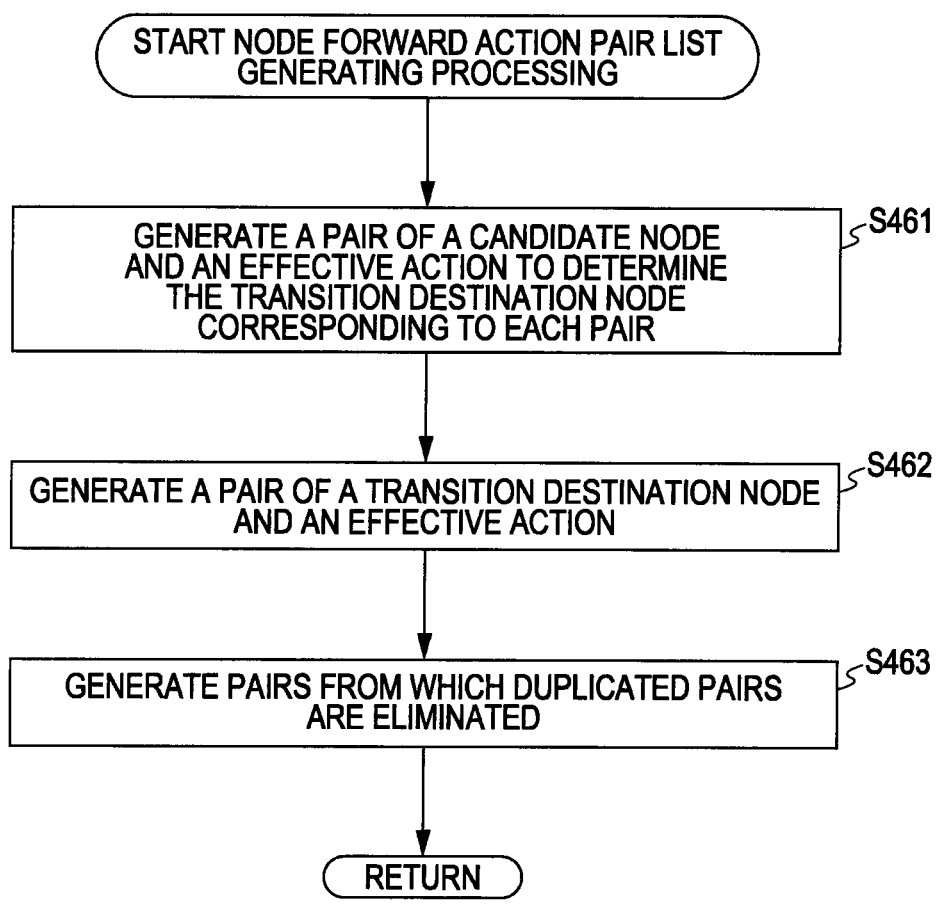
FIG. 49 is a flowchart for describing an example of node forward action pair list generating processing.

Transition to the node $s_j^y$ is assumed to have been made by executing the action $c_k^y$ at the node $s_{new}$ based on the pairs obtained in the processing in FIG. 49, and the processing in step S404 in FIG. 46 is executed.

Next, description will be made regarding a detailed example of the forward action state transition probability setting processing in step S404 in FIG. 46, with reference to the flowchart in FIG. 50.

In step S481, the learning device 34 initializes all of the state transition probabilities $a_{newj}(k)$ (j=1, ..., N, k=1, ..., K) to a minute value.

In step S482, the learning device 34 uses the pair $(s_j^y, c_k^y)$ obtained by the processing in FIG. 49 to set a state transition probability. Specifically, a state transition probability $a_{newj}^y(k)$ for performing transition to the node $s_j^y$ by executing the action $c_k^y$ at the node $s_{new}$ is set as 1.

In step S483, the learning device 34 performs normalization so as to satisfy $\Sigma_j a_{newj}(k)$ (k=1, ..., K). Thus, the forward action state transition probability setting processing is executed.

With the above example, description has been made regarding an example of a case where the agent autonomously recognizes change in the environment to add an unknown node to the state transition probability table, but according to this, the unknown node has to be added to the observation probability table. With regard to updating of the observation probability table in this case, for example, in the event that the observation probability table has to be extended such as illustrated in FIG. 31, the above processing should be performed as processing performed by the learning device 34.

Also, it goes without saying that the table of frequency variables for estimating a state transition probability, and the table of frequency variables for estimating an observation probability are also updated along with the processing described above with reference to FIG. 46.

Next, the setting of a state transition probability in the case of performing anchoring will be described. As described above, anchoring is processing wherein in the case that transition to a known node has been recognized, a state transition probability between a node regarded as an unknown node and a known node, or the like is set.

In other words, in the case that transition has been made to a known node $s_j'$ by executing an action $c_k'$ at an unknown node $s_i'$, when there is no node $s_j$ of which the state transition probability $a_{ij}'(k')$ (j=1, ..., N) is equal to or greater than a threshold, anchoring is performed. That is to say, in the case that transition from a node regarded as an unknown node to a known node has been recognized, and also transition from this unknown node to a node other than this known node does not readily occur, anchoring is performed.

With anchoring, a state transition probability from the unknown node $s_i'$ to the known node $s_j'$ by the action $c_k'$ is set. For example, such as described above with reference to FIG. 46, each time a node regarded as an unknown node is added to the internal model data, a state transition probability from the unknown node thereof to a known node is estimated and set. However, in the case that transition from the unknown node to the known node has actually occurs, anchoring is performed.

Figure 51:
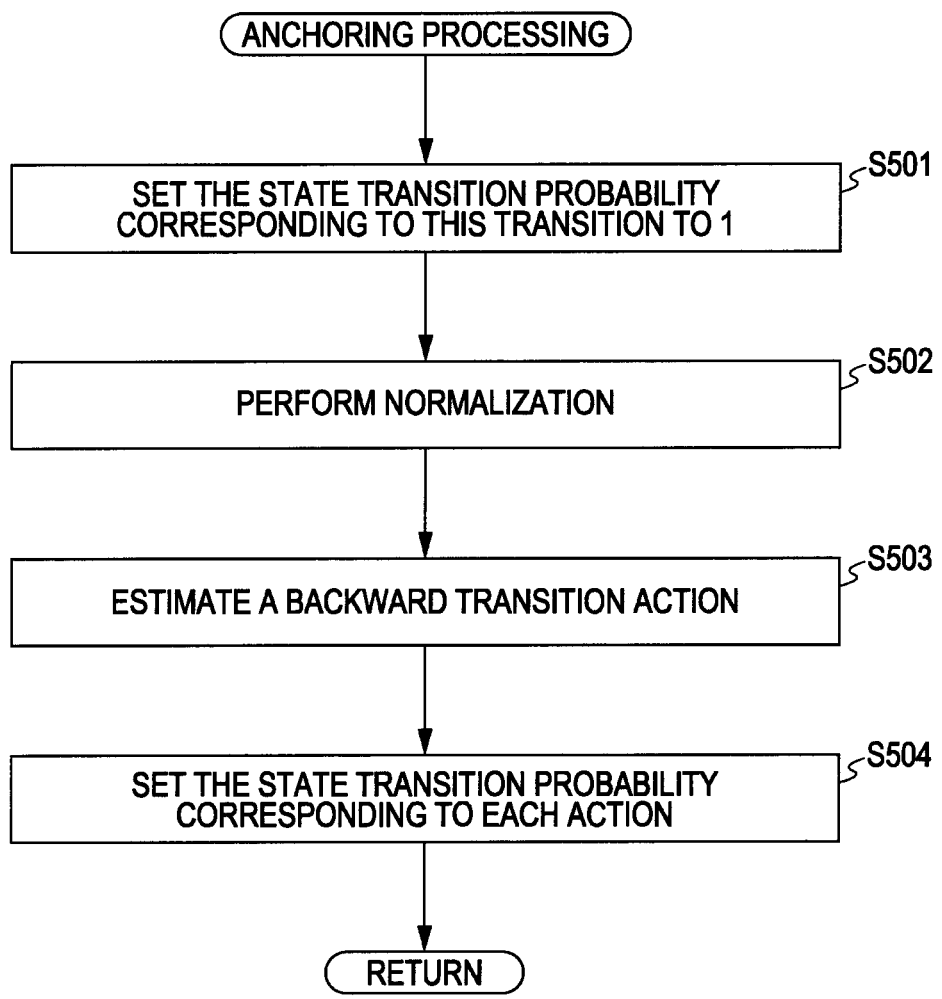
FIG. 51 is a flowchart for describing an example of anchoring processing.

Now, anchoring processing will be described with reference to the flowchart in FIG. 51. This processing is, for example, processing to be executed as the processing in step S319 in FIG. 40.

In step S501, the learning device 34 sets a state transition probability corresponding to transition serving as an anchoring object to 1. With the above example, the state transition probability $a_{i,j}'(k')$ is set to 1.

In step S502, the learning device 34 normalizes each value of the state transition probability table so that $\Sigma_j a_{i,j}'(k')$ becomes 1.

In step S503, the recognizing device 35 estimates a backward transition action for performing transition from the known node $s_j'$ to the unknown node $s_i'$. At this time, for example, estimation of a backward transition action is performed in the same way as with the case described above with reference to FIG. 47. Thus, a backward transition action $c_z^r$ (r=1, ..., R) is estimated.

In step S504, the learning device 34 sets a state transition probability assuming that transition from the known node $s_j'$ to the unknown node $s_i'$ has occurred by each of the backward transition actions estimated in the processing in step S503. This processing is, for example, the same as with the case described with reference to FIG. 48. Thus, the anchoring processing is executed.

Note that the anchoring processing may be performed wherein a state transition probability is set by the processing described above with reference to FIG. 46 being performed assuming that transition from the known node $s_j'$ to the unknown node $s_i'$ has occurred instead of the processing described above with reference to FIG. 51.

That is to say, in reality, transition has been made to the known node $s_j'$ by executing the action $c_k'$ at the unknown node $s_i'$, but assumption is made wherein transition from the known node $s_j'$ to the unknown node $s_i'$ has occurred by a backward transition action $c_z^r$ (r=1, ..., R). Here, the backward transition action $c_z^r$ (r=1, ..., R) may be estimated, for example, in the same way as with the processing in step S503.

Specifically, the processing described above with reference to FIG. 46 is executed assuming that transition from the known node $s_j'$ to the unknown node $s_i'$ has been performed by the action $c_z^1$. Also, the processing described above with reference to FIG. 46 is executed assuming that transition from the known node $s_j'$ to the unknown node $s_i'$ has been performed by the action $c_z^2$. Similarly, the processing described above with reference to FIG. 46 is executed assuming that transition from the known node $s_j'$ to the unknown node $s_i'$ has been performed by each of the actions $c_z^3$ through $c_z^R$.

The processing in FIG. 46 may be executed assuming that transition from the last node $s_j'$ (in reality, known node to be subjected to anchoring) to the unknown node $s_i'$ by the action $c_z^r$ (r=1, ..., R).

Thus, according to an embodiment of the present invention, the agent may autonomously recognize change in the environment to extend the state transition probability table and the observation probability table. Also, at this time, a value such as a state transition probability, observation probability, or the like to be set to the region extended from each of the tables may suitably be set. Further, a state transition probability between an unknown node and a known node, or the like may be set based on a state transition probability from an already stored known node to a stored another known node.

Description has been made so far regarding processing that can be performed in the case that the number of nodes, the number of observation symbols, or the number of actions comes under pressure to be changed at the time of advancing learning.

As described above, according to an embodiment of the present invention, learning employing the action expanded HMM may be performed. Thus, learning may be performed in a situation wherein the agent uses an action signal to execute an action as to the environment, and accordingly, an observation symbol to be observed from now can be influenced.

Also, according to an embodiment of the present invention, learning of the action expanded HMM inevitably having a large scale can effectively and suitably be performed. Specifically, the one-state one-observation constraint is imposed by applying the split algorithm to internal model data to be learned, or the like, and the action transition constraints are imposed by applying the forward merging algorithm and backward merging algorithm, or the like. Thus, increase in the number of the parameters to be calculated is suppressed, and accordingly, learning of the action expanded HMM inevitably having a large scale can effectively and suitably be performed.

Further, according to an embodiment of the present invention, learning by the additional learning method according to the action expanded HMM inevitably having a large scale can be performed in a stable manner. Specifically, the frequency variables for estimating a state transition probability, and the frequency variables for estimating an observation probability are calculated and saved, whereby learning by the additional learning method according to the action expanded HMM can be performed in a stable manner.

Also, according to an embodiment of the present invention, the number of nodes, the number of observation symbols, or the number of actions may be changed at the time of advancing learning.

At this time, for example, a command to extend the internal model data may be issued, for example, on the premise that the number of nodes increases by a predetermined number as to the agent, or the internal model data may be extended by the agent autonomously recognizing change in the environment.

In order for the agent to autonomously recognize change in the environment to extend the internal model data, the agent is allowed to recognize whether the node where itself is now located is a node serving as a learned internal state, or a node serving as an internal state to be newly added.

Also, an arrangement has been made wherein a predetermined number of unknown nodes are allowed to be added at predetermined timing, and also learning by the additional learning method is allowed to be performed based on the internal model data immediately after anchoring. Thus, sufficiently effective learning may be performed, for example, not only in a case where a new node sporadically appears in known nodes, but also in an arduous environment where a new node is consecutively detected over along period of time.

Further, when extending the internal model data, a state transition probability between an unknown node and a known node, or the like may be set based on the past experience.

Thus, according to an embodiment of the present invention, when performing autonomous learning under a changing environment, the learning may be performed in an effective and stable manner.

Description has been made so far regarding an embodiment of the present invention having been applied to an example in the case that the robot moves through a maze, but it goes without saying that an embodiment other than this may be employed. For example, actions are not restricted to actions for moving the agent, and as long as an action influences the environment, this action may be employed. Also, for example, observation symbols are not restricted to a symbol corresponding to the shape of a part of the maze, a symbol corresponding to change in light or sound or the like may be employed.

Note that the above-mentioned series of processing may be executed by hardware, software, or a combined configuration of both. In the case of executing the processing by software, a program making up the software thereof is installed to a computer housed in dedicated hardware. For example, the program making up the software thereof is installed from a network or recording medium to a general-purpose personal computer 700 or the like capable of executing various types of functions by installing various types of programs.

Figure 52:
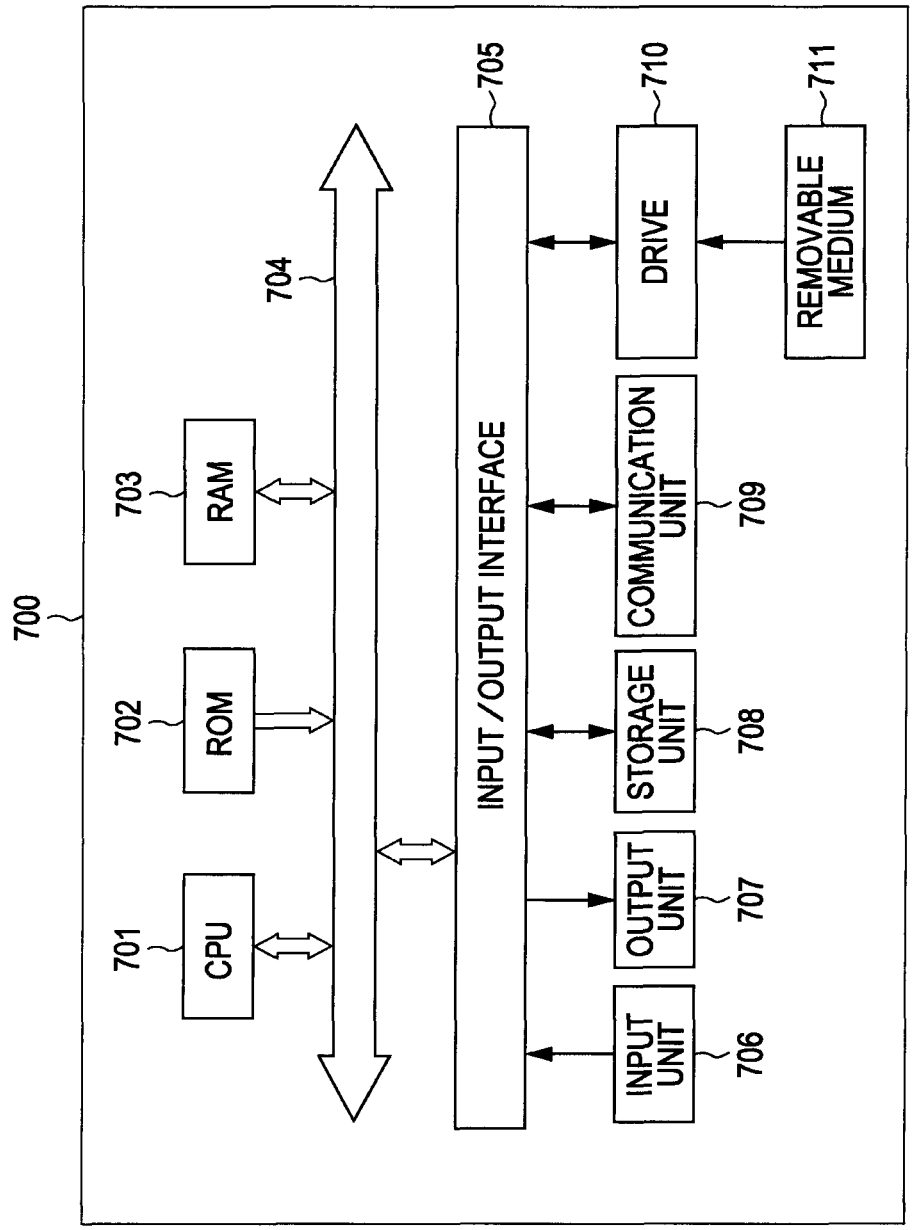
FIG. 52 is a block diagram illustrating a configuration example of a personal computer.

In FIG. 52, a CPU (Central Processing Unit) 701 executes various types of processing in accordance with a program stored in ROM (Read Only Memory) 702, or a program loaded from a storage unit 708 to RAM (Random Access Memory) 703. Data used for the CPU 701 executing various types of processing, and so forth is also stored in the RAM 703 as appropriate.

The CPU 701, ROM 702, and RAM 703 are mutually connected via a bus 704. An input/output interface 705 is also connected to this bus 704.

An input unit 706 made up of a keyboard, mouse, and so forth, and output unit 707 made up of a display configured of an LCD (Liquid Crystal Display) or the like, a speaker, and so forth, and a storage unit 708 configured of a hard disk and so forth are connected to the input/output interface 705. Also, a communication unit 709 configured of a network interface card such as a LAN card, and so forth is connected to the input/output interface 705. The communication unit 709 performs communication processing via a network including the Internet.

A drive 710 is connected to the input/output interface 705 as appropriate, on which a removable medium 711 such as a magnetic disk, optical disc, magneto-optic disk, semiconductor memory, or the like is mounted as appropriate. Subsequently, a computer program read out from these is installed to the storage unit 708 as appropriate.

In the case of the above series of processing being executed by software, a program making up the software thereof is installed from a network such as the Internet or the like, or a recording medium made up of the removable medium 711 or the like.

Note that this recording medium includes not only a component configured of the removable medium 711 made up of a magnetic disk (including floppy disk (registered trademark)), an optical disk (including CD-ROM (Compact Disk-Read Only Memory), DVD (Digital Versatile Disk)), a magneto-optic disk (including MD (Mini-Disk) (registered trademark)), semiconductor memory, or the like in which the program is recorded, which is distributed for distributing the program to a user separately from the device main unit, but also a component configured of the ROM 702, a hard disk included in the storage unit 708, or the like in which the program is recorded, which is distributed to a user in a state housed beforehand in the device main unit.

Note that the above series of processing according to the present Specification include not only processing performed in time sequence in accordance with the described sequence but also processing not necessarily performed in time sequence but performed in parallel or individually.

Note that the embodiments of the present invention are not restricted to the above-mentioned embodiment, and various modifications can be performed without departing from the essence of the present invention.

The present application contains subject matter related to that disclosed in Japanese Priority Patent Application JP 2009-163192 and Japanese Priority Patent Application JP 2009-163193, both filed in the Japan Patent Office on Jul. 9, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An HMM (Hidden Markov Model) learning device comprising:
   at least one processor; and
   a memory device storing instructions for configuring the at least one processor,
   wherein the at least one processor is configured by the instructions to:
      learn a state transition probability as the function of actions that an agent can execute, with learning with HMM performed based on actions that said agent has executed, and time series information made up of an observation signal observed as a result of said actions; and
      store learning results of said learning as internal model data including a state transition probability table and an observation probability table;
   said learning including calculating
      a frequency variable equivalent to frequency to be used for estimation calculation of an HMM state transition probability, and
      a frequency variable equivalent to frequency to be used for estimation calculation of an HMM observation probability;
   and said storing including storing at least
      said frequency variable corresponding to each of state transition probabilities, and
      said frequency variable corresponding to each of observation probabilities, of said state transition probability table;
   wherein said learning using said frequency variables further performs said learning to estimate said state transition probability and said observation probability based on said frequency variables; and
   wherein a first constraint is applied in said learning so that the number of observation symbols corresponding to said observation signal observed at one node of the HMM becomes one, wherein said learning executes processing for finding a node that includes two or more observation symbols to realize said first constraint, and dividing the found node.

2. The HMM learning device according to claim 1, wherein said actions are discrete actions;
   and wherein a state transition probability table corresponding to each of said actions is generated as said internal model data.

3. The HMM learning device according to claim 1, wherein, with said learning, a second constraint is applied so that an observation symbol observed at each of transition destination nodes to which transition can be made in the case of a predetermined action being executed at one node, mutually differs.

4. The HMM learning device according to claim 1, wherein, with said learning, a second constraint is applied so that an observation symbol observed at each of transition destination nodes to which transition is made due to a common action as to one node, mutually differs.

5. The HMM learning device according to claim 1, wherein said actions are consecutive actions, and are subjected to weighting so as to correspond to a limited number of discrete actions;

and wherein a state transition probability table corresponding to each of said limited number of discrete actions is generated.

6. The HMM learning device according to claim 5, wherein said learning finds nodes having a similar observation probability distribution at each of transition destination nodes to which transition can be made in the case of a predetermined action being executed at one node, and merges said found nodes.

7. The HMM learning device according to claim 5, wherein said learning finds nodes having a similar observation distribution at each of transition source nodes from which transition is made due to a common action as to one node, and merges said found nodes.

8. The HMM learning device according to claim 1, wherein said learning performs learning by said additional learning method, and also updates the value of said frequency variable, and in the case of updating said frequency variable, updates said frequency variable based on a predetermined learning rate.

9. The HMM learning device according to claim 1, wherein said learning further calculates a penalty coefficient according to the smallness of the value of said frequency variable to constrain the disturbance of the estimated value of said state transition probability due to the smallness of the value of said frequency variable.

10. The HMM learning device according to claim 1, wherein before performing learning by said additional learning method, the region of said observation probability table stored as said internal mode data is extended, and an observation probability is set to said extended region, in the case that the types of observation symbol corresponding to said observation signal increases.

11. The HMM learning device according to claim 1, wherein before performing learning by said additional learning method, the regions of said state transition probability table and said observation probability table stored as said internal mode data are extended, and a state transition probability and an observation probability are set to said extended regions respectively, in the case that the number of said nodes increases.

12. The HMM learning device according to claim 11, wherein based on a state transition probability obtained from said state transition probability table stored as said internal model data obtained based on the past learning, the state transition probability is set to said extended region of said state transition probability table.

13. The HMM learning device according to claim 12, wherein the at least one processor is further configured by the instructions to:
recognize, based on said time series information, whether or not transition has been made to an unknown node not included in said internal model data obtained based on the past learning;
wherein, in order to add said unknown node to said internal model data, time series information is accumulated for only a given time since said unknown node being recognized, an unknown node added to said internal model data is determined based on said accumulated time series information, and said determined unknown node is added to said internal model data.

14. The HMM learning device according to claim 13, wherein, in the case that after recognizing that transition has been made to said unknown node, said recognizing recognizes that transition has been made to a known node included in said internal model data obtained based on the past learning, said determined unknown node is added to said internal model data, and also a state transition probability and an observation probability are set to the regions of said state transition probability table and said observation probability table extended in response to addition of said unknown node to update said internal model data, and said updated internal model data is used to perform learning by said additional learning method.

15. The HMM learning device according to claim 1, wherein before performing learning by said additional learning method, the region of said state transition probability table stored as said internal mode data is extended, and a state transition probability is set to said extended region, in the case that the number of actions increases.

16. An HMM learning method comprising the steps of:
learning, using at least one processor, of a state transition probability as the function of actions that an agent can execute, with learning with HMM performed based on actions that said agent has executed, and time series information made up of an observation signal observed as a result of said actions; and
storing of learning results as internal model data including a state transition probability table and an observation probability table;
said learning including calculating
a frequency variable equivalent to frequency to be used for estimation calculation of an HMM state transition probability, and
a frequency variable equivalent to frequency to be used for estimation calculation of an HMM observation probability;
said storing including storing
said frequency variable corresponding to each of state transition probabilities, and
said frequency variable corresponding to each of observation probabilities, of said state transition probability table;
said at least one processor
using said frequency variables to perform learning by estimating said state transition probability and said observation probability based on said frequency variables;
applying a constraint in said learning so that the number of observation symbols corresponding to said observation signal observed at one node of the HMM becomes one;
executing processing for finding a node that includes two or more observation symbols to realize said constraint, and dividing the found node.

17. A non-transitory, computer-readable storage medium storing a program that, when executed by one or more processors, causes the one or more processors to perform a method, the method comprising:
learning a state transition probability as the function of actions that an agent can execute, with learning with HMM performed based on actions that said agent has executed, and time series information made up of an observation signal observed as a result of said actions; and storing learning results as internal model data including a state transition probability table and an observation probability table;

wherein said learning calculates a frequency variable equivalent to frequency to be used for estimation calculation of an HMM state transition probability, and a frequency variable equivalent to frequency to be used for estimation calculation of an HMM observation probability;

wherein said storing holds said frequency variable corresponding to each of state transition probabilities, and said frequency variable corresponding to each of observation probabilities, of said state transition probability table; and wherein said learning uses said frequency variables held by said storing to perform said learning to estimate said state transition probability and said observation probability based on said frequency variables; and wherein a constraint is applied in said learning so that the number of observation symbols corresponding to said observation signal observed at one node of the HMM becomes one, wherein said learning executes processing for finding a node that includes two or more observation symbols to realize said constraint, and dividing the found node.

18. An HMM learning method comprising the steps of:

learning, with a learning unit, of a state transition probability as the function of actions that an agent can execute, with learning with HMM performed based on actions that said agent has executed, and time series information made up of an observation signal observed as a result of said actions; and storing, with a storage unit, of learning results by said learning unit as internal model data including a state transition probability table and an observation probability table;

said learning unit calculating a frequency variable equivalent to frequency to be used for estimation calculation of an HMM state transition probability, and a frequency variable equivalent to frequency to be used for estimation calculation of an HMM observation probability;

said storage unit holding said frequency variable corresponding to each of state transition probabilities, and said frequency variable corresponding to each of observation probabilities, of said state transition probability table; and said learning unit using said frequency variables held by said storage unit to perform said learning by estimating said state transition probability and said observation probability based on said frequency variables; and said learning unit applying a constraint in said learning so that the number of observation symbols corresponding to said observation signal observed at one node of the HMM becomes one, and executes processing for finding a node that includes two or more observation symbols to realize said constraint, and dividing the found node.

19. A non-transitory, computer-readable storage medium storing a program that, when executed by a computer, causes the computer to serve as an HMM learning device comprising:

a learning unit configured to learn a state transition probability as the function of actions that an agent can execute, with learning with HMM performed based on actions that said agent has executed, and time series information made up of an observation signal observed as a result of said actions; and a storage unit configured to store learning results by said learning unit as internal model data including a state transition probability table and an observation probability table;

wherein said learning unit calculates a frequency variable equivalent to frequency to be used for estimation calculation of an HMM state transition probability, and a frequency variable equivalent to frequency to be used for estimation calculation of an HMM observation probability;

wherein said storage unit holds said frequency variable corresponding to each of state transition probabilities, and said frequency variable corresponding to each of observation probabilities, of said state transition probability table;

wherein said learning unit uses said frequency variables held by said storage unit to perform said learning by estimating said state transition probability and said observation probability based on said frequency variables; and wherein said learning unit applies a constraint in said learning so that the number of observation symbols corresponding to said observation signal observed at one node of the HMM becomes one, and executes processing for finding a node that includes two or more observation symbols to realize said constraint, and dividing the found node.

* * * * *